(12) United States Patent
Bushong et al.

(10) Patent No.: US 7,859,220 B2
(45) Date of Patent: Dec. 28, 2010

(54) METHOD AND APPARATUS FOR CHARGING ELECTROCHEMICAL CELLS

(75) Inventors: William C. Bushong, Madison, WI (US); Paul Cheeseman, Verona, WI (US); Michael Root, Lino Lakes, MN (US); Viet H. Vu, Verona, WI (US)

(73) Assignee: Rovcal, Inc., Madison, WI (US)

( * ) Notice: Subject to any disclaimer, the term of this patent is extended or adjusted under 35 U.S.C. 154(b) by 1242 days.

(21) Appl. No.: 10/918,901

(22) Filed: Aug. 16, 2004

(65) Prior Publication Data

US 2005/0088140 A1 Apr. 28, 2005

Related U.S. Application Data

(63) Continuation-in-part of application No. 10/697,221, filed on Oct. 27, 2003, now abandoned, which is a continuation-in-part of application No. 10/045,934, filed on Oct. 19, 2001, now Pat. No. 6,878,481.

(60) Provisional application No. 60/495,536, filed on Aug. 15, 2003.

(51) Int. Cl.
*H02J 7/00* (2006.01)
(52) U.S. Cl. .......................... 320/107; 429/99; 429/100
(58) Field of Classification Search .......... 320/107–110
See application file for complete search history.

(56) References Cited

U.S. PATENT DOCUMENTS

| 3,097,975 | A | | 7/1963 | Horn et al. | |
|---|---|---|---|---|---|
| 3,593,100 | A | * | 7/1971 | Foster | 320/139 |
| 3,614,583 | A | | 10/1971 | Burkett et al. | |
| 3,617,386 | A | | 11/1971 | Bosben et al. | |
| 3,622,397 | A | | 11/1971 | Belove | |
| 3,775,661 | A | | 11/1973 | Frezzolini et al. | |
| 4,025,696 | A | | 5/1977 | Tucholski et al. | |
| 4,028,478 | A | | 6/1977 | Tucholski | |
| 4,035,552 | A | | 7/1977 | Epstein | |
| 4,346,336 | A | * | 8/1982 | Crawford | 320/147 |

(Continued)

FOREIGN PATENT DOCUMENTS

AU 199926971 A1 3/2000

(Continued)

OTHER PUBLICATIONS

Xiao Guang Yang et al., Charge Performance of a Commercial Nickel Metal Hydride Traction Battery System, Journal of The Electrochemical Society, 148 (9) A 1023-A1028 (2001).

(Continued)

*Primary Examiner*—Edward Tso
*Assistant Examiner*—Samuel Berhanu
(74) *Attorney, Agent, or Firm*—Armstrong Teasdale LLP

(57) ABSTRACT

A rechargeable electrochemical cell charger is provided for charging electrochemical cells at high current rates. The charger provides a sufficient force between the charge contacts and the cell terminals to remove nonconductive contaminants when the cell is inserted into the charger, thereby increasing the conductivity at the point of contact. The charger can include an air moving system for the dissipation of heat from the electrochemical cell during charging, and a heat sensor to determine the cell temperature during charging.

100 Claims, 25 Drawing Sheets

U.S. PATENT DOCUMENTS

| | | | |
|---|---|---|---|
| 4,690,879 A | | 9/1987 | Huhndorff et al. |
| 4,756,983 A | | 7/1988 | Tucholski |
| 4,818,641 A | | 4/1989 | Ledenican |
| 4,855,195 A | | 8/1989 | Georgopoulos et al. |
| 4,871,553 A | | 10/1989 | Huhndorff |
| 4,937,153 A | | 6/1990 | Huhndorff |
| 4,943,497 A | | 7/1990 | Oishi et al. |
| 4,959,604 A | | 9/1990 | Cuesta |
| 4,975,341 A | | 12/1990 | Tucholski et al. |
| 4,992,339 A | | 2/1991 | Georgopoulos |
| 4,992,344 A | | 2/1991 | Coppers |
| 5,026,615 A | | 6/1991 | Tucholski |
| 5,028,860 A | | 7/1991 | Amano |
| 5,057,382 A | | 10/1991 | Tucholski |
| 5,057,761 A | * | 10/1991 | Felegyhazi, Sr. ............ 320/110 |
| 5,188,909 A | | 2/1993 | Pedicini |
| 5,405,715 A | | 4/1995 | Dawson et al. |
| 5,418,082 A | | 5/1995 | Taki et al. |
| 5,508,598 A | | 4/1996 | Al-Abassy |
| 5,541,496 A | | 7/1996 | Simmonds |
| 5,589,755 A | | 12/1996 | Kaite et al. |
| 5,606,238 A | * | 2/1997 | Spellman et al. ............ 320/110 |
| 5,607,795 A | * | 3/1997 | Saida ........................ 429/100 |
| 5,609,972 A | | 3/1997 | Kaschmitter et al. |
| 5,637,981 A | | 6/1997 | Nagai et al. |
| 5,680,030 A | * | 10/1997 | Kadouchi et al. ........... 320/134 |
| 5,691,073 A | | 11/1997 | Vu et al. |
| 5,705,290 A | | 1/1998 | Azema |
| 5,721,480 A | | 2/1998 | Morioka |
| 5,741,606 A | | 4/1998 | Mayer et al. |
| 5,747,187 A | | 5/1998 | Byon |
| 5,747,969 A | | 5/1998 | Tamai |
| 5,764,030 A | * | 6/1998 | Gaza ........................ 320/116 |
| 5,872,444 A | | 2/1999 | Nagano et al. |
| 5,879,832 A | | 3/1999 | Vu et al. |
| 5,903,136 A | | 5/1999 | Takahashi et al. |
| 5,905,362 A | | 5/1999 | Nagano et al. |
| 5,955,868 A | | 9/1999 | Kaite et al. |
| 5,985,479 A | | 11/1999 | Boolish et al. |
| 5,998,051 A | | 12/1999 | Poirier et al. |
| 6,008,620 A | | 12/1999 | Nagano et al. |
| 6,018,286 A | | 1/2000 | Quinn et al. |
| 6,020,721 A | * | 2/2000 | Brotto ........................ 320/150 |
| 6,063,518 A | | 5/2000 | Dewulf et al. |
| 6,069,551 A | | 5/2000 | Kalapodis et al. |
| 6,078,244 A | | 6/2000 | Quinn et al. |
| 6,080,506 A | | 6/2000 | Davis et al. |
| 6,083,639 A | | 7/2000 | McHugh et al. |
| 6,087,810 A | | 7/2000 | Yoshida |
| 6,104,165 A | | 8/2000 | Miyamoto et al. |
| 6,118,254 A | | 9/2000 | Faulk |
| 6,207,319 B1 | | 3/2001 | Nam |
| 6,207,320 B1 | | 3/2001 | Song et al. |
| 6,366,056 B1 | | 4/2002 | Podrazhansky |
| 6,366,057 B1 | | 4/2002 | Nakatsuji |
| 6,376,120 B1 | | 4/2002 | Azema |
| 6,404,167 B1 | * | 6/2002 | Sakakibara ................ 320/132 |
| 6,635,383 B2 | * | 10/2003 | Maple ........................ 429/178 |
| 2002/0063550 A1 | | 5/2002 | Chen |
| 2002/0070709 A1 | | 6/2002 | Small |
| 2003/0027037 A1 | | 2/2003 | Moores, Jr. et al. |

FOREIGN PATENT DOCUMENTS

| | | | |
|---|---|---|---|
| CH | | 372094 | 11/1963 |
| GB | | 2349284 | 10/2000 |
| JP | | 09320562 A | 12/1997 |
| JP | | 10173741 A * | 6/1998 |
| WO | WO 96/35253 | | 11/1996 |
| WO | WO 02/35618 | | 5/2002 |
| WO | WO 03/028186 | | 4/2003 |

OTHER PUBLICATIONS

Carson, Jr. et al., "Rapid Recharging of Nickel-Cadmium Batteries," *Power Sources 2* pp. 181-197 (1968).

Coyle et al., "Ultra-Fast Nickel Cadmium Batteries Charger," *New Developments ;in Electric Vehicles for Disabled Persons* pp. 8/1-8/5 (1995).

Falcon, C.B., "Fast Charge Termination Methods for NiCd and NiMH Batteries," *PCIM Journal* pp. 10-18 (1994).

Fujikawa, Kaoru, "The New Cylindrical Sealed Ni-Cd Battery, 250 AAP, and its Charger, ZLC 8.4-0.35T,"*Yuasa Jiho* 61:35-41 (1986).

Gladstone et al., "Demand Pulse Charging for Nickel-Cadmium Batteries," *Proc. Annual Power Sources Conference*, 1969 23:56-59 (1969).

Gutekunst, K., "Contribution to the Examination of Charging Behavior of Sealed Nickel Cadmium and lead Acid Batteries," *Caplus* (2002).

Hoshino, K., "Ultra Rapid Charge Ni-Cd Battery" *National Technical Report* 37:59-63 (1991).

Juvinall, G.L., "A Novel Negative-Limited Sealed Nickel-Cadmium Cell," $9^{th}$ *Intersociety Energy Conversion Engineering Conference Proceedings*, pp. 881-887 (1974).

Kantner et al., "Investigation of Hermetically Sealed Maintenance-Free, High Rate, Nickel-Cadmium Batteries for Aircraft Applications," *Contract Report for Air Force Aero Propulsion Laboratory* Project No. 8173 (1996).

Latner, N., "A Fast Charger for Nickel-Cadmium Batteries," *Health Physics* 23:580-582 (1972).

Tsuda, S., "Quick Charge Characteristics of Sealed Nickel-Cadmium Rechargeable Batteries," *National Technical Report* 24:313-320 (1978).

Watanabe, Y., "Pananica Quick Chargers for Portable VTR and Color Camera," *National Technical Report* 24:393-398 (1978).

Wuidart, L., "Ultra Fast NiCd Battery Charger with Integrated Magnetic," *Official Proceedings of the Nineteenth International intelligent Motion (PCIM) Conference* pp. 352-365 (1991).

Wuidart, L., "Monitoring an Ultra Fast Battery Charger with a ST6210 Micro-Controller," *EPE Journal* 2:35-38 (1992).

Yang et al, "Charge Performance of a Commercial Nickel Metal Hydride Traction Battery System," *Journal of the Electrochemical Society* 148:A1023-A1028 (2001).

* cited by examiner

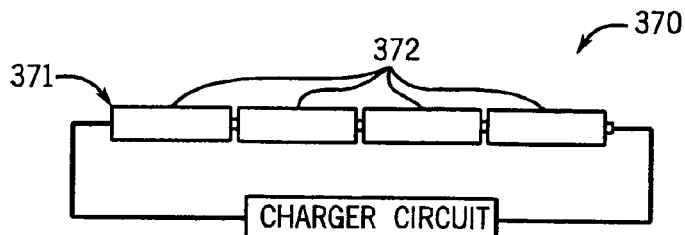
FIG. 26A
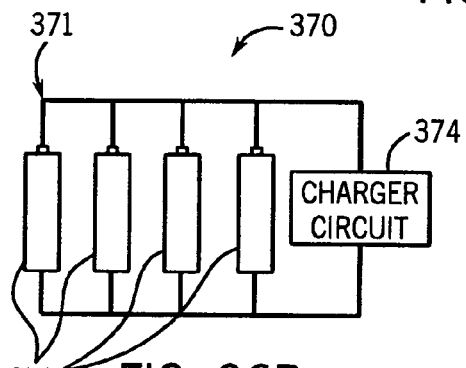
FIG. 26B
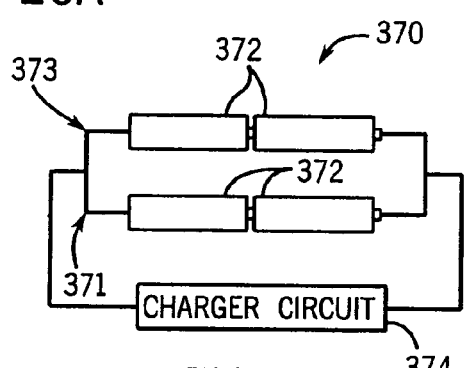
FIG. 26C
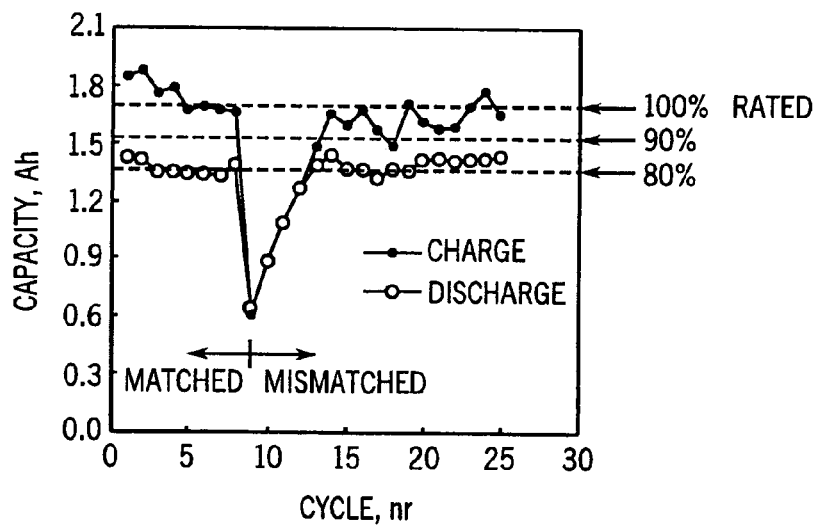
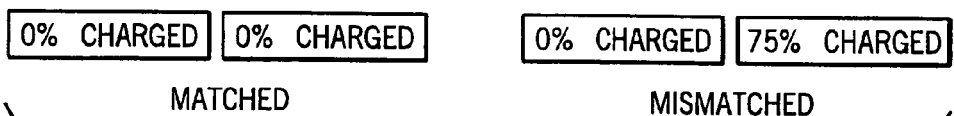
FIG. 27

| TYPE | VOL, cm³ | C, F | E, 'V | DISCHARGE t, MIN | Ah | Wh | Wh dm⁻³ |
|---|---|---|---|---|---|---|---|
| NiMH AA | 7.52 | | 1.4 | 78 | 1.300 | 1.56 | 207 |
| SUPERCAP | 6.77 | 0.56 | 3.5 | 0.0231 | 3.9e-4 | 8.61e-4 | 0.127 |
| | 8.78 | 0.40 | 5.5 | 0.0298 | 5.0e-4 | 1.60e-3 | 0.183 |
| | 7.04 | 4.7 | 2.5 | 0.116 | 1.9e-3 | 3.35e-3 | 0.475 |
| | 7.04 | 22 | 2.5 | 0.535 | 8.9e-3 | 1.54e-2 | 2.19 |
| | 8.91 | 33 | 2.5 | 0.809 | 1.3e-2 | 2.34e-2 | 2.62 |
| | 8.91 | 10 | 2.5 | 0.233 | 3.9e-3 | 6.61e-3 | 0.742 |
| | 8.91 | 10 | 2.5 | 0.243 | 4.1e-3 | 7.02e-3 | 0.788 |

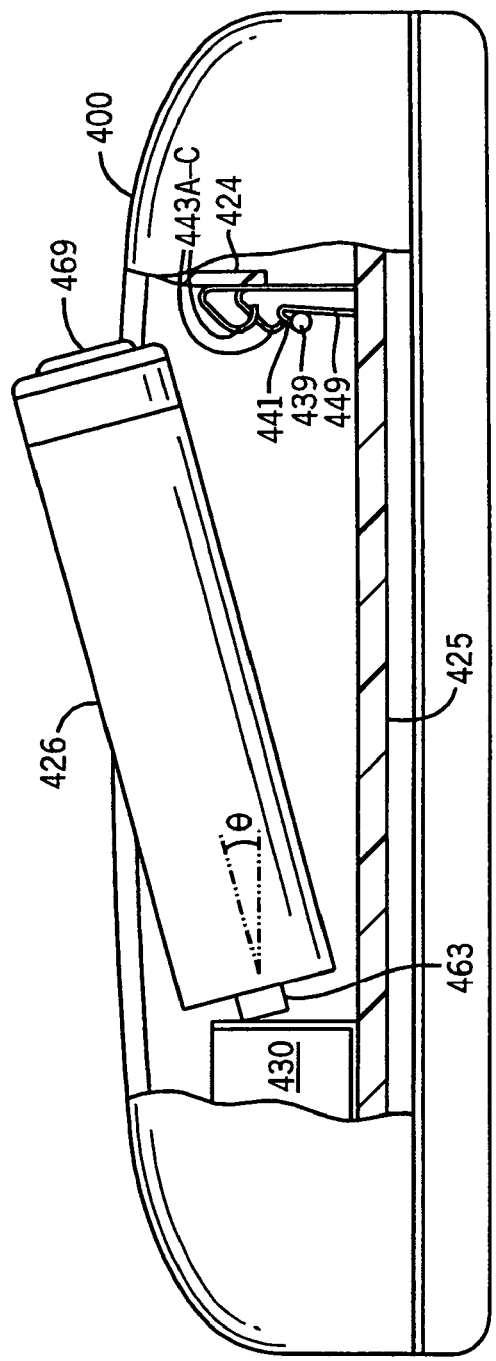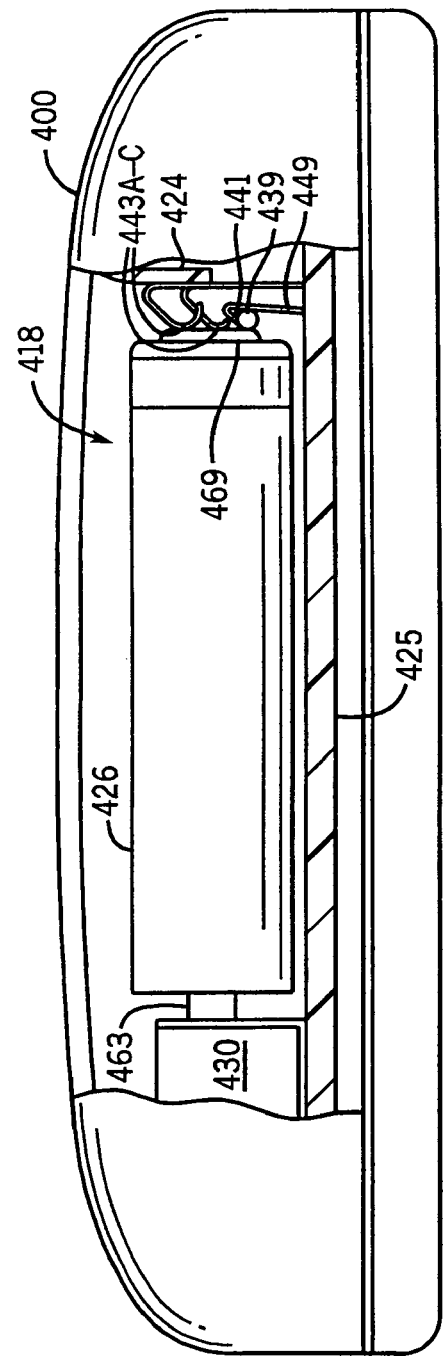
FIG. 36A
FIG. 36B

METHOD AND APPARATUS FOR CHARGING ELECTROCHEMICAL CELLS

CROSS-REFERENCE TO RELATED APPLICATIONS

This claims priority to U.S. Provisional Application Ser. No. 60/495,536 filed Aug. 15, 2003, and is further a Continuation-In-Part of U.S. patent application Ser. No. 10/697,221 filed Oct. 27, 2003 now abandoned, which is in turn a Continuation-In-Part of U.S. patent application Ser. No. 10/045,934 filed Oct. 19, 2001 now U.S. Pat. No. 6,878,481, the disclosure of each of which is hereby incorporated by reference as if set forth in its entirety herein.

STATEMENT REGARDING FEDERALLY SPONSORED RESEARCH OR DEVELOPMENT

Not applicable.

BACKGROUND

The present invention relates generally to secondary electrochemical cell chargers, and specifically relates to a cell charger for delivering charge currents to nickel rechargeable cells, such as nickel metal hydride (NiMH) cells. This invention may also be employed in nickel cadmium (NiCd) cells.

For greater convenience and portability, many modern electrical appliances and consumer products may be operated to draw electric current from batteries of standard size and electrical performance. For convenience and economy, various rechargeable batteries have been developed, such as nickel metal hydride cells and the like.

Metal hydride cell technology provides superior high-rate performance at reasonable cost when compared to nickel cadmium and lithium ion technology. Moreover, metal hydride cells have about a 50% higher volumetric energy density than NiCd cells and about equal to lithium ion cells.

Metal hydride rechargeable cells are typically recharged by applying a constant current rather than constant voltage to the cells. In this scheme, cell voltage increases gradually until the cell approaches full charge whereupon the cell voltage peaks. As the cells reach the overcharge state, the released heat causes the cell temperature to increase dramatically, which in turn causes the cell voltage to decrease. Cell pressure also rises dramatically during overcharge as oxygen gas is generated in quantities larger than the cell can recombine. Unfortunately, it is known that the rate of pressure change is several orders of magnitude faster than the rate of voltage or temperature change. Thus, conventional constant current charge interruption methods cannot support a very fast charge rate without risking internal pressure buildup, rupture, and electrolyte leakage. For this reason, metal hydride cells may be provided with safety vents.

One common way to reduce pressure buildup at the full-charge state is to provide an anode having a excess capacity of greater by 40-50% more than the cathode, a gas-permeable separator, and limited electrolyte to accommodate effective diffusion of gasses. This avoids the production of hydrogen gas at the anode while permitting the oxygen to recombine with the anode material. When a cell reaches full charge, oxygen gas continues to be produced at the cathode, but hydrogen is not produced from the anode. If hydrogen were produced, the cell could rupture from excess pressure.

When a nickel rechargeable cell approaches a full charge state, oxygen is generated at the cathode. The oxygen gas diffuses across a gas-permeable separator to the anode where it is recombined into cadmium hydroxide or water as follows:

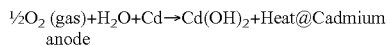
@Cadmium anode

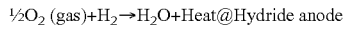 anode

The oxygen recombination reaction therefore controls the cell pressure, as is illustrated in FIG. 1. The oxygen gas then crosses the separator and reacts with the anode material. Downsides of this arrangement include reduced cell capacity and corresponding shorter cell cycle life due to degradation of the anode from overcharge with oxidation and heat.

It is desirable to stop charging a cell or plurality of cells when a full charge state is reached to avoid possible cell rupture or leakage due to the increasing internal gas pressure. Conventional metal hydride rechargeable cells cannot themselves signal a suitable charge termination point. One must instead rely upon expensive and sophisticated detection circuitry in an associated charger device to determine when charging should end. Charge termination is typically determined by the detection circuitry based on (1) peak cell voltage, (2) peak cell temperature (TCO), (3) duration of charging time, (4) -dV, and (5) dT/dt. Each known method for terminating a constant current charge has disadvantages. For example, time-based termination can be unreliable except at very low charge rates because the cell can become overcharged before termination.

Charge termination based on peak voltage can be unreliable at the end of the charging period because an over-voltage condition can exist before termination. Termination based on a voltage decline (-dV) is necessarily associated with oxygen recombination and the accompanying detrimental temperature rise. In practice, this means that voltage detection must be accurate and fast. Unless the ambient temperature is steady, it can be difficult to accurately measure a change in voltage. Moreover, when the charge rate is slower than 0.3 C, the voltage drop measurement is too small to be detected accurately. A charge rate of 1 C draws a current equal to the rated capacity of the electrochemical cell or battery. Termination based only on peak temperature is also easily affected by ambient temperature changes.

Termination based upon the rate of change in temperature over time (dT/dt) is somewhat more reliable than detecting an absolute temperature change because it is less subject to effects caused by ambient temperature change and because there is less negative effect on cycle life, but it is still based on heat which is detrimental to cell performance and cycle life. This is because temperature increases faster, and, in fact, precedes, the drop in voltage. Accordingly, there is somewhat less risk of rupture and leakage than in the other methods noted above. This makes it the most common charge termination method in use today.

Others in the art have sought pressure based mechanisms for breaking the connection between the electrode and the cell terminal when pressure exceeds a predetermined level. For example, U.S. Pat. No. 5,026,615 discloses a pressure-sensitive switch in an end cap assembly that comprises a conductive spring member, a nonconductive fulcrum member and a moveable conductive member. The conductive spring member is in electrical connection with a terminal on one end and with the moveable conductive member on the other end. The moveable conductive member is in turn in electrical connection with an electrode. As the internal cell pressure increases, the moveable conductive member exerts force on the spring member, which pivots on the nonconductive fulcrum member and disconnects from the terminal. This patent therefore requires a first and second contact, one of which being movable with respect to the other and rotatable about a fulcrum in order to pivot with respect to the other contact. This arrangement requires more essential parts than necessary, and further requires that the assembly be constructed with tight tolerances, thereby increasing complexity as well as the cost of production.

Other examples of these technologies include U.S. Pat. Nos. 5,747,187, 5,405,715, 5,741,606, 5,609,972, 6,018,286, 6,078,244, and 6,069,551, all of which are incorporated herein by reference as if set forth in their entirety. Some such mechanisms prevent a pressure-induced rupture of the cell but in doing so permanently disable the cell. In other cases, reversible switch devices prevent cell rupture, but do not detect an early charge termination state to avoid heat build up and to ensure superior cell performance and cycle life.

With constant voltage charge, on the other hand, the charging current is high at the beginning of the charge, when the cell can accept higher currents, and then decreases to lower levels as the cell approaches full charge. When constant voltage charging, the above-noted signals for the end of a constant current charge process are not useful because as the cell approaches the full charge state, the cell voltage is constant and the cell temperature is leveling. Like a constant current charge approach, charging time cannot be used for the constant voltage charge when the charge rate is higher than 0.3 C due to run away of pressure that can damage devices. As a result of these shortcomings it has been difficult to identify an effective termination signaling means and constant voltage charging for metal hydroxide cells has therefore been generally considered to be impractical.

With alternating current charge, the charging current may be modulated at a defined frequency or combination of frequencies to produce a net positive current that enables the cell to become charged. An alternating current charge can provide a fast charge with less pressure buildup and lower temperature increase than constant current or constant voltage charge. However, when using an alternating current charge, the above-noted signals for the end of a constant current charge process are not useful because as the cell approaches the full charge state, changes in the cell voltage are difficult to detect above the voltage response to the applied alternating current. As a result it has been difficult to identify an effective termination signaling means and alternating current charging for metal hydroxide cells has also therefore been generally considered to be impractical. It should be appreciated that an alternating current charge is used throughout the present disclosure to mean a varying current that produces a net positive charge, such as a modulated alternating current. For example, an alternating current may be half-wave rectified or full-wave rectified to produce a series of current pulses, or an alternating current may be offset by a desired DC current.

Published Australian patent application number 199926971 A1 discloses a method for fast charging a nickel metal hydride battery in an implant by transcutaneous transmission of electric power from an external power-transmission part to a power-receiving part in the implant. The patent application considers the desirability of an initial rapid high-current charge phase when the internal cell resistance is low, followed by a second lower-current, constant cell voltage charge phase to ensure that the cell is charged only with as much energy as the electrochemical state allows, without excess gassing or heating of the cell. Harmful effects on the battery are precluded while, at the same time, the charging rate remains high. In the method disclosed therein, a first of two charging phases includes the step of allowing a relatively high constant charging current to flow to the power receiving part while the cell voltage rises until it reaches a predetermined limiting charging voltage. In the second charging phase, the charging current is lower than the current level at the end of the first phase while the cell voltage is kept at least approximately at the predetermined constant voltage value. In the Australian patent application, the second charge phase ends when an associated micro-electronic controller determines that the rate of change of the charging current over time does not reach a predetermined slope. This cumbersome two-step constant current/constant voltage approach is typical of prior approaches in the art.

In U.S. patent application Ser. No. 10/045,934, the present inventors recognized a rechargeable electrochemical cell capable of receiving high charge currents. At high charge currents, heat can be generated around the cell that, in addition to the in-cell pressure buildup described above, should be limited during charging. Furthermore, the cell terminals are typically formed from nickel, which can oxidize in air to form nickel oxides on that are less conductive than pure nickel.

What is therefore needed is a reliable method and apparatus for detecting a charge termination point based on cell temperature. It would also be desirable to reduce the cell temperature during charging and thereby extend the length of time that a cell can accept high current charges charge. It would be further desirable to prevent maintain the conductivity of the connection between the charging contacts and the cell terminal ends.

SUMMARY

In accordance with one aspect of the present invention, an electrochemical cell charger is provided of the type that delivers a charge to an electrochemical cell. The charger includes at least one battery compartment adapted to receive the electrochemical cell. The battery compartment includes a positive charge contact adapted to engage a positive terminal of the electrochemical cell. The battery compartment further includes a negative charge contact adapted to engage a negative terminal of the electrochemical cell. The charger is operable to provide a charge current to the electrochemical cell at a level greater than 4 Amps.

In accordance with another aspect of the invention, an electrochemical cell charger of the type that delivers a charge to an electrochemical cell is provided. The charger includes at least one battery compartment adapted to receive the electrochemical cell. An air moving system is provided including a vent disposed proximal the battery compartment. A forced air source draws ambient air into the vent. adapted receive to the electrochemical cell, and a forced air source that draws ambient air into the vent. The charger is configured to provide a charge current greater than 4 Amps to the received electrochemical cell.

In accordance with still another aspect of the invention, a method is provided for charging a rechargeable electrochemical cell disposed in a charger. The method includes the step of providing a charge that is received by the cell at a level greater than 4 Amps.

In accordance with yet another aspect of the invention, a method is provided for applying a charge to positive and negative terminal ends of a rechargeable electrochemical cell in a charger including positive and negative charge contacts disposed in a charging cavity. The method includes the steps of inserting the cell into the charging cavity at an angle, and wiping the cell terminals against the corresponding charge contacts to remove an oxidation layer from the cell terminals. A force of at least 3 pounds is applied from a charge contact to a corresponding cell terminal.

In accordance with another version of the invention, an electrochemical cell is provided of the type that delivers a charge to an electrochemical cell. The charger includes a positive contact adapted to engage and wipe a positive terminal of the cell. The charger further includes a negative contact adapted to engage and wipe a negative terminal of the cell. The charger is operable to provide an engaged cell an average charge current of at least 4 Amps for at least 5 minutes.

In accordance with still another version of the invention, an electrochemical cell is provided of the type that delivers a charge to an electrochemical cell. The charger includes a positive contact adapted to engage and wipe a positive terminal of the cell. The charger further includes a negative contact adapted to engage and wipe a negative terminal of the cell. The positive and negative contacts are arranged to receive the cell at an angle. At least one of the contacts provides a force of at least 3 pounds to the cell terminals.

In accordance with yet another version of the invention, an electrochemical cell charger is provided of the type that delivers a charge to an electrochemical cell. The charger includes a positive contact, the positive contact being adapted to engage and wipe a positive terminal of the cell, and a negative contact, the negative contact being adapted to engage and wipe a negative terminal of the cell. The positive and negative contacts are arranged to receive the cell at an angle. At least one of the contacts is configured to provide a force of at least 3 pounds to the cell terminals. The charger further includes an air moving system including a vent disposed proximal the battery compartment, and a forced air source that draws ambient air into the vent. A thermistor is disposed proximal one of the cell terminals and is operable to measure a cell temperature. The charger is operable to provide an engaged cell an average charge current of at least 4 Amps for at least 5 minutes.

Other aspects and advantages will become apparent, and a fuller appreciation of specific adaptations, compositional variations, and physical attributes will be gained upon an examination of the following detailed description of the various embodiments, taken in conjunction with the appended claims.

DRAWINGS

FIG. 26A is a schematic view of a battery pack constructed in accordance with an aspect of the present invention;

FIG. 26B is a schematic view of a battery pack constructed in accordance with an alternative embodiment;

FIG. 26C is a schematic view of a battery pack constructed in accordance with another alternative embodiment;

FIG. 27 is a graph illustrating the charge and discharge capacity for battery packs having matched and mismatched cells;

FIG. 36A is a schematic side elevation view of a charger illustrated in FIG. 31 having a portion cut away to illustrate a cell being inserted into the cradle;

FIG. 36B is a schematic side elevation view of the charger illustrated in FIG. 69A with the cell inserted into the cradle.

DESCRIPTION

Figure 1:
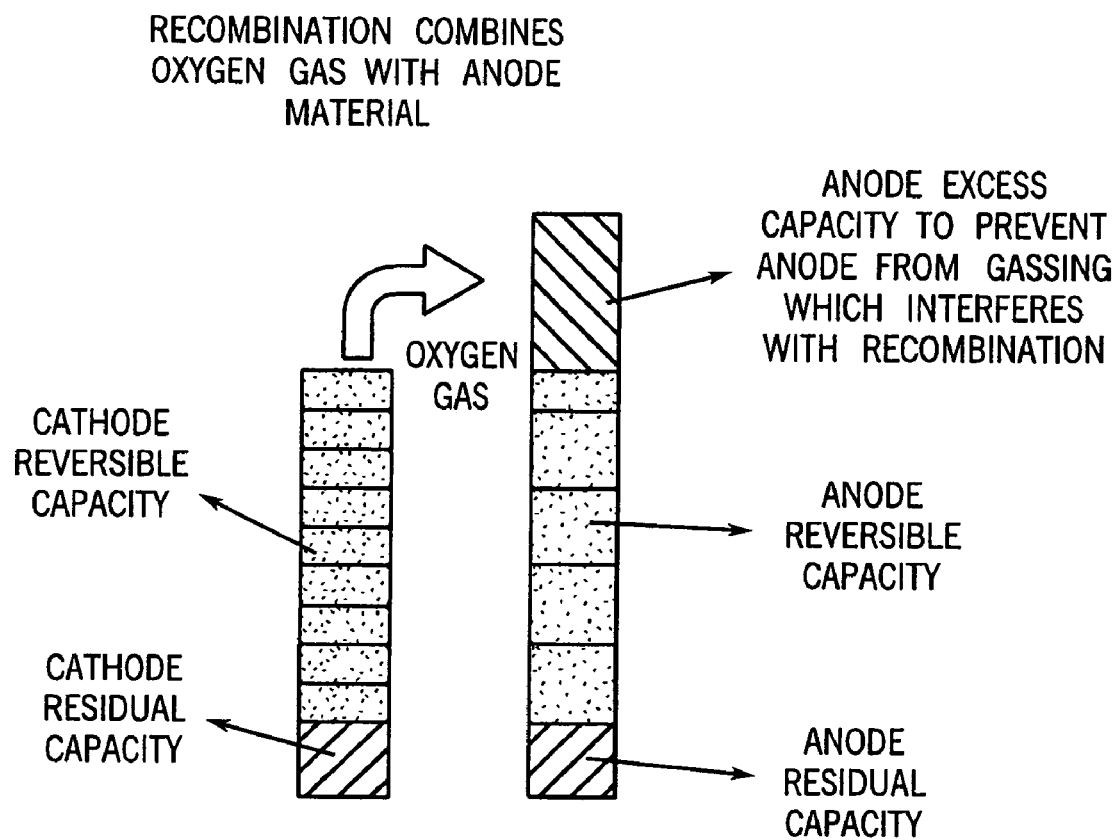
FIG. 1 is a schematic illustration of the oxygen recombination reaction controlling cell pressure.
Figure 2A:
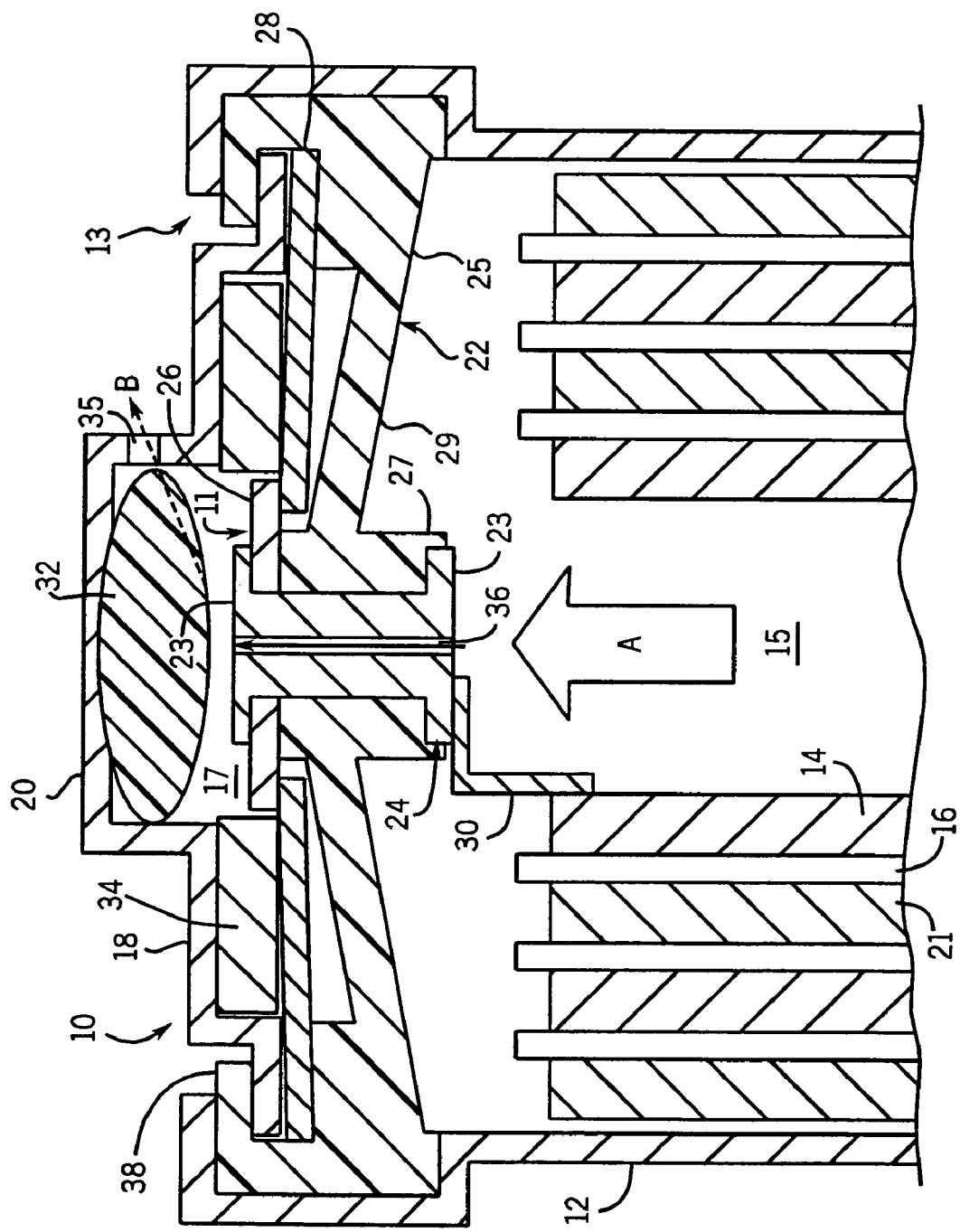
FIG. 2A is a cross-sectional view of an end cap assembly containing a pressure-responsive switch and a pressure-release vent constructed in accordance with an aspect of invention, illustrated in a low pressure position.

Referring now to FIG. 2A, an axially extending cell includes a can 12 having closed end (not shown) and an open end 13 disposed opposite the closed end and axially downstream therefrom. A cap assembly 10 includes a positive terminal end cap 18 that is secured in the open end of the negative can 12 to provide closure to the cell. In particular, the end cap assembly 10 and the open end of the can 12 are adapted in size and shape such that the end cap assembly 10 is sealingly accommodated in the open end by crimping the negative can 12 during assembly of a cylindrical rechargeable metal hydride cell. The closed end of the can is conventional and is not shown.

A positive (e.g., nickel hydroxide) electrode 14 is in removable electrical connection with the positive terminal cap 18, as will become more apparent from the description below. The cell further contains a negative electrode 21 (e.g., hydride electrode) that is in electrical connection with the can 12, and an alkaline electrolyte (e.g., potassium hydroxide) alone or in combination with other alkali metal hydroxides. The electrodes are disposed in an internal cavity 15, and are separated by a separator 16. A cell comprising the can 12 and the end cap assembly 10 described above can further comprise conventional positive 14 and negative 21 wound electrodes in its interior, although the relative size of these electrodes can be adjusted to meet the physical and electrical specifications of the cell.

The positive terminal cap 18 has a nubbin 20 that is sized and shaped to provide a positive terminal to the cell having a pressure-responsive switch 11 constructed in accordance with one aspect of the present invention. The pressure-responsive switch 11 comprises a flexible non-conductive mono-stable grommet 22 adapted in size and shape to fit securely in the open end 13. Grommet includes a radially outer seal 25, an inner hub 27, and an arm 29 that extends substantially radially and connects the seal to the hub. Grommet 22 further includes has a centrally disposed opening 15 extending axially through the hub 27 in which is seated a conductive spool-shaped connector 24 having a pair of oppositely disposed radially extending outer flanges 23. The space between the outer surface of grommet 22 and inner surface of terminal end cap 18 defines a cavity 17 in the end cap assembly 10.

Connector 24 is securely fixed in the opening of grommet 22 such that the conductive connector moves in concert with the grommet. A first annular conductive contact 26, which is a metal washer in accordance with the illustrated embodiment, surrounds the hub of connector 24 and has an upper surface in electrical contact with the upper flange 23. A second annular conductive contact 28 (which can also be a metal washer) surrounds the grommet and is positioned axially upstream and adjacent the first contact 26. The first and second contacts 26, 28 are circular plates in FIG. 2A but they can be provided in other shapes, as illustrated, for example, in FIGS. 3-5. Contact 28 has an upper surface 29 that is in electrical connection with the terminal cap, and in removable mechanical (and therefore electrical) connection with the bottom surface of the first contact 26, as will become more apparent from the description below.

The grommet 22 can be formed of any sufficiently flexible, nonconductive inert material that does not adversely impact the cell chemistry. Suitable materials include but are not limited to polypropylene, polyolefin and nylon and their equivalents.

The outer seal 25 of grommet 22 includes an upwardly and radially inwardly extending peripheral lip 38 that is shaped and sized to form a tight seal with the open end of the can to provide a barrier between the interior and the exterior of the cell. The lip 38 also partially defines a cavity in the outer seal 25 in which the outer end of terminal end cap 18 and second contact 28 are disposed. The lip 38 presents a radially outer convex surface to permit the can 12 to be crimped over the grommet 22 during assembly of the cell. When the axially downstream end of can 12 is crimped over the grommet 22 during assembly, a tight seal is provided between the grommet 22, second contact 28, and terminal end cap 18 to isolate the interior of the cell from the ambient environment. An optional sealant such as asphalt or tar can also be employed between the end cap assembly 10 and the can 12 to strengthen the seal.

A flexible conductive tab 30 electrically connects the conductive connector 24 to the positive electrode 14 in the interior of the cell. The conductive connector 24 can be an eyelet or rivet that is secured in the central opening by crimping at its ends to provide flanges 23 that secure the hub 27 of grommet 22 and the first contact 26. The conductive connector 24 is in electrical and physical contact with the first contact 26 thereby helping to secure the conductive connector 24 into position.

FIG. 2A illustrates the end cap assembly in a low pressure state, such that the grommet 22 is in its stable position. In this low pressure state, the positive electrodes 14 are in electrical connection with the positive terminal cap 18 via the conductive tab 30, connector 24, first contact 26, and second contact 28. Accordingly, the cell may be charged by introducing a recharging current or voltage to the cell. Advantageously, when internal pressure within the cell accumulates beyond a predetermined threshold, the grommet 22 flexes (reversibly) axially downstream along the direction of arrow A to bias the pressure-responsive from the first position illustrated in FIG. 2A to a second position illustrated in FIG. 2B. It should be appreciated that the predetermined threshold may depend on the intended type of charge being used (e.g. constant current, constant voltage, etc. . . . ), and may be determined by the material selected for the grommet, and thickness and flexibility of the arm 29.

Figure 2B:
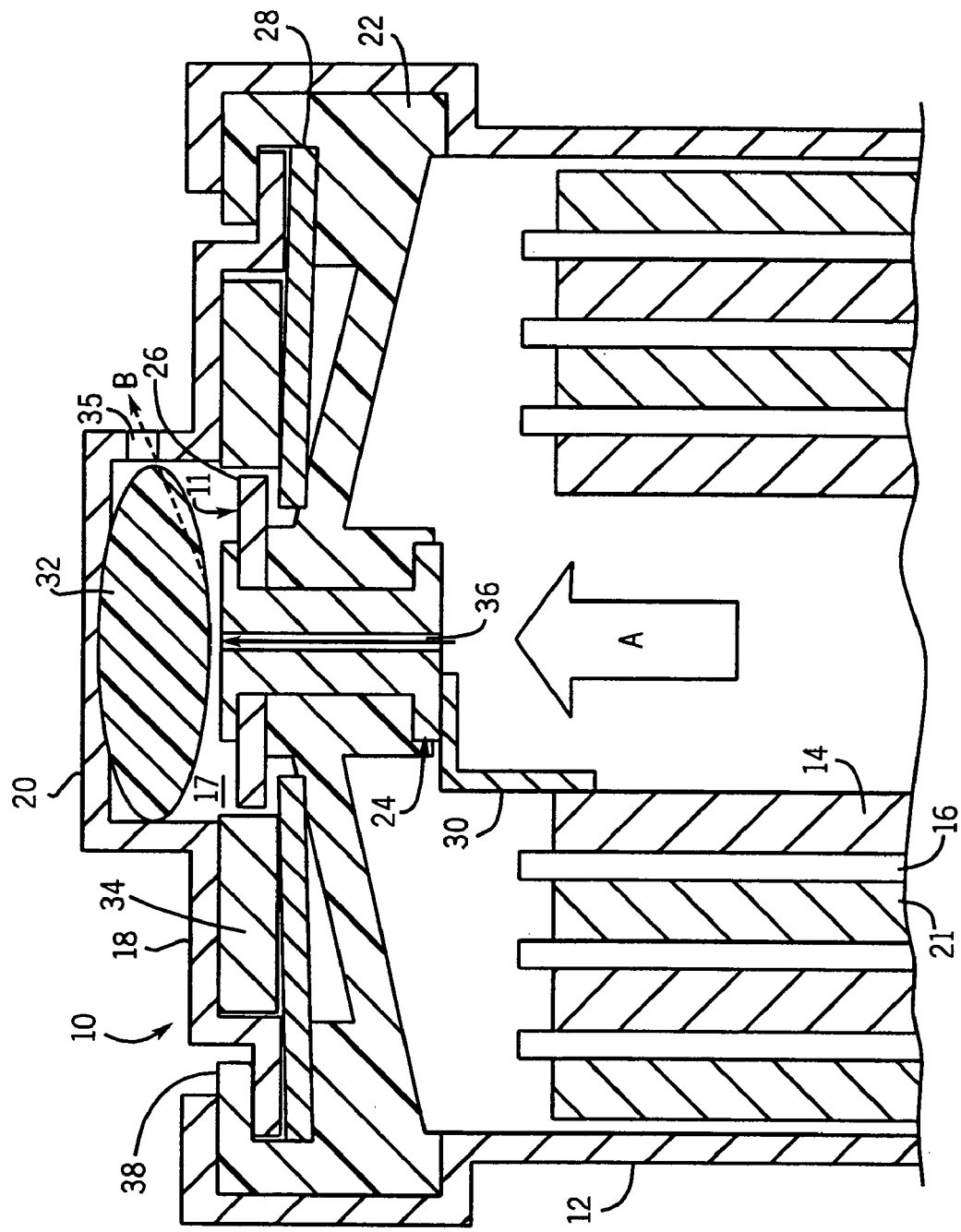
FIG. 2B is a cross-sectional view of the end cap assembly illustrated in FIG. 2A in a high pressure position.

Referring now to FIG. 2B, when the internal pressure within the cell exceeds the predetermined threshold sufficient to flex the grommet 22, the hub 27 is translated axially downstream, thereby also translating the first contact axially downstream with respect from the second contact 28, and removing the electrical connection therebetween. As a result, an electrical connection at the nubbin 20 will not transfer to the electrodes 14 within the cell, and further charging is prevented until the overpressure situation subsides.

Optionally, an insulating overpressure stop 32 can also be provided in an interior cavity defined by the nubbin 20. The overpressure stop 32 can also be used to pre-load the contact pressure as desired and can limit motion of the conductive connector 24 in the direction of the nubbin 20 when internal cell pressure is high. A stop washer 34 can also optionally be disposed between the second contact 28 and terminal end cap 18 to restrain the movement of the second contact when the grommet 22 flexes, thereby further insuring that the electrical connection will be severed between the two contacts during a high pressure state.

It should be appreciated that a plurality of cells could be installed in a battery pack and connected in series within a charger that is configured to supply a constant voltage or constant current charge to the cell. So long as at least one of the cells includes a pressure responsive switch of a type described herein (assuming pressure accumulates similarly within each cell), charging will terminate once the pressure within that cell activates the switch to remove electrical communication between the end cap 18 and electrode 14. Alternatively, each cell could include the switch such that the charging of all cells would terminate once one of the cells reaches a maximum permissible internal pressure. Alternatively, the cells could be connected in parallel to a charging source, in which case each cell would include a pressure responsive switch of a type described herein.

FIGS. 2A-B also illustrate an optional safety system for venting excess pressure (gas) from the cell when in an overpressure condition. In particular, the conductive connector 24 can define a centrally disposed pressure release channel 36 extending axially therethrough. Accordingly, gas produced at the electrodes is able to flow axially downstream from the cell interior 15 and through channel 36 to end cap interior 17. The end cap 18 also defines one or more outlets 35 extending there-through to enable the gas to flow from the end cap assembly 10 to the outside environment. The outlet can be secured against undesired leakage with a seal (not shown) adapted in tensile strength to yield at a pre-selected pressure level to release gas from the cell. The seal can be reversible or irreversible.

Alternatively, outlet(s) 35 may always be open to the environment, in which case a reversible airtight seal to the interior of the cell is maintained by blocking the pressure release channel 36. In particular, the overpressure stop 32 can also function as a overpressure release control if it is formed of a suitably deformable plastic material such as rubber for sealing pressure release channel 36 and outlet(s) 35 (if not open to the environment). In addition to the deformable material shown, other structures for releaseably blocking the pressure release channel include, without limitation, a plug or a spring. When the internal cell pressure rises to a sufficiently high level, the block is urged away from channel 36 and from outlet(s) 35 to define a pressure release path from the cell interior to the outside environment. The pressure at which the vent system releases the cell internal pressure depends on how much internal pressure a battery can withstand; the plastic material of the overpressure stop 32 is selected to respond to a pressure at which venting is desired, but to remain securely in place at lower pressures. Generally speaking, for a metal hydride rechargeable cell, the safety vent system responds to cell internal pressures of about 600 psig and higher, more typically in the range of between about 1000 to 1200 psig.

The opening and closing of the pressure release path through channel 36 and outlet(s) 35 can be reversible but may also be made irreversible by employing a block made of materials that do not revert to a shape or size or position that can effectively block the pressure release path after a first pressure rise. It will be appreciated that blocks other than those disclosed herein can be employed in both reversible and irreversible vent systems, as will be described in more detail below.

Figure 3:
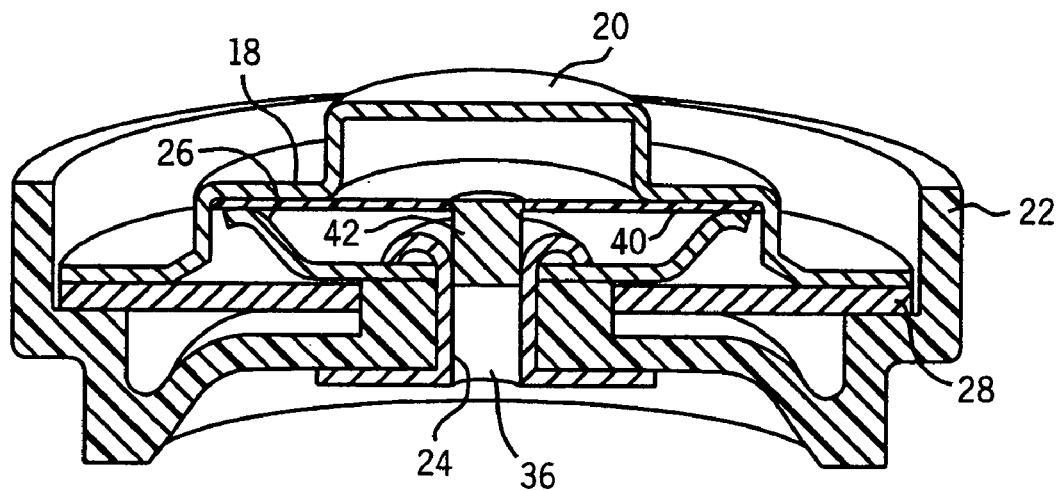
FIG. 3 is a cross-sectional isometric view of an end cap assembly containing a pressure-responsive switch and a pressure-release vent, constructed in accordance with an alternate embodiment, depicted in a low pressure position.
Figure 5:
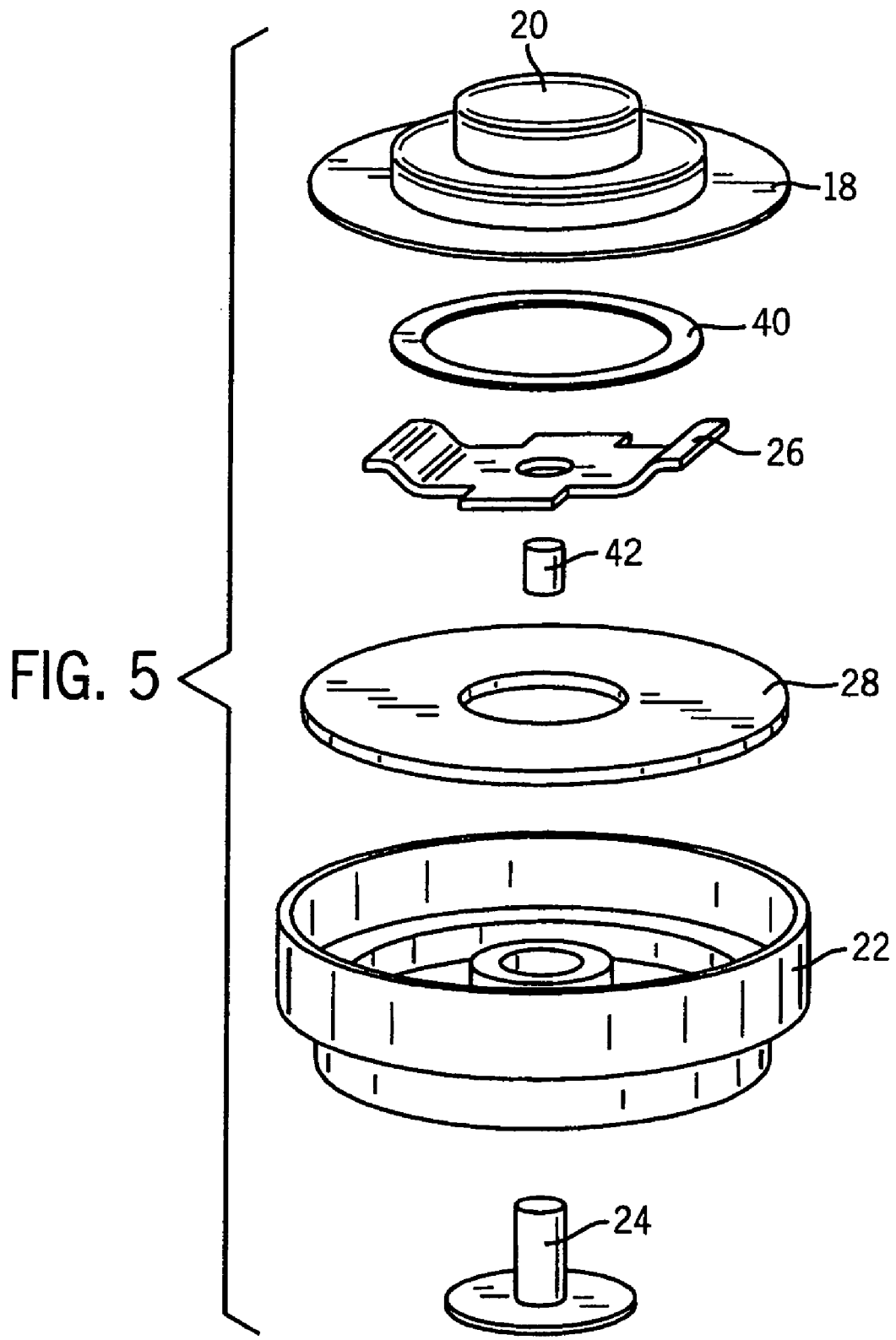
FIG. 5 depicts an exploded view of the components of the end cap assembly of FIG. 3.

Referring now to FIG. 3, one example of an end cap assembly having an irreversible vent is illustrated, in which like elements to those illustrated in FIGS. 2A and 2B are identified by the same reference numerals. FIG. 5 illustrates these elements prior to being assembled into the can 12.

In accordance with this embodiment, the first contact 26 is not flat, but rather includes a flat central portion and four arms, each arm having a distal portion and a transition portion that connects the distal and central portions, which are not coplanar with each other. The central portion is in electrical contact with the conductive connector 24 and the second contact 28. The second contact 28 is electrically connected to end cap 18. Each distal portion of contact 26 is electrically isolated from the end cap 18 by an electrical isolator 40 that is disposed therebetween and aligned with the distal portion of contact 26.

When internal pressure builds up within the cell, grommet 22 flexes, thereby removing contact 26 from electrical communication with washer 28. The electrical connection between terminal end cap 18 and the electrodes is also thereby removed. Insulator 40 limits the permissible axial movement of contact 26, and further prevents electrical communication between the distal ends of contact 26 and the end cap 18. The first contact 26 thus responds well in concert with the grommet 22 to changes in the internal cell pressure, and is well-suited to urging reversion of the switch to the low pressure position when internal pressure subsides.

Figure 4:
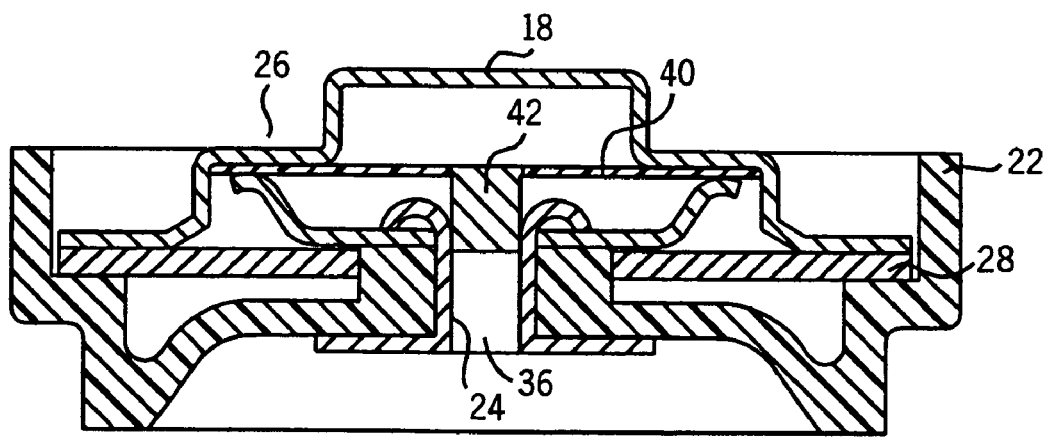
FIG. 4 is a cross-sectional elevation view of the end cap assembly of FIG. 3.

The venting system of FIGS. 3-5 is also configured somewhat differently than that of FIG. 2 in that the pressure release channel is plugged with an adhesively- or frictionally-engaged frustoconical plug 42 adapted to be expelled from the channel at high internal cell pressures, for example between 500-900 psig. Referring to FIG. 4, the insulator 40 may extend radially from terminal end cap 18 to plug 42.

During operation, when the electrical connection is broken between electrical contacts 26 and 28, current flow drops to zero. This zero current flow can be detected by conventional charger circuitry (not shown) and can be interpreted as a signal that the cell is fully charged. The charger circuitry can then signal the end of charge condition. These circuits are considered to be conventional. More importantly, only complete current flow drop needs to be detected, rather than any more subtle change in pressure, voltage, temperature or rate of current flow as is typical in conventional metal hydride recharging systems.

The internal cell pressure at which the pressure-responsive switch is biased from the low pressure position to the high pressure position (the "biasing pressure") can vary according to the size and shape of the battery, the charging rate and other charging conditions such as ambient temperature. For example, when the anode of a battery has a much higher capacity than the cathode of the battery, the cell internal pressure at a low overcharge rate may be stabilized at a relatively low level such as 30-50 psig. Similarly, the higher the charge rate, the higher the cell internal pressure will be when a battery approaches the full charge state or reaches an overcharge state. Thus, when a switch is built for a battery having a much higher capacity at the anode and/or when the battery will be charged at a very low rate, the biasing pressure of the pressure-responsive switch should be low enough to ensure that charge can be stopped when the battery reaches a full charge or overcharge state. On the contrary, when a switch is used in a battery that has similar anode and cathode capacities, or when the battery will be charged at a high rate, the biasing pressure can be set at any level that satisfies battery safety concerns since there is no question that the cell internal pressure can reach the biasing pressure.

Desirably, however, a pressure-responsive switch should have a switch pressure that is close to the internal pressure when the cell reaches the full charge state, to prevent problems such as overheating. One of ordinary skill in the art knows how to determine cell internal pressure at the point of full charge or overcharge. Generally speaking, for a fast nickel metal hydride rechargeable cell, a pressure-responsive switch may have a biasing pressure of between about 50 psig and 500 psig. It is desirable that the switch pressure have a lower limit of 100 psig and, alternatively 200 psig, and an upper limit of 400 psig and, alternatively, 300 psig.

Figure 6:
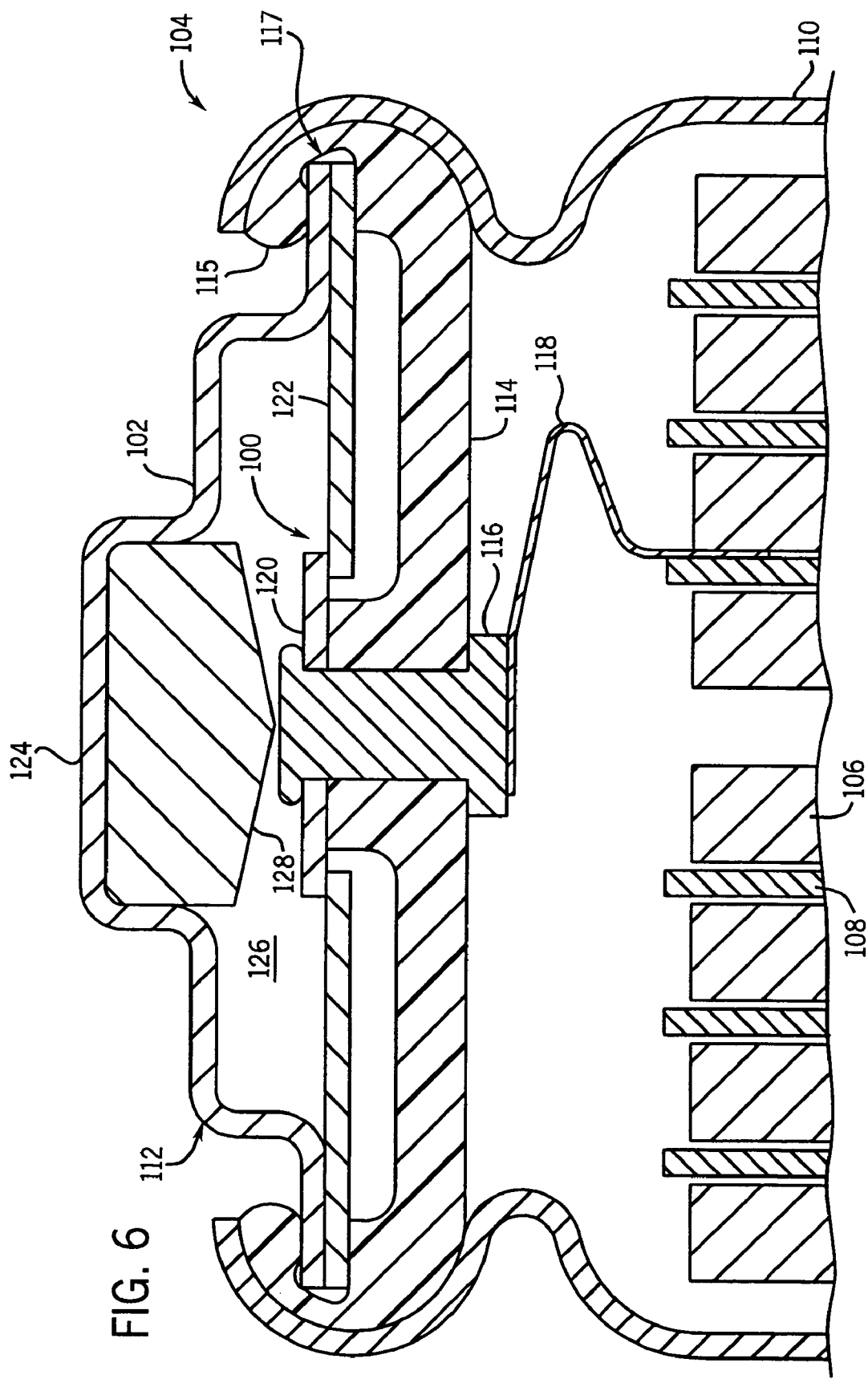
FIG. 6 is a sectional side elevation view of the positive terminal of a cell incorporating a switch constructed in accordance with an alternate embodiment.

Referring now to FIG. 6, a reversible pressure responsive switch 100 constructed in accordance with an alternate embodiment is disposed within a positive terminal cap 102 at the open end of a nickel rechargeable cell 104. The cell 104 may be conventional apart from the cap and its electrical connection to the cell electrodes. Cells made according to aspects of the present invention can comprise wound positive 106 and negative 108 electrodes in its interior, wherein the negative electrode (such as a hydride electrode) is in electrical connection with a can 110 having an open end and a closed end, and wherein the positive (e.g., nickel hydroxide) electrode is in electrical connection with the positive terminal cap 102 that is secured in the open end of the negative can 110. The cell contains an electrolyte, typically potassium hydroxide.

The open end of the cell 104 includes a cap assembly 112 disposed in the open end of the can 110. The open end of the negative can 110 is shaped to sealingly accommodate the cap assembly 112 in the open end during manufacture. The closed end of the cell can is not depicted but is conventional. The cap assembly 112 includes the positive terminal cap 102 and a pressure-responsive switch 100.

The pressure-responsive switch 100 comprises a grommet 114 that provides both a flexible seal and main spring, and has a centrally disposed conductive connector 116, or "rivet" or "pin," extending axially there-through. The grommet 114 may be formed of any material that does not negatively interact with the chemistry of the cell but which is sufficiently flexible to move in response to a pressure increase to bias the switch as described above. The grommet 114 further includes an outwardly and upwardly extending lip 115 that is shaped and sized to form a tight seal with the open end of the can 110 to separate the interior of the cell from the exterior. The lip creates a radially inwardly facing void 117 that is occupied by end cap assembly components, as will be described in more detail below. In the illustrated embodiment, the lip 115 has a convex outer surface to accommodate a concave inner surface of the can 110 that allows the can to be crimped into position during cell assembly. An optional sealant such as asphalt or tar can also be employed between the cap assembly 112 and the can 110 to further seal the open end.

Toward the interior of the cell, a conductive tab 118 electrically connects the central conductive pin 116 to the positive electrode 106. Toward the exterior of the cell, the central pin 116 is also in electrical contact with a contact ring 120 which also serves to secure the central pin into its position. Contact ring 120 is a washer that surrounds the central pin 116 and, along with contact plate 122, is disposed in an internal cavity 126 that is defined by the positive terminal cap 102 and the flexible grommet 114. Contact ring 120 is thus in constant electrical communication with the central pin 116. Secured in the void 117 are a circular conductive contact plate 122 and the positive terminal cap 102 having a nubbin 124 sized and shaped to provide a standard positive terminal for the cell 104. The contact plate 122 is thus in electrical connection with both of the aforementioned positive end cap 102 and the contact ring 120 when the cell 104 is in the low-pressure state illustrated in FIG. 6. Accordingly, the nubbin 124 is in electrical communication with the electrode 106 via end cap 102, contact plate 122, contact ring 120, central conductor 116, and tab 118.

In operation, the grommet 114 flexes outwardly in response to high internal cell pressure. When the internal cell pressure is sufficiently great to cause the grommet 114 to flex, the central pin 116 is urged toward the over-pressure stop 128, thereby biasing contact plate 120 axially away from contact plate 122 (not shown). The electrical connection between contact ring 120 and the contact plate 122 terminates, thereby terminating the electrical communication between the nubbin 124 and electrode 106. Further charging is thus prevented. Advantageously, the switch 100 is reversible, in that the connection between contact ring 120 and contact plate is reestablished once the overpressure situation subsides. Also provided on an inner surface of the positive terminal cap nubbin 124 in the cap assembly 112 cavity is a non-conductive overpressure stop 128 which can also be used to pre-load the contact pressure as desired.

As described above, once the overpressure situation exists within the cell 104, the electrical contact is broken between contacts 120 and 122, current flow within the cell 104 drops to zero. This zero current flow can be detected by conventional charger circuitry and can be interpreted as a signal that the cell is fully charged. The charger circuitry can then signal the charge termination. These circuits are considered to be conventional. As was noted above, the rise in pressure, which follows gassing in the cell, precedes the damaging temperature rise that shortens cell cycle life.

Figure 7:
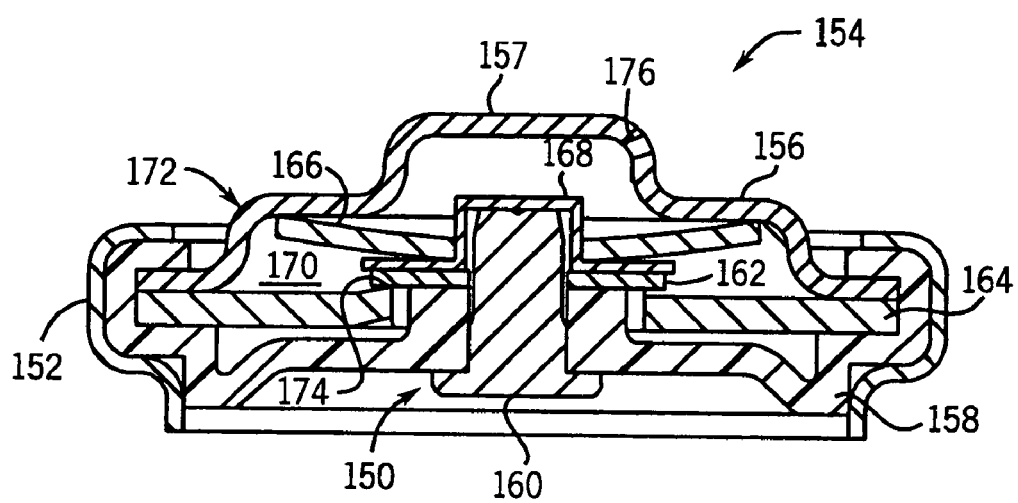
FIG. 7 is a sectional side elevation view of the positive terminal of a cell incorporating a switch constructed in accordance with an alternate embodiment.

Referring now to FIG. 7, a reversible pressure-responsive switch 150 is illustrated in accordance with an alternative embodiment. In particular, cell 154 comprises a negative can 152 having an open end that is shaped to accommodate and seal the cap assembly 172 in the open end during manufacture. The remainder of the cell can is conventional. The cap assembly 172 includes the positive terminal cap 156 having a nubbin 157 that is sized and shaped to provide a positive terminal to the cell.

The regulating switch 150 illustrated in FIG. 7 includes a flexible grommet 158 adapted in size and shape to fit securely in the open end and having a central opening there through. A conductive connector 160 is securely fixed in the central opening such that the conductive connector moves in concert with the flexible grommet 152. A first conductive contact 162 surrounds the connector 160 and is in constant electrical communication therewith. A second conductive contact 164 extends radially inwardly from the radially outer wall of grommet 158 such that at least a portion of its upper surface is axially aligned and in severable contact with the lower surface of contact 162. A stop 166 is disposed axially downstream from contact 162, and limits the axial displacement of the grommet 158. An insulating layer 168 is disposed between contact 162 and the stop 166. Accordingly, the stop 166 does not form part of the electrical circuit.

The grommet 158 may be formed of any sufficiently flexible, nonconductive inert material that does not adversely impact the cell chemistry. Suitable materials include, but are not limited to polypropylene, polyolefin and nylon and their equivalents. Depending on the configuration of the switch elements, the switch 150 may be responsive to pressure, temperature, or both, as will become more apparent from the description below.

The terminal cap 156 and the flexible grommet 158 define a cavity 170 within the cap assembly 172 in which the first and second contacts 162 and 164, and stop 166 are provided. While the first and second contacts 162 and 164 are circular washers plates as illustrated in FIG. 7, they may be provided in other shapes and sizes, as described above. The second contact 164 includes three protrusions 174 proximal its radially inner edge that extend axially towards the first contact 162 and are spaced 120° from each other. When the internal pressure is less than a predetermined threshold, determined in large part by the flexibility of grommet 158, the protrusions 174 are in connection with the lower surface of the first contact 162, thereby completing the electrical circuit and permitting the cell to be charged.

Toward the interior of the cell, a conductive tab (not shown) electrically connects the central conductive pin 160 to the positive electrode in the manner described above. The hub of grommet 158 further serves to secure the central pin 160 in its proper position. Secured in the peripheral lip of the grommet 158 are the circular conductive contact plate 164 and positive terminal cap 156. The contact plate 164 is in electrical connection with both of the aforementioned positive end cap and the contact ring 162, although the latter connection is disconnected when the high temperature or pressure condition exists.

As described above, the end cap assembly 172 can also comprise a system for venting pressure from the cell. When the assembly comprises a vent system, the conductive connector 160 can define there through a pressure release channel for gas to flow from the cell interior on a first side of the flexible grommet 158 into the end cap assembly 172 on the second side similarly described in FIG. 3 and FIG. 4. The battery end cap 156 also defines one or more outlets 176 extending therethrough for gas to flow from the end cap assembly 172 to the outside environment. The vent mechanism can be reversible or irreversible. If the described vent system is not employed, other vent means can be provided.

In operation, the grommet 158, flexes (reversibly) axially downstream towards the positive end cap 156 and against the spring force of stop 166 in response to high internal cell pressure. The regulating switch 150 is thus biased from the closed position (illustrated in FIG. 7) to an open position (not shown), in which the central pin 160 moves axially downstream in concert with the grommet 158. Accordingly, the first electrical contact 162 becomes displaced from the second contact 164 and free from protrusion 174. The electrical contact between the contact ring 162 and the contact plate 164 is thus broken, and further charging is prevented, until the overpressure situation subsides and the grommet returns to the position illustrated in FIG. 7, and the electrical connection between contacts 162 and 164 is reestablished.

The stop 166 illustrated in FIG. 7 may further be manufactured from a temperature-responsive material that changes shape when a predefined temperature is attained. In this way, a stop can be fashioned to reversibly deflect or deform at a certain internal cell temperature, thereby reducing or removing the preload force on the central pin and reducing the pressure required to break electrical contact between the contact ring and the contact plate. In this way, a potentially harmful temperature rise is prevented, even if no overpressure condition exists within the cell. In operation, when the cell reaches a predefined temperature, the stop 166 can reversibly deflect or deform and pull the conductive connector 162 away from the contact plate 164, thus breaking electrical contact between the contact ring and the contact plate. Alternatively, the stop 166 can be connected to the conductive connector or central pin 160 and the top cap 156.

While any temperature-responsive material can be used, the stop can also be formed from a bimetal composed of two layers of metals or alloys or other materials with different coefficients of thermal expansion. One layer has a higher thermal expansion and the other layer has a lower thermal expansion. This causes the bimetal to deflect or deform in response to temperature in a way that can be defined by the choice of metals or alloys used in each layer. Alternatively, a shape memory material can be used to form the temperature-responsive stop 166, such as a nickel-titanium alloy.

The temperature-responsive stop 166 can additionally operate as a pressure-responsive stop. Shape memory materials include alloys of Nickel-Titanium, Copper-Zinc-Aluminum, or Copper-Aluminum-Nickel. These materials are pre-formed to the concave disc shape 166 as shown to act as the spring and to apply a pre-determined amount force that will hold the conductive contact 162 and contact plate 164 together for electrical continuity. These materials have the ability to deform and flatten out when heated to a pre-determined temperature or become flatten out also when internal pressure reaches a pre-determined value. It has been found that the most desirable temperature range for these materials to work with nickel-metal hydride or nickel-cadmium cells is between 70 deg C. and 100 deg C.

It should be further appreciated that the stops illustrated in accordance with any of the previous embodiments may also be constructed to be responsive to temperature and/or pressure.

As described above, the charger may conclude that charging has terminated based on a zero current flow within the cell, or when charging time has reached a pre-determined value. The charger may then either discontinue the charge, or it could continue charging, in which case the pressure responsive switch will continue to open and close. The charging would therefore continue until a timer reaches a termination point at a pre-set value. This charging mode can be particularly advantageous when charging at a rate faster than 30 minutes, where pressure increases significantly when the cell is approaching a fully charge state, and the on-off of current provided by the pressure switching mechanism will continue to top up the charge to the maximum charge state. If the cell is being charged under constant voltage, constant current or alternating current at a very charge fast rate (charge termination within 30 minutes or less) the cell may be only charged to approximately 70-90%, as it is known that internal cell pressure increases ahead of a full cell charge during charging. The present inventors have determined that a constant voltage charge is more advantageous than a constant current or alternating when achieving a very fast charge rate (charge termination in 30 minutes or less), because charge current continues to decrease toward the end of charge with constant voltage, and as the result, pressure and temperature are not rising as quick in comparison to charging with a constant current. For example, up to 85-90% of charge can be achieved with constant voltage before the opening of the switch in comparison to 80-85% with alternating current and 65-70% with constant current. In some instances, the fast charging accomplished using the switch presented in accordance with aspects of the present invention offsets the disadvantage associated with the partial charging of the cell.

In other instances, it may be desirable to sacrifice time to ensure that the cell has become fully charged. In this instance, once the charger detects a zero-current, it waits until the internal pressure within the cell subsides and then measures the OCV for the cell (a pressure release vent would be particularly advantageous in such cells to minimize the cell depressurization time). Based on the OCV, the charger may determine whether the cell has been fully charged.

For example, it is known that a fully charged metal hydride cell will have an OCV of 1.42 V. Accordingly, if the OCV of the cell is being charged has exceeded a predetermined threshold of 1.42-1.48V, the charger would determine that the cell is fully charged. Otherwise, the charger will conclude that the cell has not yet been fully charged. Accordingly, once pressure within the cell has dissipated such that the electrical connection between contacts is established, the charger will again subject the cell to the alternating or constant current charge until the internal pressure within the cell breaks the electrical connection. This iterative process may continue until the cell reaches a predetermined OCV or a predetermined number of iterations, at which point the charger will provide an appropriate message to the user, for example by illuminating an indicator. Alternatively, the user could select a charge termination (e.g., 80% capacity), at which point the charger would calculate the corresponding OCV and terminate charging when the cell has reached the user-selected charge termination threshold.

This process would be more desirable when using constant current or alternating current charging, as pressure is known to build up significantly before the cell is fully charged. If a constant voltage charge is applied to the cell, it would be expected that the cell would be substantially fully charged after the first iteration, thereby allowing the charger to detect a zero current and indicate that the cell is fully charged. While the zero current flow method described above could also be used in combination with constant current and alternating current charging, the cell may not be fully charged when the first iteration terminates.

One advantage of the reversible switches illustrated and described herein is that the detection of a charge termination is not dependent of oxygen recombination. Therefore, there is no longer any need to provide excess anode capacity. Oxygen at the cathode and hydrogen at the anode can be evolved. Both gasses contribute to the pressure. In this case, the anode capacity can be made equal to the cathode capacity, for a net increase in cell capacity. When charging current stops, oxygen recombines with hydrogen to form water: $\frac{1}{2}O_2 + H_2 \rightarrow H_2O$.

Another advantage is that a non gas-permeable separator may be used. This eliminates the needs for having open flow channels within the separator for the gas to be recombined with anode, which had contributed to separator dry out and limited cell cycle life. With a pressure-responsive switch of the type described herein, additional electrolyte can fill in the channels thereby increasing cycle life and discharge efficiency.

Another advantage is that sophisticated analytical circuitry is not employed for detecting an end-of-charge condition, thereby reducing the cost of an associated charger device.

Another advantage is that charging can proceed at a faster rate than in prior cells. For example, a rechargeable metal hydride battery according to certain aspects of the invention can be charged in 45 minutes or less, alternatively in 30 minutes or less, and still alternatively in 20 minutes or less, for example less than 15 minutes or 10 minutes for a NiMH 2.3 Ah AA cell and 0.8 Ah AAA cell, whereas conventional cells require about 1 hour or more to charge (1.2 C). The charging rate can be accelerated because concerns about overpressure and high temperature conditions at the end of charging can be eliminated. In this regard, fast charging may be achieved at rate less than an hour.

Another advantage is that a cell of the type described herein can have a greater balance of anode material to cathode material, and therefore can also have a higher capacity than a conventional rechargeable metal hydride battery. Unlike conventional cells, in which the anode has an excess capacity of greater by 40-50% more than the cathode, a cell of the type described herein can have a ratio between 0.9:1-1.5:1 by weight of anode material to cathode material.

Another advantage is that a gas impermeable separator may be implemented, which may be manufactured thinner and denser than the prior art, leaving more room for electrolyte within the cell. Cycle life is thereby increased, as is discharge efficiency.

In particular, oxygen at the cathode and hydrogen at the anode can be evolved during charging. Both gasses contribute to the pressure. In this case, the anode capacity can be made equal to the cathode capacity, for a net increase in cell capacity. When charging current stops, oxygen recombines with hydrogen to form water: $\frac{1}{2}O_2 + H_2 \rightarrow H_2O$. Because, in such an embodiment, the separator may be gas impermeable, the limitation on electrolyte filling for preventing the separator to be totally saturated in prior art cells is eliminated.

Furthermore, whereas the cathode of prior art rechargeable metal hydride cells typically comprise type AB5 alloys, it also possible to employ the higher-capacity AB2 alloys that have traditionally been disfavored in such cells because of overpressure concerns.

A method of charging a cell or a plurality of cells that contain the pressure-responsive switch is also provided. The method comprises the steps of connecting the cell(s) to a power source, such as a dedicated charger, charging the cell(s) until the cell internal pressure reaches a predetermined level whereupon the switch is biased to the high-pressure position and the charging circuit is interrupted. When the charging circuit is interrupted, the drop in charging current to zero can be manually or automatically noted. A charger used to charge the battery can include circuitry for detecting zero charging current or a timer set to a pre-determined value or terminating, and an indicator for displaying that the charge has terminated. Alternatively, as described above, the charger could undergo a plurality of charging iterations to provide a full charge to the cell.

While any type of method may be used to charge a cell incorporating a reversible switch as described herein, a constant voltage charging method is desirable, since the current is allowed to seek its own decreasing level as charging proceeds without concern that the cell will be subject to overcharging or overpressure. With constant applied voltage charge method, as the cell voltage increases during charge, the current is automatically reduced toward the end of charge. Accordingly, the charging current is high at the beginning of charging when the cell's charge acceptance is high, and tapers to a lower charge current toward end of charge when the cell's charge acceptance is reduced. No expensive and complicated charging control is necessary. The current flowing into the cell is regulated by the cell internal resistance and the cell's own state of charge. When the cell reaches full charge, the increasing internal pressure will activate the pressure switch to interrupt charging. Accordingly, when the charger indicates that the charging has terminated, the cell will be at or near full charge.

Advantageously, strings of cells in parallel can be charged with the same voltage source. Multiple cells in series may also be charged together in by receiving the charging voltage that is equal to the open circuit voltage of the cell plus the overvoltage caused by cell internal resistance and the predisposed resistance of the circuit. Advantageously, with constant voltage charge, an even faster charge rate than that of constant current charge can be reached due to the ability to increase the charging current at the beginning of the charge when the cell can accept higher currents.

It should be appreciated, however, that the present invention is equally applicable to constant current and alternating current charges. As described above, it is known that the pressure inside metal hydride cells rises rapidly when cell charging is essentially complete. As was noted above, the rise in pressure, which follows gassing in the cell, precedes the damaging temperature rise that may shorten cell cycle life. Thus it is desired to terminate charging when the pressure begins to rise and prior to onset of a destructive overpressure condition.

EXAMPLES

For a nickel metal hydride cell to be charged in 15 minutes or less, the constant charging voltage can be about 1.6V to 1.65V for a AA cell with 30-40 mOhm internal resistance determined by voltage difference between cell OCV cell voltage at 6 seconds interval at 10 amperes current. For cell with lower internal resistance (C-size cells, for example, having internal resistance of 10-20 mOhms), charging voltage lower than 1.6V but higher than 1.5V can be applied. The present inventors have determined empirically that constant voltage charging is desired when the ambient temperature is above freezing while constant current charging is desired when the ambient temperature is below freezing or when the electrochemical cell is not equipped with a pressure-responsive switch.

Commercial AA and AAA nickel metal hydride cells containing a pressure-responsive switch in the end cap assembly were fully charged in 15 to 30 minutes and charging was terminated when the pressure-responsive switch was biased into the high pressure condition. The pressure signal was consistent and reproducible even with extended cycling. Constant voltage charging method was shown to be more favorable when ambient temperature is above freezing. Constant current method is more effective when ambient temperature is below freezing. The slope of pressure rise and fall of AA NiMH consumer cells remained relatively constant during the course of cycling. The current-tapering effect when using constant voltage resulted in a lower pressure rise over time for the cell to become fully charged. The drop in current also produced lower temperature rise for the same charging period. Charging was demonstrated to be faster at higher voltages, although a higher cell temperature was also noted under such conditions.

As described above, it is known that the pressure inside metal hydride cells rises rapidly when cell charging is essentially complete. In particular, the rise in pressure, which follows gassing in the cell, precedes the damaging temperature rise that shortens cell cycle life. Thus it is desired to charge the cells in a manner that reduces the possibility of a destructive overpressure or overheating condition.

A constant current charging method or a constant voltage charging method or a combination method, for example, constant current followed by constant voltage, can be employed in accordance with aspects of the present invention. An alternating current charging method can be desirable, since the current is modulated, thus reducing the chance of overcharging, overpressure or overheating. No expensive and complicated charging control electronic circuitry is necessary.

The nature of the alternating current or voltage waveform is typically, but not exclusively, sinusoidal. Full or half wave rectification may be applied to the alternating current or voltage waveform.

Figure 8:
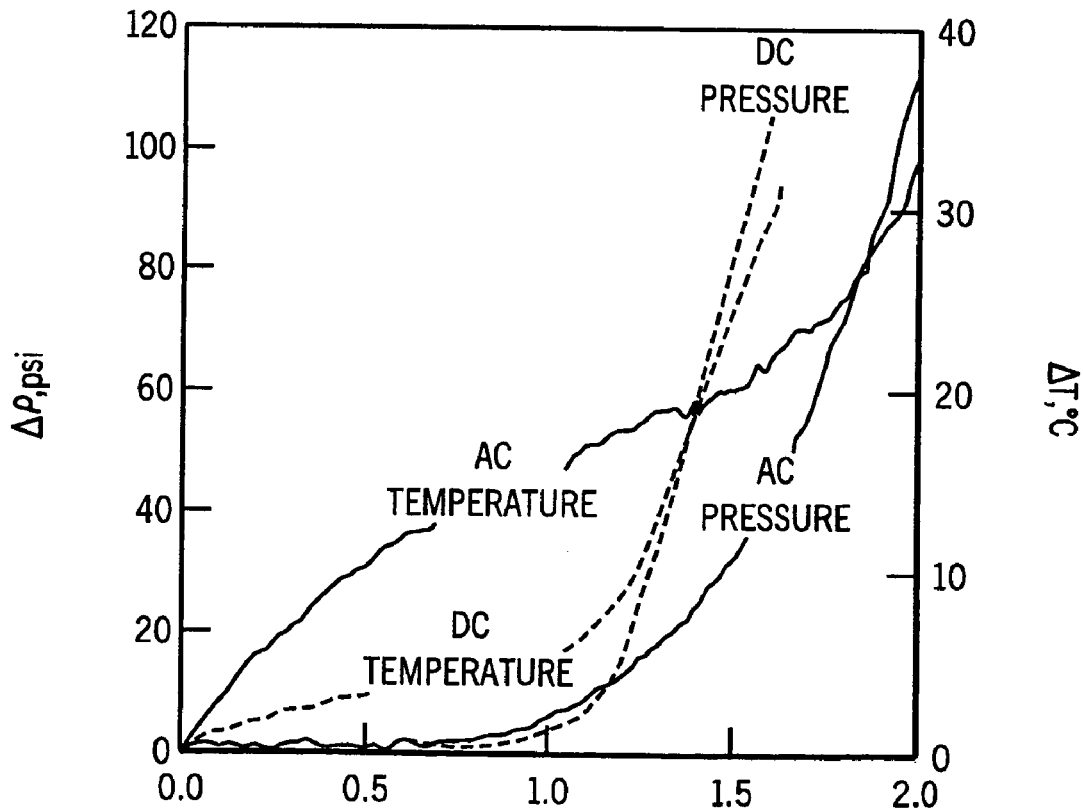
FIG. 8 is a graph plotting capacity (Ah) vs. $\Delta P$ (psig) for a nickel metal hydride cell during alternating current and constant current charge.

FIG. 8 illustrates the cell pressure and temperature for a 1600 mAh nickel metal hydride cell charged using an alternating current derived from common 60 Hz line power that was full wave rectified to yield a 120 Hz alternating current frequency. The change in cell pressure and temperature are lower at the end of charge compared with a constant, or direct, current charge.

Figure 9:
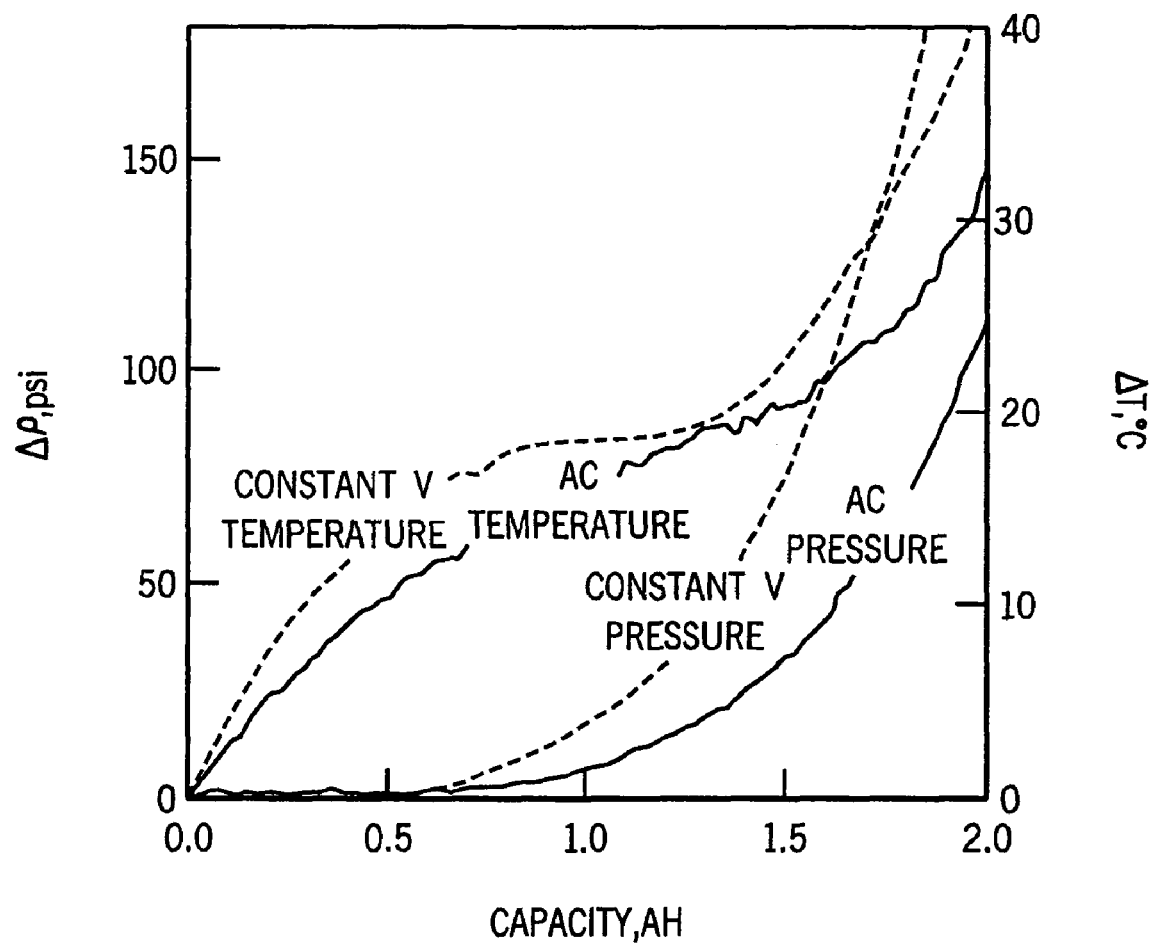
FIG. 9 is a graph plotting capacity (Ah) vs. $\Delta P$ (psig) for a nickel metal hydride cell during alternating current and constant voltage charge.

FIG. 9 shows the cell pressure and temperature for a 1600 mAh nickel metal hydride cell charged using an alternating current as in FIG. 8. The change in cell pressure and temperature are lower at the end of charge compared with a constant, or direct, voltage charge.

The examples illustrated herein utilize a full wave rectified current derived from common 60 Hz line power. Other embodiments encompassed by the present disclosure include full wave rectified alternating voltage or half wave rectified sinusoidal alternating current or voltage. Another embodiment is an alternating current or voltage charge of any frequency. Another embodiment is an alternating current or voltage comprised of any waveform, including square wave, triangle wave (or sawtooth wave), or any arbitrary waveform or combination of waveforms. Another embodiment is the combination of rectified and unrectified alternating current or voltage composed of any frequency or combination of frequencies, or any waveform or combination of waveforms. Advantageously, any of these charging methods may be utilized by a cell having a pressure-responsive switch as described above.

Figure 10:
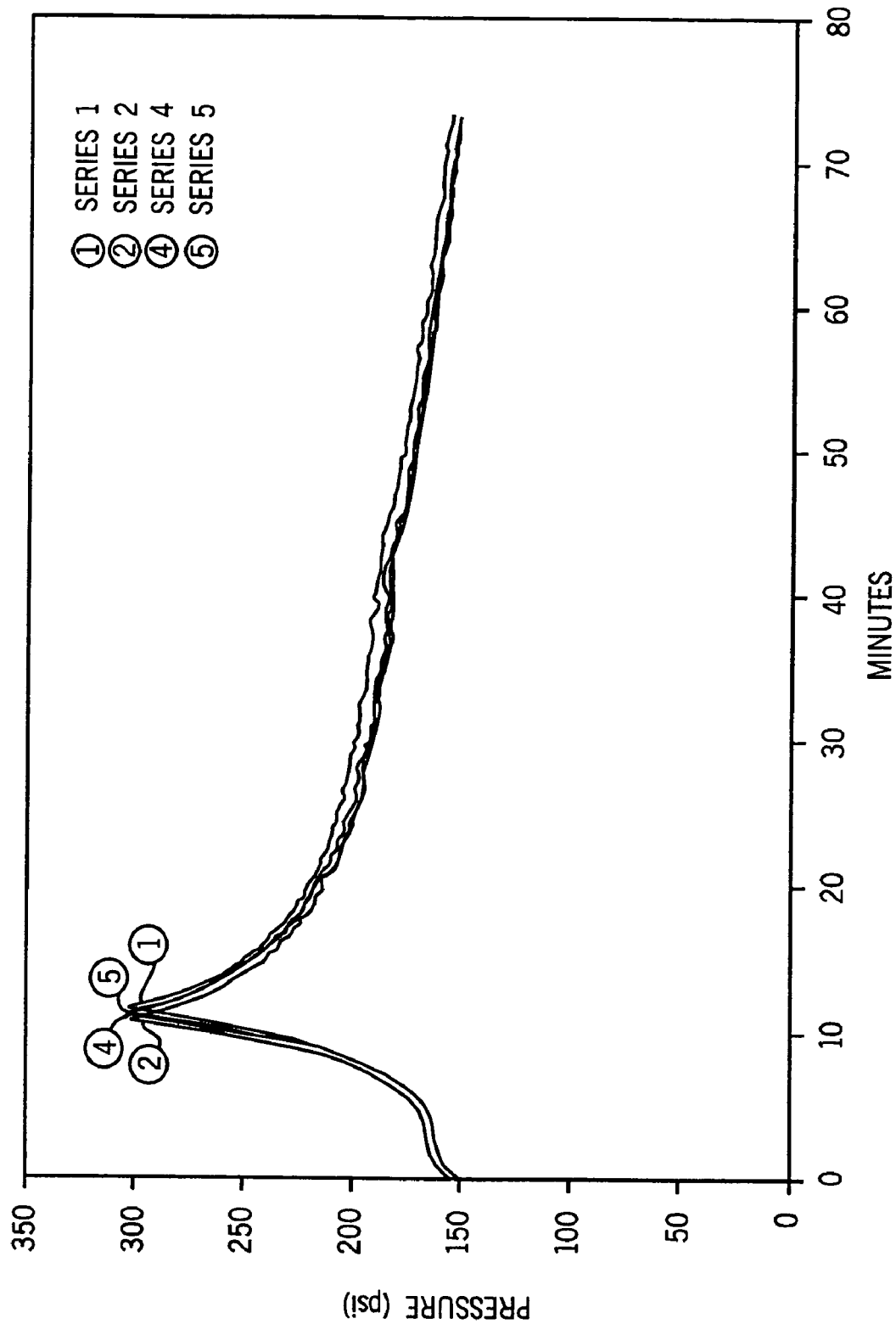
FIG. 10 is a graph plotting internal cell pressure (psig) vs. time (min) for a plurality of cells.

Referring now to FIG. 10, cell internal pressure vs. time is illustrated for a group of four 1600 mAh Nickel Metal hydride cells being charged with a constant voltage at 1.65V. The internal pressure rises to 300 psig as the cells reach full charge in 12 minutes. The pressure returns to the initial state following discharge of the cells. This demonstrates that the internal pressure of Nickel Metal Hydride cell rises and falls in a predictable manner, which can be used as a reliable signal to terminate charging of a high rate. Groups of cells can thus be charged and discharged reliably when pressure is used as a charge termination signal.

Figure 11:
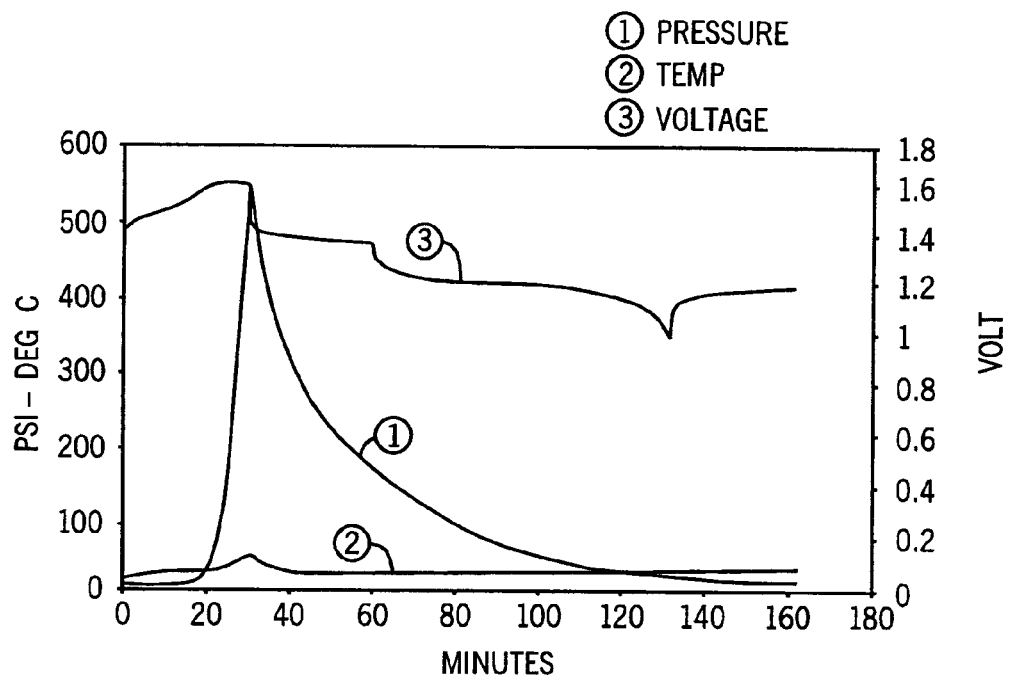
FIG. 11 is a graph plotting pressure, temperature, and voltage vs. time (min) for a cell during charging using a constant current charge, and subsequent discharging.

Referring now to FIG. 11, typical charging and discharging characteristics of a 1300 mAh NiMH cell were measured under a constant current charge of 3 A followed by a 1 A discharge to 1V. The pressure, temperature, and voltage were measured, and plotted vs. time. This illustrates that pressure is a much stronger signal for charge termination than temperature and voltage. Pressure rises at much faster rate than temperature and voltage, therefore pressure is a more suitable signal than temperature and voltage for charge termination.

Figure 12:
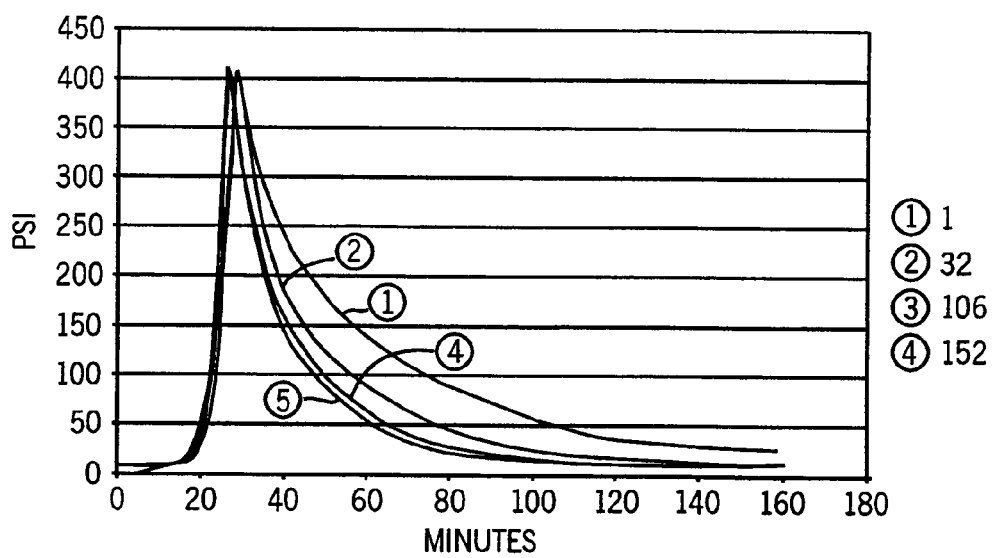
FIG. 12 is a graph plotting internal pressure (psig) vs. time (min) for various cycles during charging using a constant current charge, and subsequent discharging.
Figure 13:
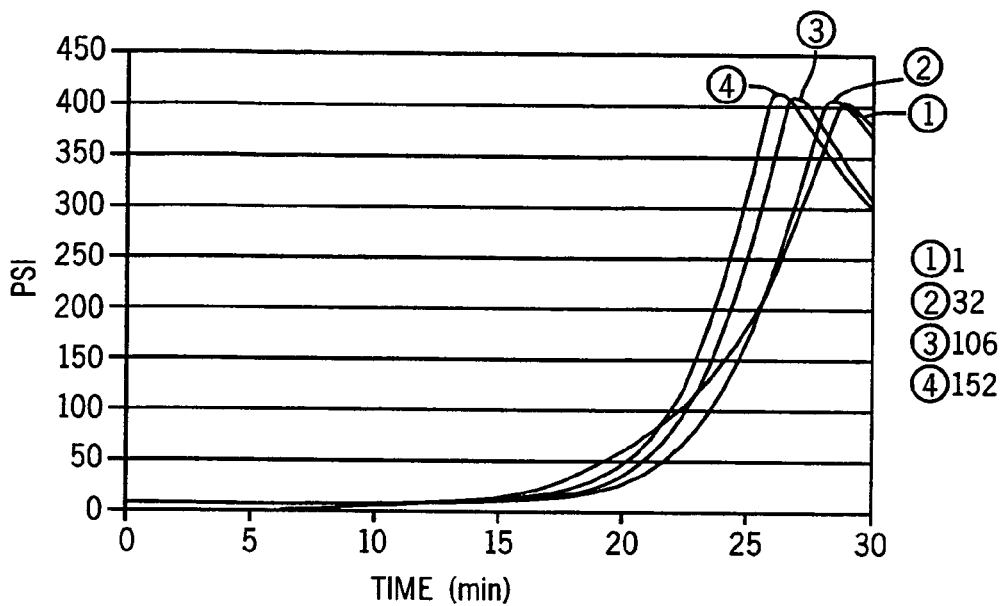
FIG. 13 is a graph plotting the pressure rise for the cell illustrated in FIG. 12 during charging.
Figure 14:
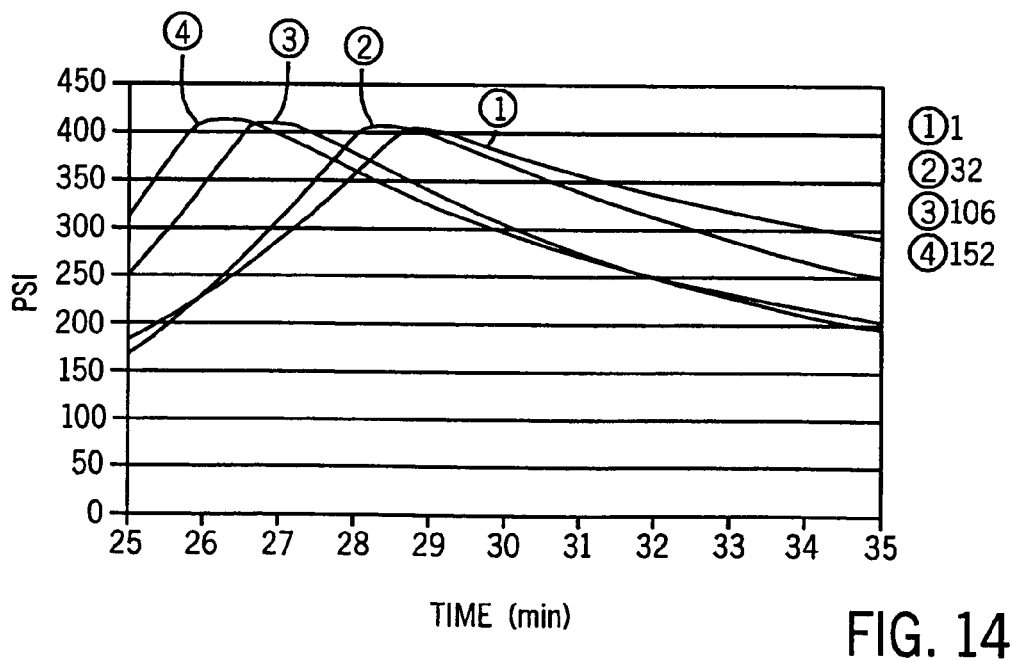
FIG. 14 is a graph plotting pressure fall for the cell illustrated in FIG. 12 during discharging.
Figure 15:
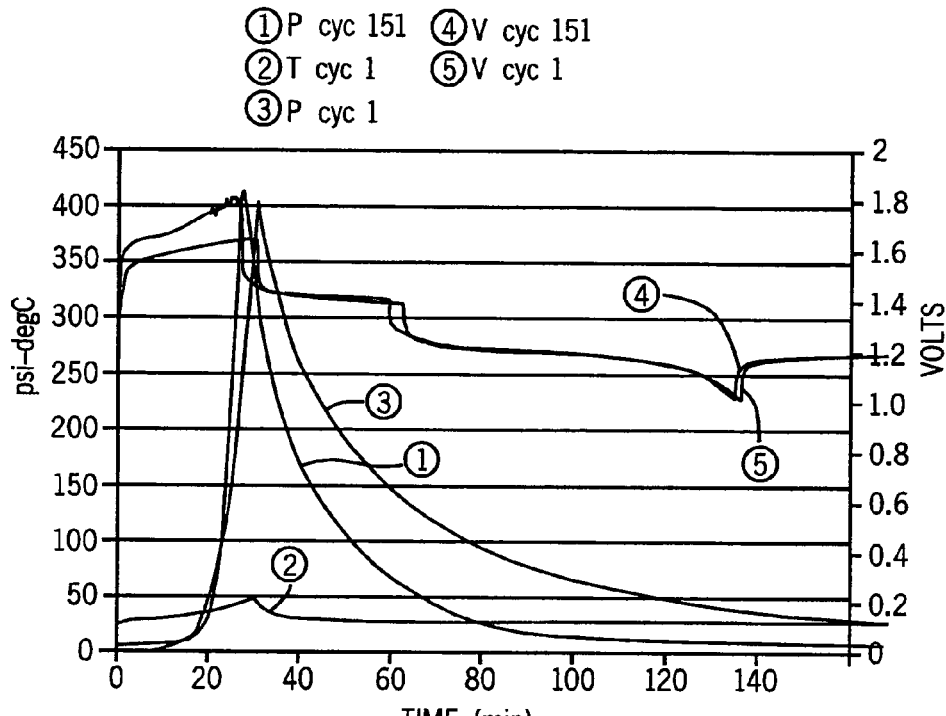
FIG. 15 is a graph plotting pressure and temperature vs. time for cells at different cycles under a constant current charge.

Referring now to FIG. 12-14, the slope of pressure rise and fall remained relatively constant during the course of cycling in comparison to the voltage illustrated in FIG. 15. This further indicates the reliability of pressure as an indicia for the charge termination point of a cell when it can be utilized.

Figure 16:
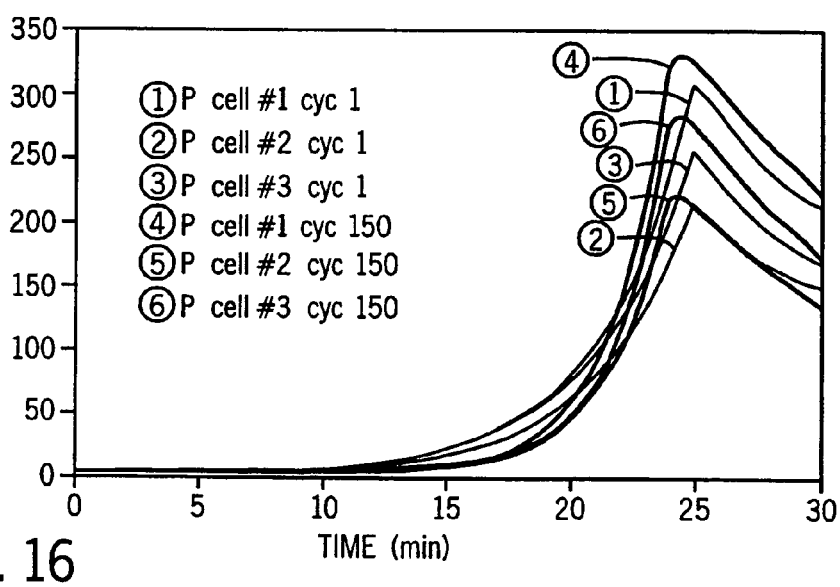
FIG. 16 is a graph plotting pressure vs. time for a plurality of cells at different cycles under a constant current charge.

Referring to FIG. 16, three 1600 mAh Nickel Metal hydride cells were subjected to a 3.7 A constant current charge and discharge for 150 times. The internal pressure of the cells was shown at cycle 1, and at cycle 150, and plotted vs. time. This further illustrated that pressure signal is reproducible with cycle life and different cell size and capacity.

Figure 17:
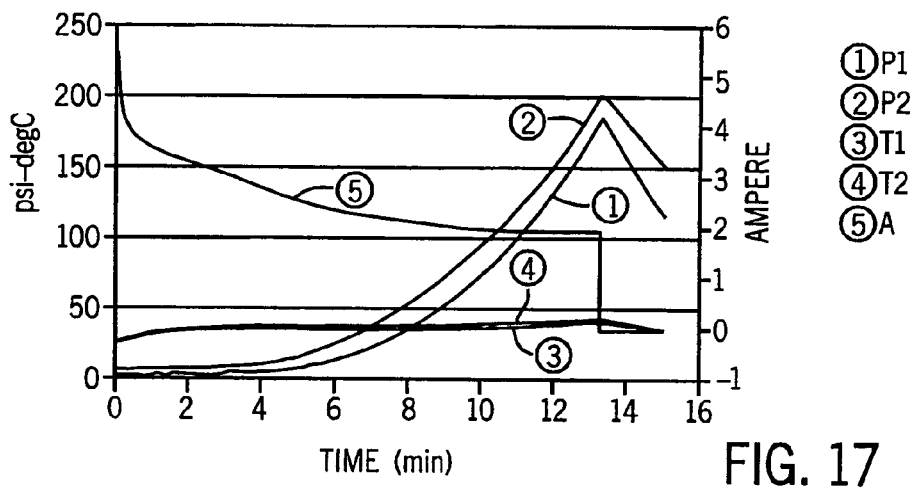
FIG. 17 is a graph plotting pressure, temperature, and current vs. time for plurality of cells under a constant voltage charge.

Referring to FIG. 17, two even smaller 550 mAh Nickel metal hydride cells were connected in series and charged with a constant voltage charge source at 1.65 V per cell. The internal pressure, temperature, and Amperage were measured and plotted vs. time.

Figure 18:
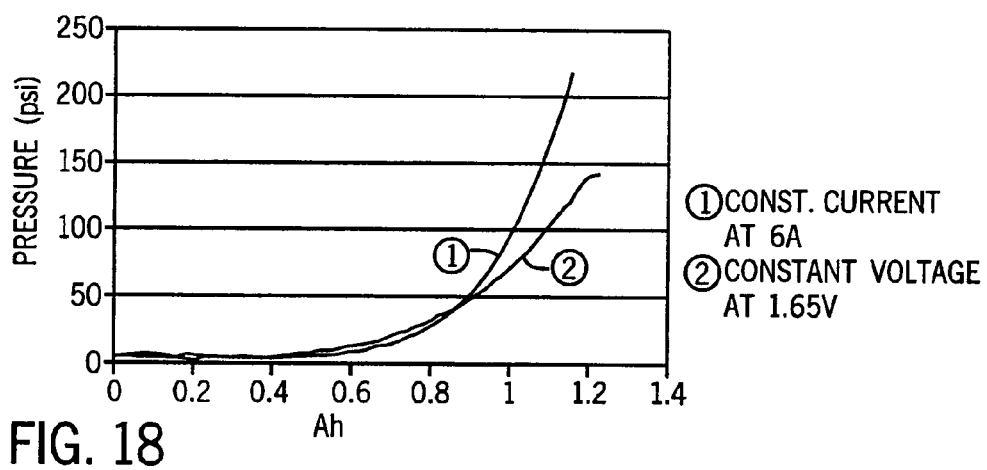
FIG. 18 is a graph plotting and comparing internal pressure vs. capacity during constant current charging versus constant voltage charging.
Figure 19:
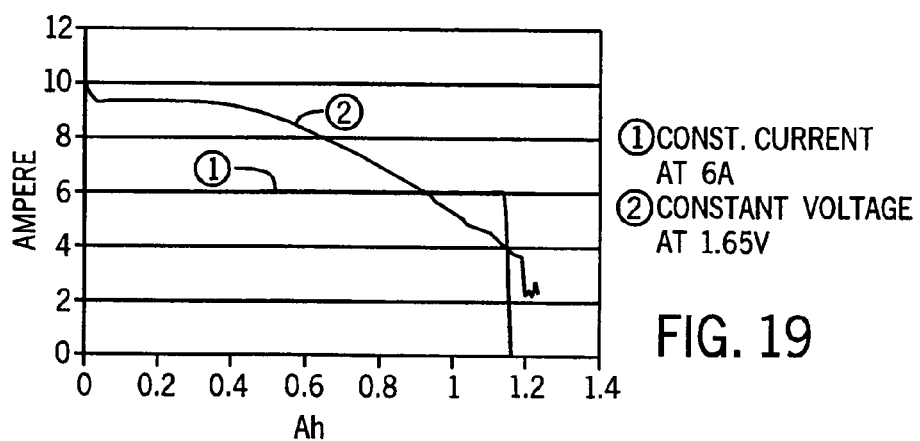
FIG. 19 is a graph illustrating and comparing the current profile of two cells during charging under constant voltage versus constant current.
Figure 20:
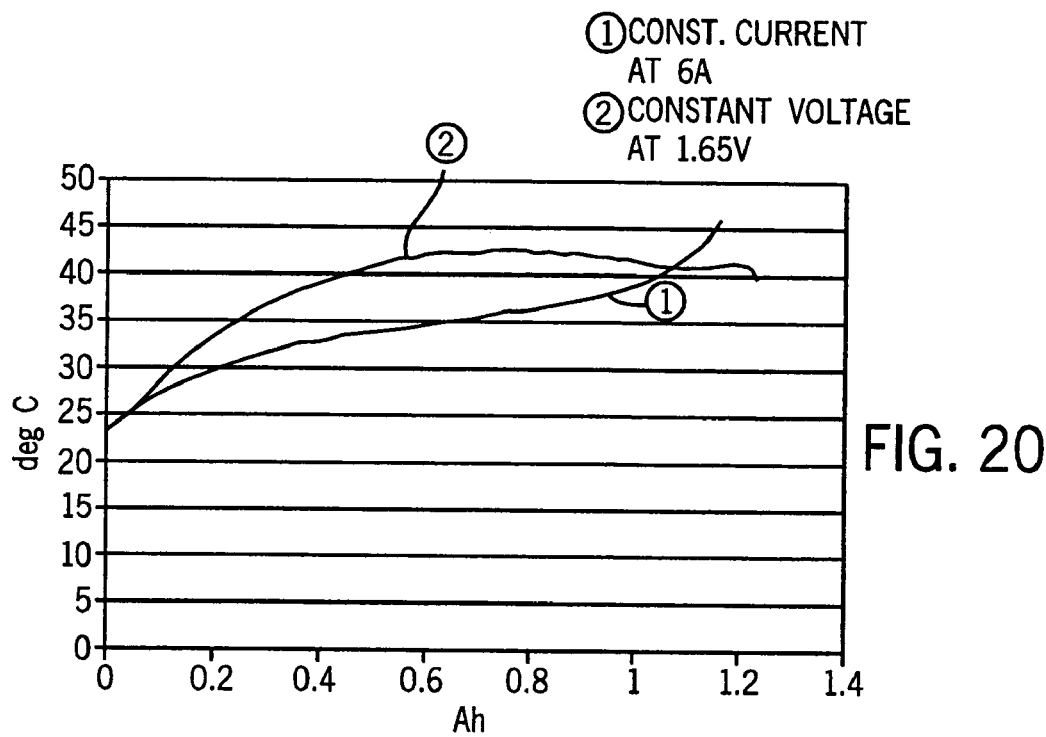
FIG. 20 is a graph plotting and comparing cell temperature vs. capacity for two cells charged under constant current versus constant voltage, respectively.
Figure 21:
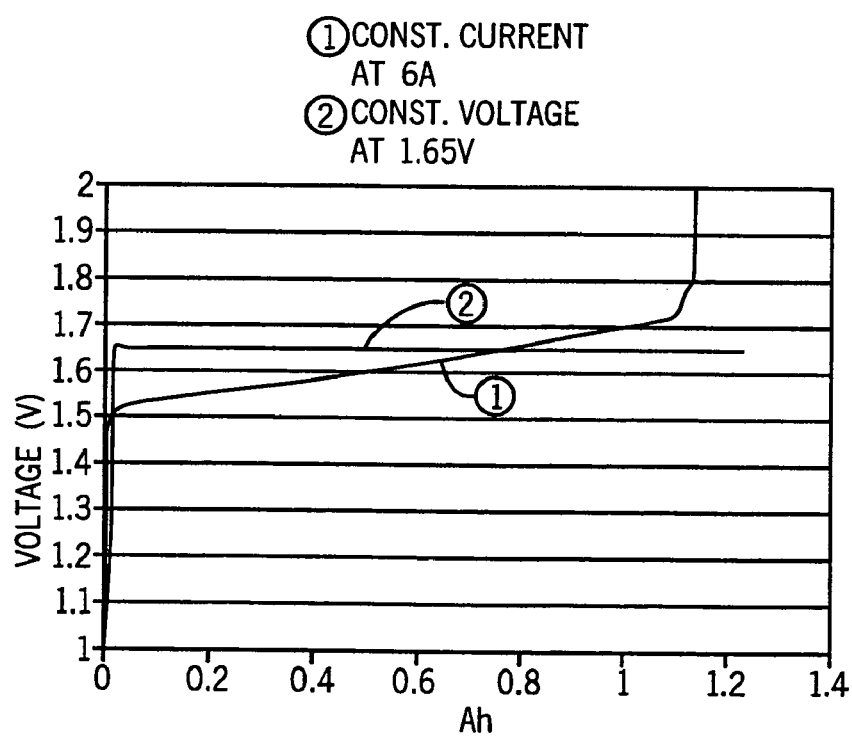
FIG. 21 is a graph plotting and comparing the voltage profile vs. time for the two cells illustrated in FIG. 20.

FIG. 18 illustrates internal cell pressure as a function of capacity for a first cell charged under a constant current at 6 A, and a second cell charged under constant voltage at 1.65V. FIG. 19 illustrates cell current as a function of capacity for the first and second cells. FIG. 20 illustrates internal cell temperature as a function of capacity for the first and second cells. FIG. 21 illustrates cell voltage as a function of capacity for the first and second cells. As illustrated, one significant advantage of constant voltage over constant current is the ability of charging current to taper towards then end of the charge as cell voltage rises closer to the applied voltage. The tapering effect results in a lower pressure rise and lower temperature rise at end of charge, thereby allowing the cell to become more fully charged. The drop in current also produces a net lower temperature rises for the same charging period.

Figure 22:
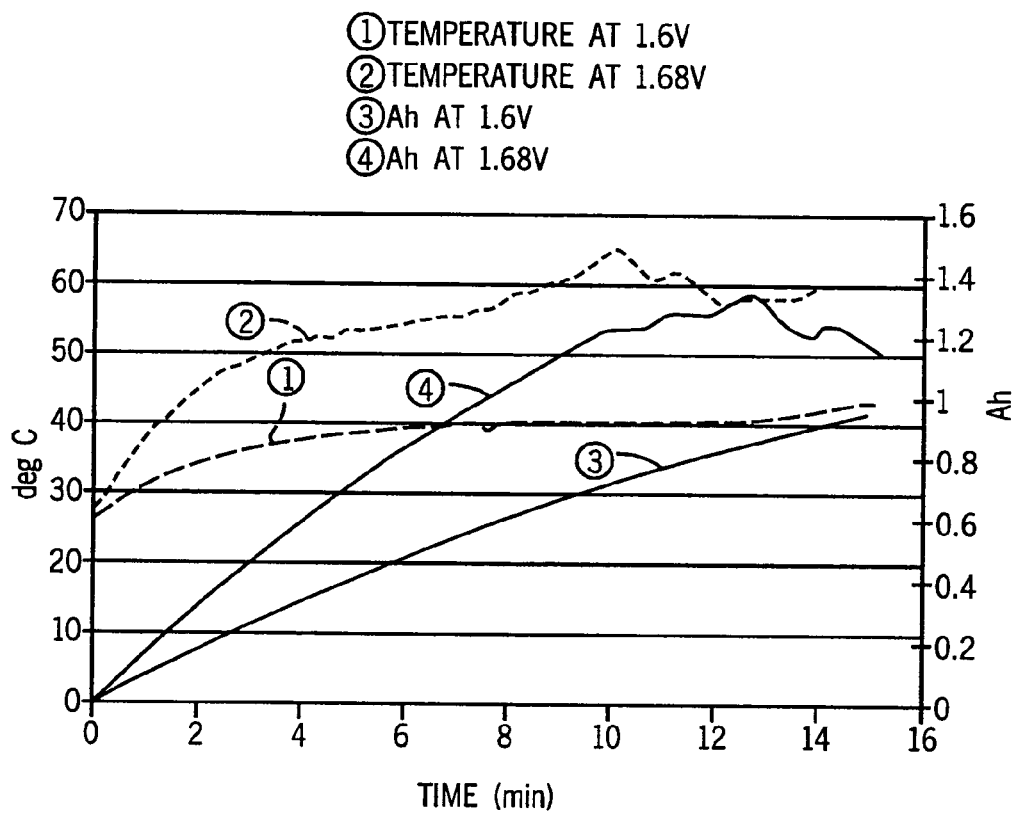
FIG. 22 is a graph plotting and comparing temperature and capacity vs. time during charging under varying constant voltages

Referring now to FIG. 22, cell temperature and charge input capacity are plotted as a function of time for two cells charged under two different voltage conditions. It may be observed that a higher charge voltage produces a higher charge current for a cell having the same internal resistance. Accordingly, charging is quicker at higher voltage, but the cell is also hotter at higher charge voltage. This figure further illustrates that at higher charge voltages, the cell reaches higher charge state sooner. This also shows that as the pressure activated switch opens in case of the higher charge voltage cell, cell temperature drops as the result of switch on-off condition. Cell continues to accept charge at this state but at lower temperature under intermittent current condition provided by the pressure switch. This is an advantage for having a pressure switch as a means for regulating end of charge condition.

Figure 23:
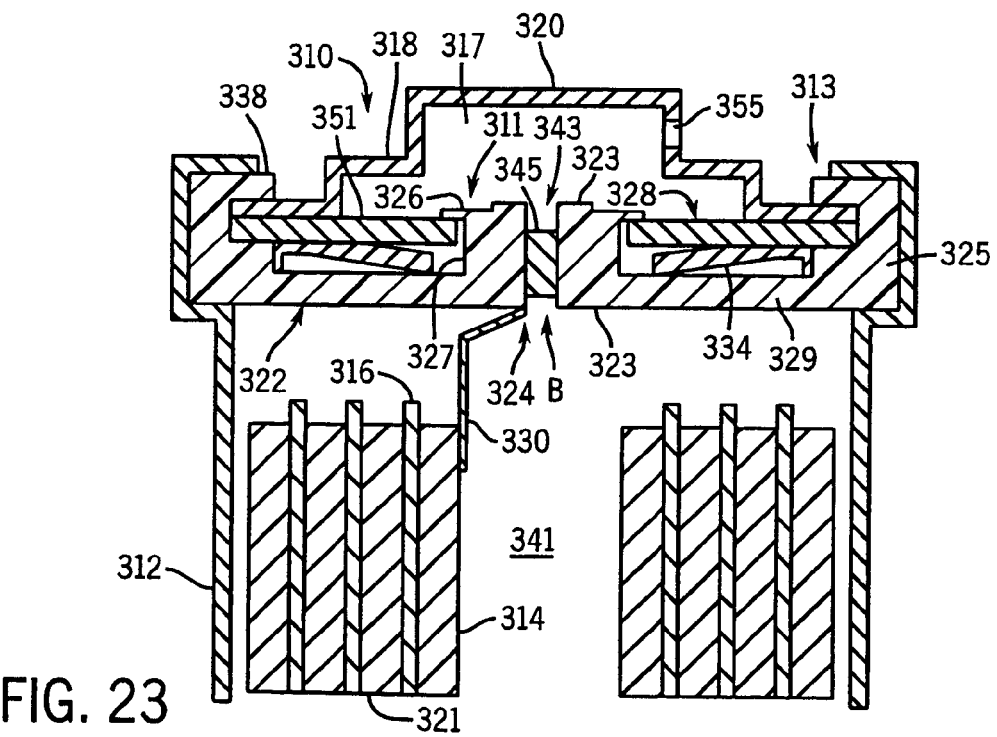
FIG. 23 is a sectional side elevation view of an end cap assembly containing a pressure-responsive switch and a pressure-release vent, constructed in accordance with an alternate embodiment, illustrated in a low pressure position.

Referring now to FIG. 23, an axially extending cell constructed in accordance with another alternative embodiment includes a can 312 having closed end (not shown) and an open end 313 disposed opposite the open end and axially downstream therefrom. A cap assembly 310 includes a positive terminal end cap 318 that is secured in the open end of the negative can 312 to provide closure to the cell. In particular, the end cap assembly 310 and the open end of the can 312 are adapted in size and shape such that the end cap assembly 310 is sealingly accommodated in the open end by crimping the negative can 312 during assembly of a cylindrical rechargeable metal hydride cell. The closed end of the can is conventional and is not shown.

A positive (e.g., nickel hydroxide) electrode 314 is in removable electrical connection with the positive terminal cap 318, as will become more apparent from the description below. The cell further contains a negative electrode 321 (e.g., hydride electrode) that is in electrical connection with the can 312, and an alkaline electrolyte (e.g., potassium hydroxide) alone or in combination with other alkali metal hydroxides. The electrodes are disposed in an internal cavity 341, and are separated by a separator 316. A cell comprising the can 312 and end cap assembly 310 can further comprise conventional positive 314 and negative 321 wound electrodes in its interior, although the relative size of these electrodes can be adjusted to meet the physical and electrical specifications of the cell.

The positive terminal cap 318 has a nubbin 320 that is sized and shaped to provide a positive terminal to the cell having a pressure-responsive switch 311. The pressure-responsive switch 311 comprises a flexible non-conductive mono-stable member in the form of grommet 322 adapted in size and shape to fit securely in the open end 313. Grommet 322 includes a radially outer seal 325, an inner hub 327, and an arm 329 that extends substantially radially and connects the seal to the hub. Grommet 322 further includes a centrally disposed opening 315 extending axially through the hub 327 in which is seated a conductive connector in the form of eyelet 324 having a pair of oppositely disposed radially extending outer flanges 323. The space between the outer surface of grommet 322 and inner surface of terminal end cap 318 defines a cavity 317 in the end cap assembly 310. Arm 329 extends radially through the cell, thereby reducing the volume of cavity 317 compared to cells whose arm extends radially and axially towards the negative end. The internal volume available for active cell components of cell 310 is also therefore increased to correspondingly increase the cell capacity. In accordance with this embodiment, the distance between the upper surface of the nubbin 320 to the lower surface of the grommet 322 is approximately 3.8 mm, thereby allowing a taller stack height of electrodes to be disposed within the cell.

Connector 324 is securely fixed in the opening of grommet 322 such that the conductive connector moves in concert with the grommet. A first annular conductive contact 326, which is a metal washer in accordance with the illustrated embodiment, surrounds the hub of connector 324 and has an upper surface in electrical contact with the upper flange 323. A second annular conductive contact 328 (which can also be a metal washer) surrounds the grommet and is positioned axially upstream and adjacent the first contact 326. The first and second contacts 326, 328 are cylindrical plates in FIG. 23 but they can be provided in other shapes, as described above. A spring member 334 is disposed between the upper surface of grommet arm 29 and the lower surface of contact 328 so as to bias contact 328 outwardly such that upper surface 351 of contact 328 is in electrical connection with the terminal cap 318, and in removable mechanical (and therefore electrical) connection with the bottom surface of the first contact 326, as will become more apparent from the description below. Spring member 334 is can be nonconductive.

The grommet 322 can be formed of any sufficiently flexible, nonconductive inert material that does not adversely impact the cell chemistry. Suitable materials include but are not limited to polypropylene, polyolefin and nylon and their equivalents.

The outer seal 325 of grommet 322 includes an upwardly and radially inwardly extending peripheral lip 338 that is shaped and sized to form a tight seal with the open end of the can to provide a barrier between the interior and the exterior of the cell. The lip 338 also partially defines a cavity in the outer seal 325 in which the outer end of terminal end cap 318 and second contact 328 are disposed. The lip 338 presents a radially outer convex surface to permit the can 312 to be crimped over the grommet 322 during assembly of the cell. When the axially downstream end of can 312 is crimped over the grommet 322 during assembly, a tight seal is provided between the grommet 322, second contact 328, and terminal end cap 318 to isolate the interior of the cell from the ambient environment. An optional sealant such as asphalt or tar can also be employed between the end cap assembly 310 and the can 312 to strengthen the seal.

A flexible conductive tab 330 electrically connects the conductive connector 324 to the positive electrode 314 in the interior of the cell. The conductive connector 324 can be an eyelet or rivet that is secured in the central opening by crimping at its ends to provide flanges 323 that secure the hub 327 of grommet 322 and the first contact 326. The conductive connector 324 is in electrical and physical contact with the first contact 326 thereby helping to secure the conductive connector 324 into position.

FIG. 23 illustrates the end cap assembly in a low pressure state, such that the grommet 322 is in its stable position. In this low pressure state, the positive electrodes 314 are in electrical connection with the positive terminal cap 318 via the conductive tab 330, connector 324, first contact 326, and second contact 328. Accordingly, the cell may be charged by introducing a recharging current or voltage to the cell. Advantageously, when internal pressure within the cell accumulates beyond a predetermined threshold, the grommet 322 flexes (reversibly) axially downstream along the direction of arrow B to bias the pressure-responsive from the first closed position illustrated in FIG. 23 to a second open position. It should be appreciated that the predetermined threshold may depend on the intended type of charge being used (e.g. constant current, constant voltage, etc. . . . ), and may be determined by the material selected for the grommet, and thickness and flexibility of the arm 329.

When the internal pressure within the cell exceeds the predetermined threshold sufficient to flex the grommet 322, the hub 327 is translated axially downstream, thereby also translating the first contact 326 axially downstream with respect from the second contact 328, and removing the electrical connection therebetween. As a result, an electrical connection at the nubbin 320 will not transfer to the electrodes 314 within the cell, and further charging is prevented until the overpressure situation subsides.

FIG. 23 also illustrates an optional safety system for venting excess pressure (gas) from the cell when in an overpressure condition. In particular, the conductive connector 324 can define a centrally disposed pressure release channel 343 extending axially there through. A plug 345, which can be made of a rubber or other suitably compliant material, is disposed in channel 343 and provides a seal to prevent pressurized gas from flowing through the channel 343. Accordingly, as gas is produced at the electrodes, pressure accumulates within the cell interior 341. Once the pressure reaches a predetermined maximum threshold, plug is biased axially downstream along the direction of Arrow B and into end cap interior 317. As the plug 345 will not reseal channel 343, the venting mechanism illustrated in FIG. 23 is irreversible. The end cap 318 defines one or more outlets 355 extending therethrough to enable the gas to flow from the end cap assembly 310 to the outside environment. The outlet 355 can be secured against undesired leakage with a seal (not shown) adapted in tensile strength to yield at a pre-selected pressure level to release gas from the cell. The seal can be reversible or irreversible. Alternatively, as illustrated, outlet(s) 355 may always be open to the environment, in which case an airtight seal to the interior of the cell is maintained by blocking the pressure release channel 343 during normal operation.

Figure 24:
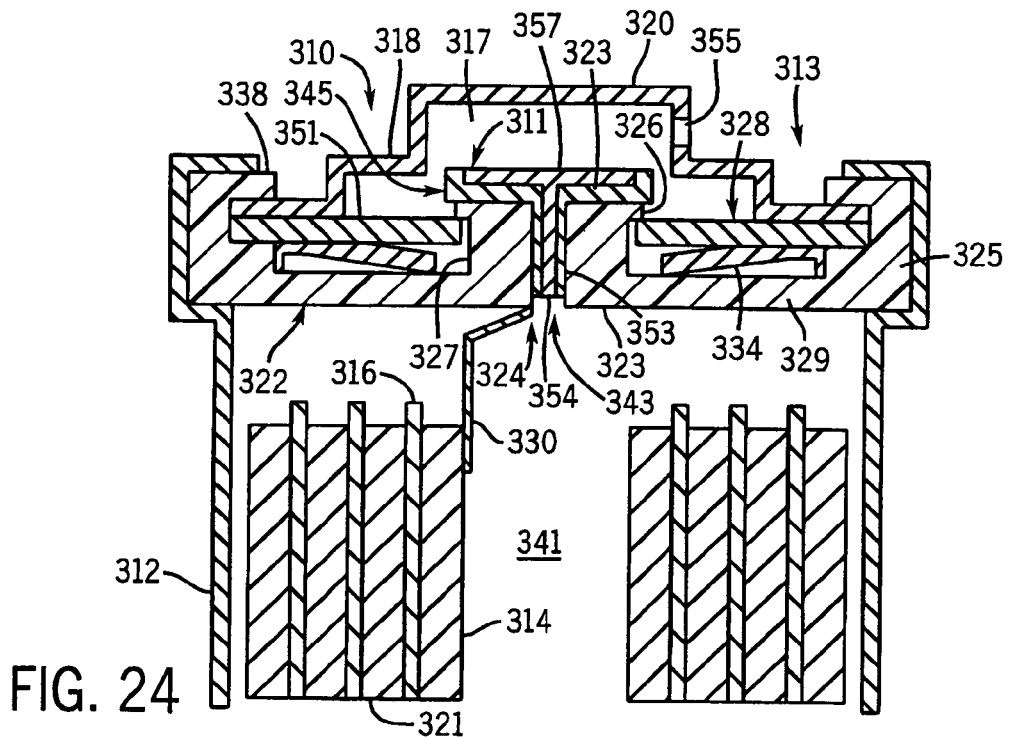
FIG. 24 is a sectional side elevation view of an end cap assembly containing a pressure-responsive switch and a pressure-release vent, constructed in accordance with another alternate embodiment, illustrated in a low pressure position.

Referring now to FIG. 24, cell 310 is illustrated having pressure responsive switch 311 as illustrated in FIG. 23, but with a different venting structure. In particular, plug 345 includes a neck 353 that extends axially through channel 343, and defines an internal axially extending channel 359. A transverse arm 357 is disposed at the axially outer end of plug 345, and provides a seal to channel to prevent gas from escaping into chamber 317 during normal operation. If the internal cell pressure reaches a predetermined threshold, however, arm 357 will rupture, thereby enabling the pressurized gas to exit the cell via channel 359 and aperture 355. Because arm 357 ruptures during operation, the venting apparatus is irreversible.

Figure 25:
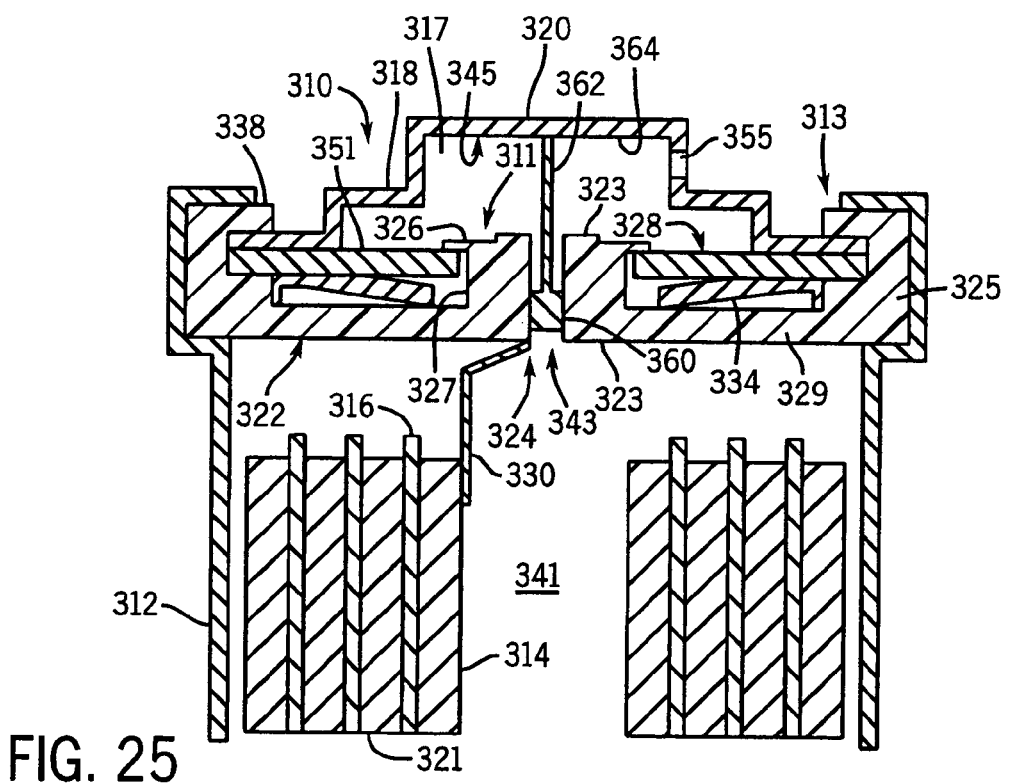
FIG. 25 is a sectional side elevation view of an end cap assembly containing a pressure-responsive switch and a pressure-release vent constructed in accordance with yet another alternate embodiment, illustrated in a low pressure position.

Referring now to FIG. 25, cell 310 is illustrated having pressure responsive switch 311 as illustrated in FIGS. 23 and 24, but with a different venting structure. In particular, plug 345 includes a seal member 360 that is disposed within channel 343 and prevents pressurized gas from flowing into chamber 317. Seal member 360 is connected via axially extending arm 362 to a base plate 364 that abuts the inner surface of nubbin 320. Accordingly, when the internal pressure reaches a predetermined threshold to displace grommet 322 to open the electrical contact between members 326 and 328 as described above, seal member 360 is displaced axially upstream with respect to grommet 322 and eyelet 324. Once seal member 360 is clear of the lower surface of eyelet 324, pressurized gas is able to flow through channel 343 and exit the cell via aperture 355. If the vent plug base plate 364 merely abuts the nubbin 320, but is not attached to nubbin 320, the plug will collapse within the cell during venting, thereby rendering the plug unusable for future use. However, base plate 364 may alternatively adhere to the inner surface of nubbin 320, in which case the structural integrity of plug 345 would be maintained during venting, thereby rendering plug 345 reversible.

It is recognized that high currents are typically utilized when fast charging cells, which produces heat within the cell, thereby increasing cell temperature during charging. Excessive temperatures have been found to damage conventional cell components. Accordingly, the development of larger cells that can be fast charged has been limited by the temperatures that the cells can withstand. Many conventional high power applications would benefit from larger rechargeable cells, such as sub C size cells used in, for example, power tools, and electric vehicle batteries.

There are several battery systems competing for dominance in electric vehicles, including lead acid, nickel cadmium (NiCd), lithium ion, zinc air and nickel metal hydride (NiMH). To be acceptable to the driving public, it is desirable to minimize the time required to charge the batteries, perhaps no more time than is required to fuel existing vehicles with gasoline. This is an important challenge that has historically limited the acceptance of an electric vehicle battery system.

As described above, an electrochemical cell, especially NiMH, including a pressure switch that limits overcharge can be charged at constant voltage. The combination of the pressure switch and the constant voltage method of charging permits the cell to be charged at high rates. This decreases the time needed to charge a cell, which is a large advantage for a variety of applications and devices.

For example, large cells with this in cell charge control mechanism (i.e., pressure responsive switch) can be used in electric vehicle or hybrid electric vehicle batteries. Without limiting the scope of the present invention, batteries comprised of cells with in-cell charge control can range in size from 19 cm to 39 cm in length, 8 cm to 17 cm in height and 7 cm to 11 cm in width. These sizes are typical of those being developed commercially. It is, nonetheless, desirable to increase a cell's tolerance of elevated temperatures regardless of its size.

One aspect of the present invention recognizes that judicious selection of cell component materials reduces or eliminates the detrimental effects of fast charging. Materials capable of providing functionality at high temperatures enable the cells to be charged at higher rates. Furthermore, it is desirable to design current carrying components of the cell to minimize internal cell resistance, as the heat produced by a cell during a high rate charge increases as the cell resistance increases. It is therefore desirable to provide low-resistance and heat-stable materials for fast charging. For example, in pressure responsive switches of the type described above, it may be desirable for the grommet, plug, insulator, pressure stop, and any other nonconductive components that are exposed to elevated temperatures during fast charging to comprise a thermally stable material. Otherwise, the components may fail during operation. It has been determined that certain properties of polymer materials allow the cell to function at high temperatures. In one embodiment, a polymer having "dry as molded" tensile strengths greater than 75 MPa, % elongation at break less than or equal to 50%, and heat deflection temperature at 263 psi greater than or equal to 100 degrees, Celsius, offers sufficient functionality at the elevated temperatures likely to be experienced during fast charging.

Figure 28A:
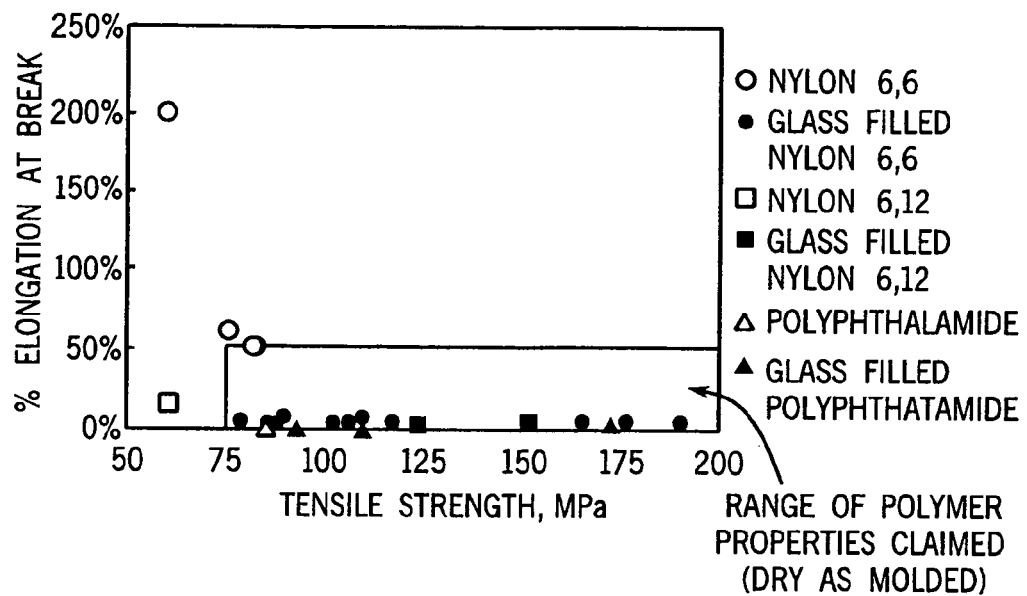
FIG. 28A is a graph illustrating % elongation at break vs. tensile strength for polymers usable in rechargeable cells in accordance with an aspect of the present invention.
Figure 28B:
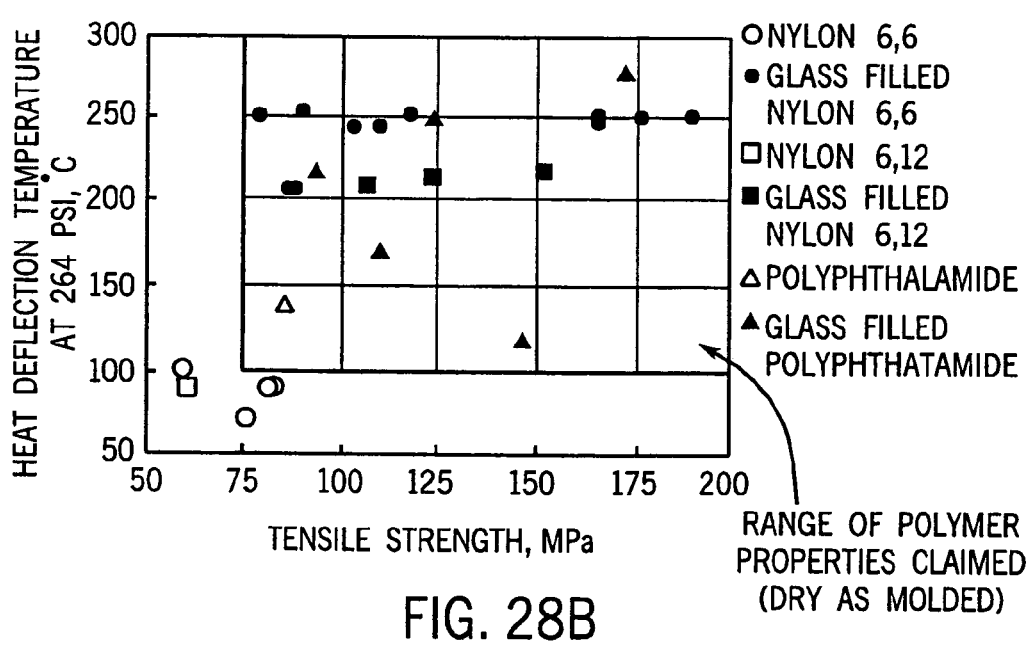
FIG. 28B is a graph illustrating heat deflection temperature vs. tensile strength for polymers usable in rechargeable cells in accordance an aspect of the present invention.

For example, FIG. 28A plots % elongation at break as a function of tensile strength, and FIG. 28B plots heat deflection temperature as a function of tensile strength. FIGS. 28A and 28B illustrate that glass filled polyamides, such as glass filled nylon 6,6, glass filed nylon 6,12, and glass filed polyphthalamide satisfy the above-mentioned characteristics and are desirable for use in nonconductive cell components that will be exposed to elevated temperatures when fast charging. In some cases, it may be further desirable for the separator of the cell to be thermally stable, such as by using a polypropylene, or blended, or surface modified, or modified polypropylene.

As discussed above, reducing cell resistance is desirable to limit the temperature increase during charging. For instance, highly conductive nonferrous alloy materials could be used for the current carrying metal components to lower the cell resistance, especially copper alloys such as beryllium-copper. Alternative metals having high thermal and electrical conductivity could be used, including but not limited to silver plated electrical contacts or gold plated or nickel contacts. Some current carrying cell components are also exposed to alkaline electrolyte. It is desirable that these components, in addition to being highly conductive, also be chemically resistant to strongly basic solutions. Nickel or nickel alloys have been found to produce desirable results due to their high thermal and electrical conductivity and low cost. Reduced resistance of current carrying components, or other components in direct contact with the current carrying components, may be achieved by providing larger electrode cables, connectors or contacts, increasing heat transfer.

It should be appreciated that the embodiments described above apply to, among others, all NiMH cells, including larger sized cells (e.g., size AAA, AA, and sub C) along with small format NiMH cells, for example button cells, coin cells and smaller cylindrical cells, such as N and AAAA size cells. It is intended that small size cells include those cells having volumes less than 3 $cm^3$. One having ordinary skill in the art will appreciate that the embodiments of the invention as discussed above could be implemented in both larger sized NiMH cells and smaller sized NiMH cells. When used in combination with smaller sized NiMH cells, fast charging of the cells within a few minutes is attainable. This increases the cell's usefulness, especially in applications of wireless devices such as GSM phones, PDAs, hearing aids, and headsets.

It should be appreciated that a plurality of cells could be installed in a battery pack and connected in series within a charger that is configured to supply a constant voltage or constant current charge to the cell. In particular, referring now to FIGS. 26A-26C, various examples of such battery packs 370 include a plurality of cells 372 arranged in one or more strings, wherein each cell may contain a pressure responsive switch, in accordance with any of the aforementioned embodiments, depending on the type of connection between the cells and strings.

FIG. 26A illustrates a battery pack 370 having a string 371 of cells 372 that are connected to a charger circuit 374 in series, such that the termination of charging contacts in any one of the cells will terminate charging of each cell in the series. Accordingly, it would be desirable to install the pressure responsive switch in the cell having the smallest charge capacity to ensure that none of the cells will become overcharged. Alternatively, it may be desirable to install a pressure responsive switch in all cells 372 being charged in series to ensure that none of the cells become overcharged.

FIG. 26B illustrates a battery pack 370 having a string 371 of cells 372 that are connected to the charger circuit 374 in parallel, such that a disconnection in the charging circuit of one cell will not discontinue the charge to all cells, but rather will increase the charging current supplied to each cell 372. Accordingly, if overcharging of the cells is a concern, a pressure responsive switch should be installed in each cell 372.

FIG. 26C contemplates that a battery pack 370 could include one string 371 of cells 372 connected in series, as illustrated in FIG. 26A, or could include one string 371 of cells 372 connected in parallel, as illustrated in FIG. 26B, or alternatively could include more than one string 371 and 373 of cells 372 connected in series, wherein each string 371 is connected in parallel. In this embodiment, the pressure switch disposed in any given individual cell 372 of string 371 will cease charging for all cells in that string. However, because strings 371 and 373 are connected in parallel, cells 372 in the remaining string 373 will continue charging until the pressure responsive switch in one of the cells of string 373 is actuated. It should be further appreciated that any number of strings may be connected, depending on the desired discharge capacity of the battery pack 370.

In conventional battery packs, in order to maximize safety and performance, the cells must be carefully matched in capacity to avoid overcharging or overdischarging (and driving into reversal) at least once cell in the battery pack. It has been found that NiMH cells containing a pressure responsive switch protect against overcharge and overdischarge of individual cells in a battery string, as described above. This eliminates the requirement of carefully matching cells and enables a battery pack to be charged in only a matter of minutes.

Another advantage of the battery packs illustrated in FIGS. 26A-26C is the ability for the cells a string to recover their capacity after only a few charge-discharge cycles after one or more of the cells have been discharged to a greater extent than the other cells in the string. Furthermore, the recovery of the cells occurs without overcharging the other cells in the battery pack, as would occur in conventional battery packs.

For example, referring to FIG. 27, two matched cells are connected in series during cycles 1-8, and the charge and discharge capacity of the battery remains relatively constant. At cycle 9, a pair of mismatched cells (one of which having only a 25% charging capacity) are connected in series. When the cells are charged, one cell has a greater charge than the other. During the discharge cycle, the greater-charged cell is discharged at a greater rate than the lesser charged cell in order to maintain the desired output of the battery pack. Accordingly, the greater-charged cell will accept more than 25% charge in the subsequent charging cycle, and the capacity of the lesser-charged cell will begin to catch up with the capacity of the greater-charged cell. This trend will continue for only a few more cycles (5 cycles total in accordance with the illustrated embodiment) until the two cells reach equilibrium. Of course, the number of cycles necessary will depend at least partially on the difference of capacity of the cells in the string, it being appreciated that a 75% capacity cell in the same string as a 0% capacity cell is one of the more extreme situations. It may be desirable to include a pressure responsive switch in the greater-charged cell, or potentially both cells during operation.

In accordance with an alternative embodiment, it is recognized that a user may desire a shorter charging time, even if this results in a slightly reduced cell capacity during use. While the industry trend is to constantly strive to increase the capacity of the cells, the present embodiment recognizes that it may be desirable to reduce the capacity of the rechargeable cells, for instance by manufacturing electrodes of shorter lengths, or lesser thicknesses, thereby leaving a void in the active volume portion of the cell. The reduction of active volume in rechargeable cells (e.g., to achieve a capacity of 700-1500 mAh for size AA cells, and 200-700 mAh for size AAA cells) has been found to decrease the charge time to only a few minutes when charged at constant voltage for cells with a pressure responsive switch constructed in accordance with any of the embodiments described above.

Figures 29, 30:
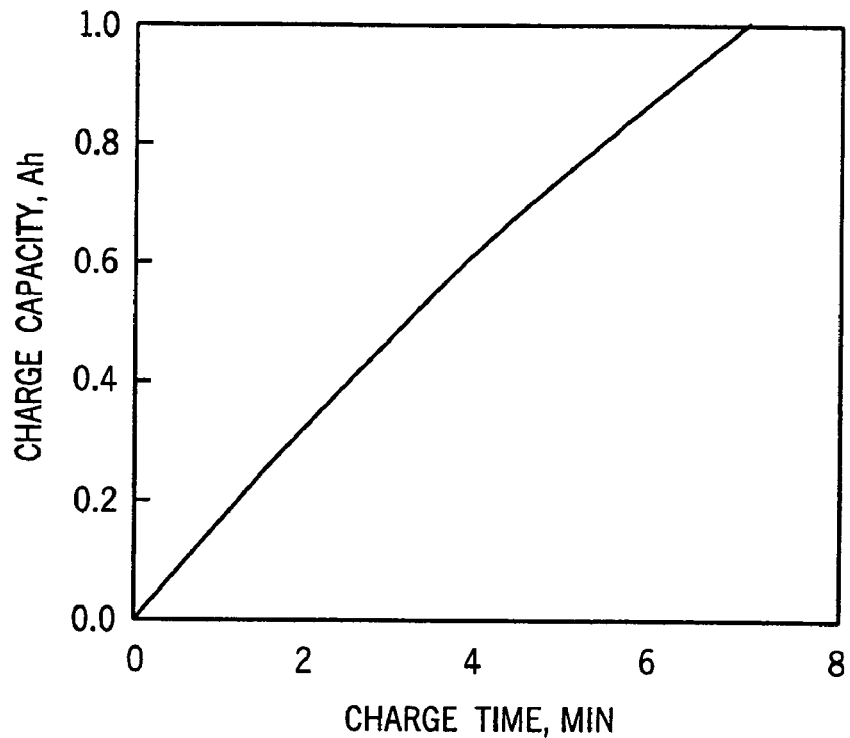
FIG. 29 is a graph illustrating charge capacity vs. charge time for rechargeable NiMH cells having a reduced active volume in accordance with an alternative embodiment.
FIG. 30 is a chart comparing characteristics of a NiMH size AA cell constructed in accordance with the embodiment described with reference to FIG. 29 compared to supercapacitors having similar volume.

Such charge times render a NiMH rechargeable cell more competitive with the fast charge time of supercapacitors while preserving the advantages inherent to a battery. For example, FIG. 29 illustrates the charge capacity as a function of charge time. The charge capacity accepted by a size AA NiMH cell having a pressure responsive switch in accordance with any of the above-described embodiments is illustrated. As illustrated, the cell is charged to 800 mAh after only 5 minutes of charging, and 1 Ah after only 7 minutes of charging. One benefit of a NiMH cell is its relatively flat discharge voltage, while supercapacitors exhibit a steeply sloping discharge voltage curve.

Other advantages of a NiMH AA cell are illustrated in FIG. 30. Since supercapacitors are not offered commercially in AA sizes, comparisons are made between NiMH AA cells and supercapacitors of similar volume. NiMH AA cells offer capacities and energy densities several orders of magnitude greater than supercapacitors, even for NiMH cells with only 1.3 Ah nominal capacity. NiMH cells further have a low rate of self-discharge compared to supercapacitors. The relative capacity loss is 30 to 350 times greater for supercapacitors than NiMH cells. Supercapacitors lose 50% of their capacity between 5 and 51 hours, compared to over 2 months for NiMH cells. A NiMH cell having a decreased volume of active material thus provides a user with a cell providing at least as much run time as commercially available alkaline cells within only a few minutes from commencing charging.

While the rates of change in voltage and temperature have been used in accordance with conventional charge termination systems, and are theoretically usable to provide a charge termination point, these values change slowly or lag behind the actual charging of the battery. Accordingly, these prior art systems risk overcharging the cell, thus causing potential hazards, unless the battery is charged at a slow rate, which is undesirable to the end user. As described above, it is desirable in accordance with one aspect of the invention to provide a constant voltage charge less than or equal to approximately 1.65 V during fast charging.

Figure 31:
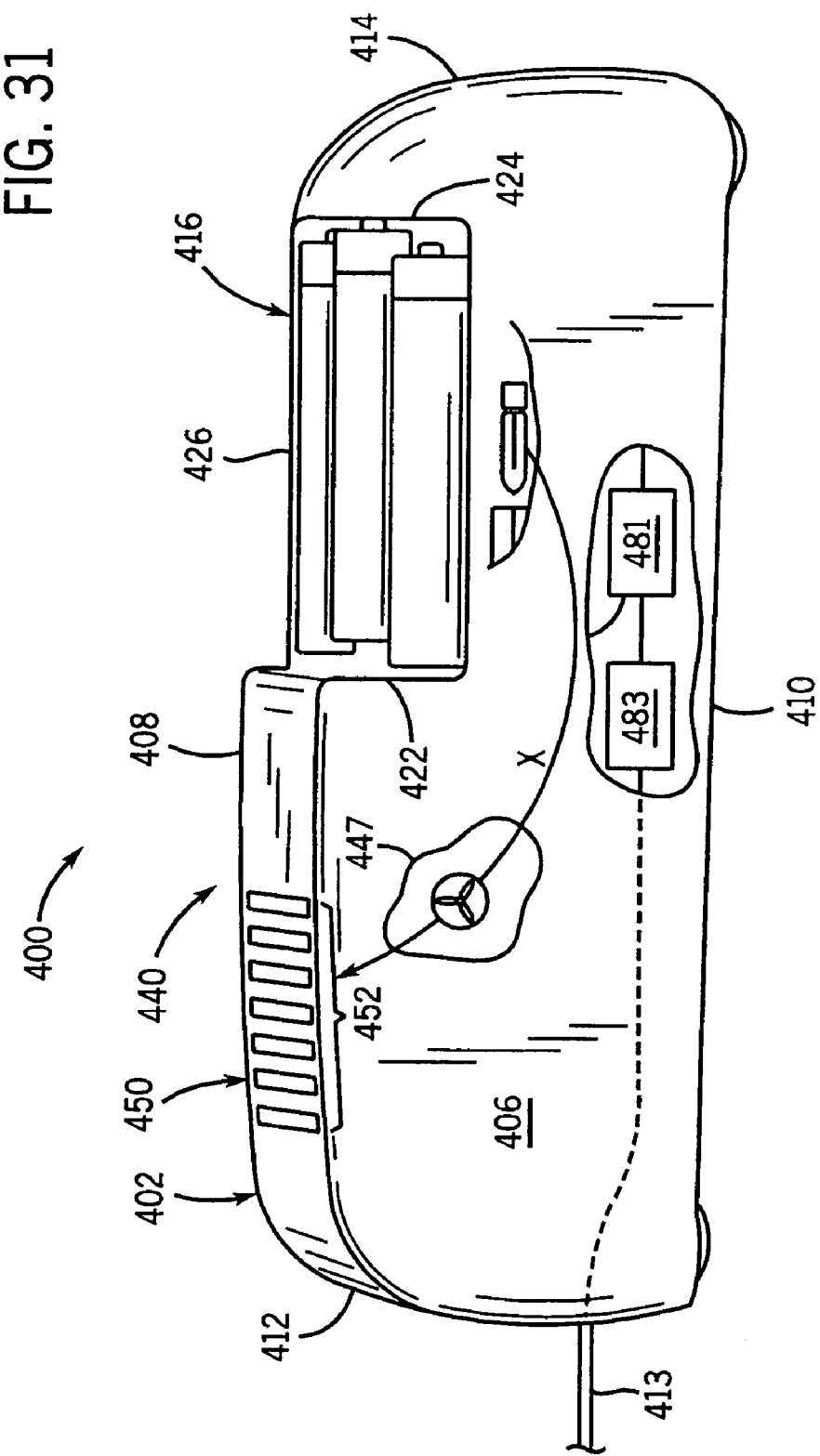
FIG. 31 is a schematic side elevation view of a battery charger having a portion cut away, the battery charger incorporating an air moving system and thermal cutoff system constructed in accordance with an alternative embodiment.
Figure 32:
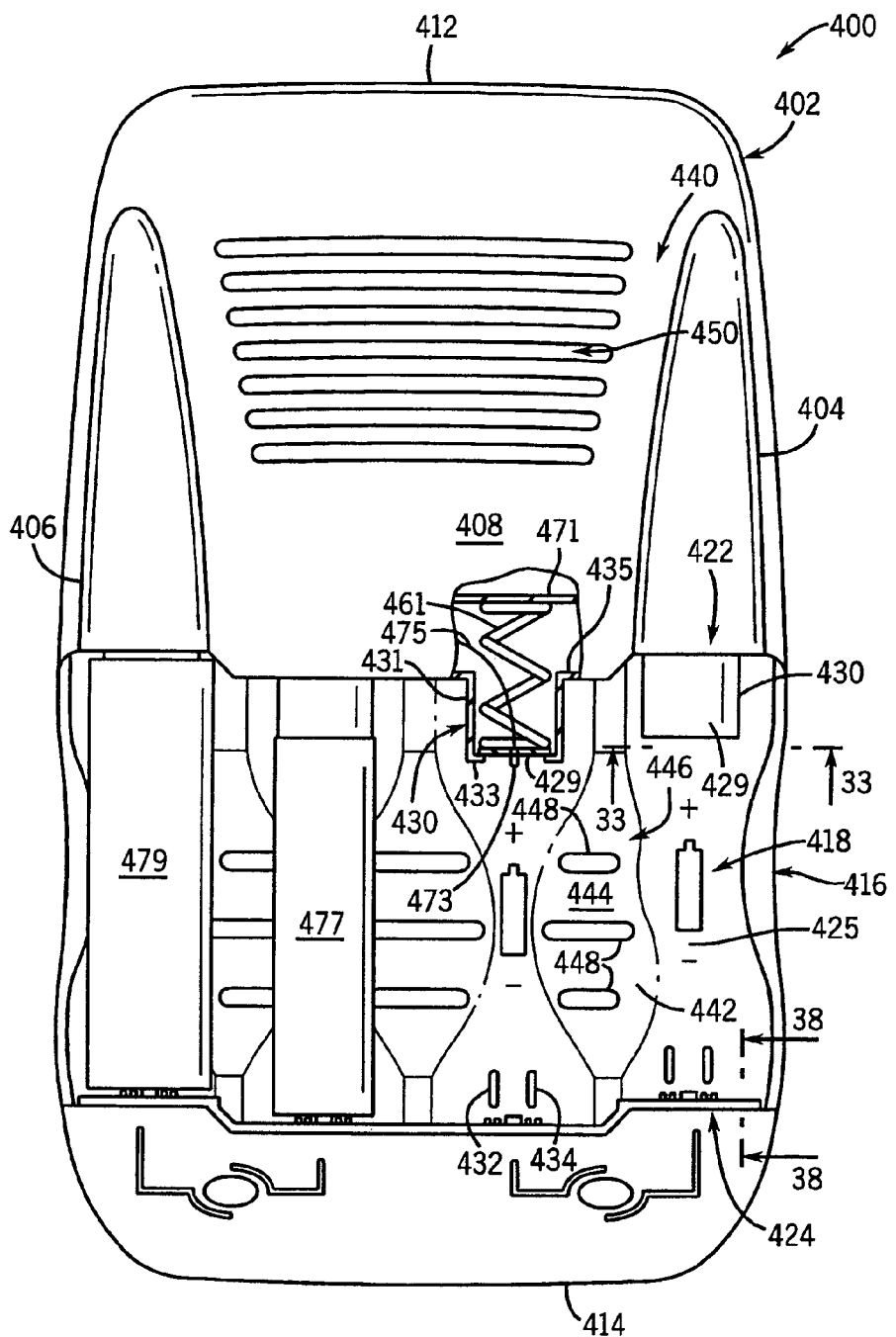
FIG. 32 is a top plan view of the charger illustrated in FIG. 31 having a portion cut away.

Referring now to FIGS. 31-32, the present inventors recognizes that exposing a cell to excessive temperatures during charging contributes significantly to internal cell pressure, thereby reducing the cell's charge capacity and prematurely activating a pressure-responsive switch of the type discussed above.

An axially extending charger 400 is illustrated having a generally rectangular (and slightly rounded) housing 402 defined by axially extending side walls 404 and 406, upper wall 408, base 410, and first and second laterally extending end walls 412 and 414, respectively. An electrical lead 413 extends from housing 402 and has a standard plug that is received by a conventional electrical receptacle to provide power to the charger 400. Charger 400 is designed to rest on a table, on a vehicle seat, on a vehicle floor or a like flat surface.

A void is formed in the upper wall 408 proximal the second end wall 414 that provides a battery compartment 416. The battery compartment 416 includes a plurality of axially extending cradles 418 (four cradles illustrated), each of which sized to receive a rechargeable battery, such as battery 426. Each cradle 418 is defined by a first end wall 422 and a second end wall 424 disposed downstream from the first end wall, and a curved base 425 that generally conforms to the cylindrical outer wall of a battery 426. A battery is inserted into a cradle 418 such that the positive terminal end interfaces with the first end wall 422 and the negative terminal end interfaces with the second end wall 424.

A plastic or other nonconductive plug 430 extends into each cradle 418 from positive end wall 422. Plug 430 is generally cylindrical and is defined by a side wall 431 connected to a front end wall 433 and a flange 435 extending outwardly from side wall 431 that abuts end wall 422 to provide a stop for plug travel.

Figure 33:
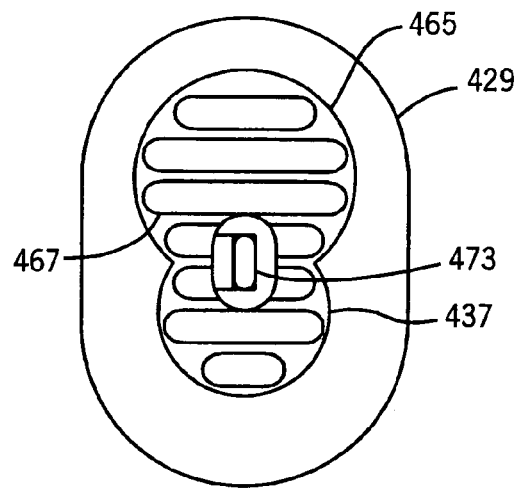
FIG. 33 is a perspective view of a positive terminal end of a AA cell and positive charge contact taken along line 33-33 of FIG. 32.

Referring also to FIG. 33, an upper aperture 465 and an overlapping lower aperture 437 extends through front end wall 433. A conductive contact 429 is disposed behind front end wall 433, and extends along apertures 437 and 465. A compression coil spring member 461 extends between a support plate 471 mounted inside housing and the contact 429. Spring 461 thus biases plug 430 into the corresponding cradle 418, and further biases contact 429 against front end wall 433. It can thus be said that plug 430 and/or spring 461 support contact 429 during operation.

Plug 430 has a stroke sufficient to accommodate both AAA and AA size cells 477 and 479, respectively, however, one skilled in the art appreciates that a charger could be constructed in accordance with aspects of the present invention that is compatible with C and D size sells. A size AAA battery 477 will typically engage contact 429 through lower aperture 437, while a size AA 479 cell will typically engage contact through upper aperture 465.

Contact 429 defines a plurality of substantially parallel horizontal ridges 467 extending outwardly through apertures 437 and 465 and towards cradle 418. Adjacent ridges 467 can be spaced apart by a vertical distance of between 1 and 3 mm. In accordance with one aspect of the invention, ridges 467 protrude outwardly a distance of at least 0.1 mm, and less than 2 mm. The terminal ends of adjacent ridges 467 can either converge to a joint that engages the positive terminal end 463, or alternatively can be vertically offset from each other to define a ribbed vertical wall that engages the nubbin of the battery disposed in cradle 418.

A first sense contact 473 extends through contact 429, and is connected to a controller 481, which can be a microprocessor, is disposed in housing 402 via an electrical lead 475. Contact 473 is disposed at the interface between apertures 437 and 465, and is thus engaged by the positive nubbin regardless of the size of the battery disposed in cradle. Signals received from sense contact 473 are used by controller 481 in combination with other signals, as described below, to determine the open circuit voltage of the cell disposed in cradle 418.

Figure 34:
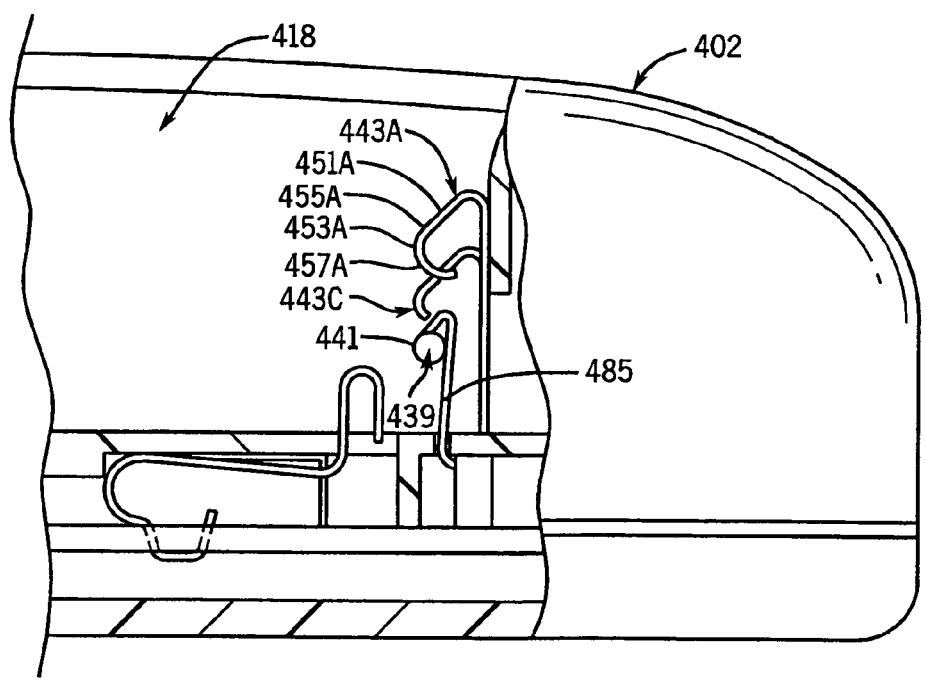
FIG. 34 is a side elevation view of the negative cell terminal contact arrangement of the charger illustrated in FIG. 31.
Figure 35:
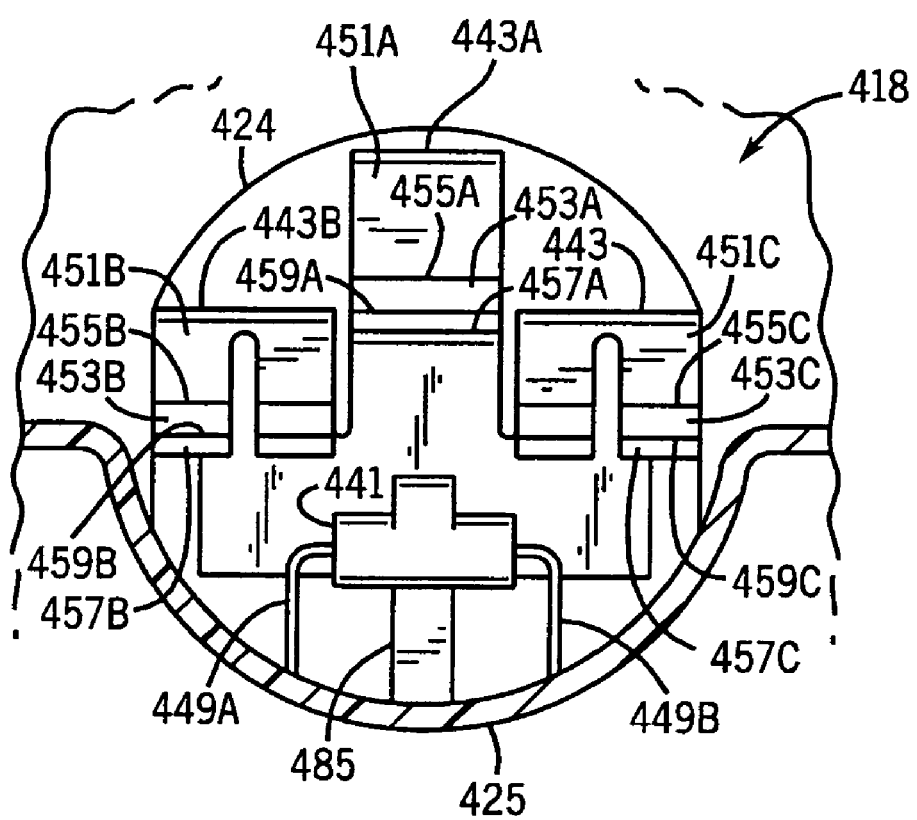
FIG. 35 is an end elevation view of the negative cell terminal contact arrangement of the charger illustrated in FIG. 31.

Referring now also to FIGS. 34 and 35, a plurality of contacts extends into cradle 418 from the negative end wall 424, and engages the negative end of the cell being inserted into the cradle. Specifically, a second sense contact 441 is provided in the form of a conducting layer that surrounds at least a portion of a thermistor 439, as is described below. Contact 441 is connected to controller 481 via a lead 485, and engages the negative end of the cell to enable, when measured against first sense contact 473 that engages the positive end. Controller 481 can thus sense the open circuit voltage of the battery 426 during charging. The term "open circuit voltage" refers to a voltage measured across an electrochemical cell that is inserted into the charging device utilizing sufficiently low currents (on the order of micro-Amps) such that, the voltage that is measured is not significantly affected by the voltage measurement process itself. Those skilled in the art will recognize this 'open circuit voltage' to be equivalent to a sense voltage that is measured in a typical four wire configuration that allows the precise measurement of voltage without the need to consider the internal resistance of the charging wires. At high currents such as those discussed herein, typical two wire sense configurations provide inaccurate voltage measurement during charge reflecting the voltage loss through the circuitry that connects the power supply to the electrochemical cell contacts.

It should be appreciated that the open circuit voltage provides controller 481 with an indication of whether the cell has been fully charged and/or whether the reversible switch has been opened. Accordingly, suitable open circuit voltages can be used by controller 481 to determine whether or not to apply high charge currents to the cell.

The negative end of cradle 418 further includes a pair of sensing contacts 432 and 434 is depressed upon insertion of a cell and, in combination with sensing contacts 441 and 473, can be used to contact 473, enable controller 481 to determine whether a suitable chargeable cell is disposed in cradle 418.

Three negative end charge contacts 443A-C receive a charging current as described above, and contact the negative end of the cell to deliver the charging current to the battery 426. Charge contact 443A is horizontally centered, and disposed above contacts 443B and 443C which flank contact 443A on both sides. Each contact 443A-C includes an upper section 451 that extends outwardly into the cradle 418 and away from negative end wall 424. A middle section 453 is integrally connected to upper section 451 and extends substantially vertically downwards from the lower end 455 of upper section 451. A lower section 457 extends inwardly towards the negative end wall 424 from the lower end 459 of middle section 453. Primarily the middle sections 453 engage the cell being charged. Charge contacts 429 and 443A-C, along with the positive and negative terminal ends of battery 426 typically comprise nickel due to its low cost and high conductivity (resistivity of about 6.84 micro$\Omega$-cm).

While the charge contacts are being described with reference to charger 400, it should be appreciated that this aspect of the invention is applicable to any of the chargers described herein, including any alternative chargers capable of delivering high charge currents to a secondary cell as described herein.

Because of the high currents used to charge the cell in a period of time less than conventional secondary cells as described herein (e.g., on the order of fifteen minutes), it is desirable that the positive and negative terminals of the cell maintain sufficient electrical contact with the corresponding charge contacts. The present inventors recognize that nickel can oxidize in air to form nickel oxides on the surface that are less conductive than pure nickel.

Accordingly, ridges 467 and middle sections 453A-C provide scraping members that remove nickel oxide from the positive 463 and negative terminal ends 469 of the cell 426 when the cell is inserted into cradle 418. Advantageously, the negative charge contacts 443A-C and positive charge contact 429 provide a contact force greater than 3 pounds, and alternatively greater than 4 pounds, and less than 10 pounds, and alternatively 7 pounds, against the negative end of the cell when inserted into cradle 418. The contact force assists in the effectiveness of nickel oxide removal, and removal of other impediments to conductivity, from the cell terminals during scraping. The contact force further displaces any nickel oxide that might have accumulated on the charge contacts away from locations on the charge contacts that are brought into contact with the corresponding terminal ends of battery 426. Accordingly, a nickel-to-nickel contact is established between the cell terminal ends and the charge contacts that enables the high charging currents described herein to be applied to the cell, and received by the cell, during charging. Once inserted, the battery 426 is desirably held in place by a retaining force of at least 3 pounds.

This positive contact force further provides a low contact resistance which, in turn, results in low resistive heating as caused by $i^2r$ heating across the contact surface during charge. One aspect of the invention thus enables fresh wiping of the contacts between every charge cycle, producing a surface contact resistance between the cell terminal ends and the charge contacts that is sufficiently low enough to allow for high current conductivity without significant heating of the contacting area due to the resistive heating of the charge current.

The scraping action will now be described in more detail with reference to FIGS. 36A and 36B. Specifically, battery 426 is inserted at an angle $\theta$ relative to the horizontal plane, which causes the positive terminal end (nubbin 463) to engage the ridged positive contact 429. Depending on several variables, including the distance between the positive contact 429 and negative contacts 443A-C along with the height of the negative end wall 424, the angle of entry can be defined within a range greater than 0 degrees, and less than 45, and, alternatively, 30 degrees.

As cell 426 is further inserted into cradle 418, positive contact 429 translates axially towards positive end wall 422 until the negative terminal end 469 is substantially vertically aligned with negative end wall 424. As the negative end of the cell is depressed into cradle 418, the negative terminal end 469 rides along contacts 443A-C, thereby initially scraping the negative terminal end against edge 455A and middle portion 453A. As the cell is further inserted, the negative terminal end 469 is further scraped against edge 455A and middle portion 453A, and further against edges 455B-C and middle portions 453B-C. Negative contacts 443A-C flex slightly towards negative end wall 424 as the negative end of the cell is inserted.

It should be appreciated that positive terminal end 463 is raised against contact 429 as the negative cell terminal end is depressed, thereby scraping the positive terminal (nubbin 463) against ridges 467 until the battery is fully inserted and substantially horizontally disposed in the cradle 418.

The spring force biasing positive contact 429 inwardly is sufficient such that, as positive and negative terminal ends 463 and 469, respectively, are scraped against positive and negative charge contacts 429 and 443A-C, respectively, nickel oxide and other nonconductive contaminants are removed from the terminal ends at locations that form electrical contact with the respective charge contacts. In particular, ridges 467 enable nickel oxide removal from nubbin 463, while edges 455A-C and middle portions 453A-C remove nickel oxide from negative terminal end 469.

The insertion angle θ, given the force of spring 461, is configured such that the cell terminal ends rub against the charge contacts under at least 3 pounds of force across at least 3% of the surface area of negative terminal end 469, and at least 1% of the surface area of positive terminal end 463.

In order to examine the effectiveness of the scraping action described herein, a cell 426 was inserted into charger 400 for the first time and analyzed for nickel, iron, carbon, and oxygen content using a regional elemental analysis using conventional scanning electron microscopy elemental identification techniques. Abrasion marks on the cell terminal ends indicated that when they were scraped against the corresponding charge contacts on insertion, the surface area of exposed nickel increased allowing better contact to the cell terminal end.

It should be appreciated that the present invention contemplates numerous variations of the embodiment illustrated and described above. For example, the spring force can alternatively be applied to the negative contacts 443A-C rather than positive contact 429. Furthermore, both the positive contact 429 and negative contacts 443A-C can present any suitable surface or edge (collectively referred to herein as "surface") that protrudes into cradle 418 or is otherwise capable of engaging the corresponding terminal end of the cell 426 to facilitate the removal of nickel oxide from the terminal ends and the charge contacts at locations that will form an electrical connection during charging.

For instance, it should be appreciated that the ridges 467 need not be horizontally disposed, but can comprise any size and shape (e.g., vertically disposed) suitable to define edges that contact and remove nickel oxides and other resistive contaminants from the positive terminal end 463 of the cell inserted into cradle 418. Likewise, negative contacts 443A-C could be replaced with only one (or more) contacts having any suitable surface suitable for scraping nickel oxide as described above. Moreover, the present invention is not limited to the plug 430 described herein, but rather can include any charge contact suitable for engaging the positive terminal end 463 of a cell at a suitable force described above for removing nickel oxide and enabling high charge currents to be applied to the cell 426.

As described herein, any of the cells described above as containing a reversible pressure-responsive switch is capable of receiving a variety of different types of charge currents that are higher than charge currents currently available to reliably charge conventional secondary cells without causing them to fail due to excessive internal cell pressure buildup.

These charge currents reflect the wide variety of charging techniques known to those skilled in the art. Among the most common types of current provided by electrochemical cell chargers are pulsed and non-pulsed types of currents. Known pulsed types of charge currents include, but are not limited to, those methods where current is applied in intermittent fashion, often in response to measured attributes of the electrochemical cell, where large current pulses are applied for short periods of time. In the past these methods typically have low average charge currents, less than at least about 4 Amps.

As described above, charger 400 typically receives electrical current from a conventional electrical receptacle, which is known to pulsate at a frequency of, for example, 60 Hz in the United States. Aspects of the present invention can provide a steady current, which is defined as providing current to the cell being charged, wherein the provided current either 1) does not further pulsate with respect to the received current, or 2) is less pulsated than the received current, for instance when received current is averaged to produce a non-pulsating current. Other aspects can provide a current that is further pulsated with respect to the received current.

Charger 400 can provide a constant voltage charge greater than 1.2 V and, alternatively greater than 1.5 V. The constant voltage charge can be limited by 2 V and, alternatively, 1.7 V. The average charge current, whether steady or further pulsated, can average greater than 4 Amps, 5 Amps, 6 Amps, 7 Amps, 8 Amps, 10 Amps, and 12 Amps if higher charge currents are desirable. The average charge current can also be limited to 8 Amps, 10 Amps, 15 Amps, and 20 Amps in accordance with certain aspects of the invention. An average charge current can be defined as the average amount of current passed through an electrochemical cell over a period of time, for example 15 minutes, alternatively 10 minutes, alternatively 5 minutes, 2 minutes and, alternatively, 1 minute. In this regard, it is recognized that an average charge current of the type described above can be advantageously applied for the duration of time necessary to fully charge a fast-charging electrochemical cell, the duration of time being a function of the cell charge capacity.

The currents can be provided by power received from electrical cord 413 that is input to a rectifier 483 that converts the incoming alternating current to a direct current, and can further remove current pulses as received from the electrical receptacle to produce a smoothed direct current. Controller 481 provides signals to rectifier and the corresponding electrical circuit to provide a predetermined charge voltage and/or current level to the cell.

The charge currents described herein enable fast charging of a typical AA or AAA round cell. A AA 2000 mAh (standard rated) NiMH cell, for example, can be reasonably charged (to within 85% of standard rated capacity) within 15 minutes or less utilizing charge currents of more than 7.5 Amps. Those skilled in the art recognize that a fast-charging electrochemical cell is deemed fully charged when charged within 85% of the standard rated capacity. Because the charge voltage is held constant the cell internal resistance determines the amount of current accepted by the cell. This "self regulation" of the charge current by the cell in the constant voltage charge regime allows for a cell charging system having increased efficiency compared to conventional systems because the cell accepts as much current as it can throughout charge. Cooling the electrochemical cell during fast charging by further increases its ability to accept charging current. Cooling can be achieved in a variety of ways that include, but are not limited to, moving ambient air around at least a portion of the cell. Alternatively, sufficiently reducing the contact resistance of the cell when inserting the cell into a cell charging cradle and engaging positive and negative cell terminals with positive and negative cell contacts provides another method of reducing the generation of excessive heat (particularly at high charge current rates) during fast charging. Accordingly, loss of charging energy to poor charging efficiency is reduced.

An overall charge efficiency in this instance is greater than 90%, meaning that for a 2000 mAh cell charged at more than 7.5 Amps, for example, will be fully charged in less than 15 minutes. The charger will sense that the switch opens by monitoring the amount of current applied to the cell during a constant voltage charge. If, for example, the charge current level falls below a predetermined value (e.g., 1.5 Amps) within the first 15 minutes of charge, the charger concludes that the cell pressure switch has opened. Determination of an open pressure switch can then be used to initiate another charge level lower than the previous charge level, thereby accommodating the decreased charge acceptance of the cell chemistry (and decreased efficiency) as the cell approaches full capacity. It should be appreciated, however, that the cell has already been charged to 85% of rated capacity by the time that the efficiency begins to decrease. Any of several know methods may then be applied to top-off the remaining capacity in the cell.

It will also be appreciated by those skilled in the art that cells of similar size with greater capacities can also be rapidly charged provided that enough current is available to the cell during charging. Because of the self-regulating nature of each cell during a constant voltage charging process, it is feasible and can be economically desirable to allow cells to charge in electrically parallel circuitry. Depending upon other electronic circuitry design constraints it may be economically advantageous to design the charging circuitry such that two or more switch-equipped cells are charged in parallel.

Whereas the charge efficiency advantages of constant voltage charging have been described, there are also instances where the economic benefits of constant current charging make it a more desirable topology for charging cells. In these instances it may also be desirable to charge the cells in series. The ability to safely utilize a constant current series charging method makes the advantages of the switch-containing cells desirable because of the reduced power costs required in charging equivalent numbers of cells. The applied current to cell 426 would be maintained within the ranges described above in combination with the constant voltage charging method.

Charger 400 can further include a thermal cutoff system including thermistor 439 that connected to controller 481 via leads 449A and 449B for determining a measured temperature that is sensed by thermistor 439. Thermistor 439 may alternatively engage the negative or positive end of the battery 426 directly, or alternatively be disposed anywhere in the battery compartment 416. Thermistor 439 is connected to controller 481 and provides signals corresponding to the temperature of the battery being charged. Once controller 481 determines that the measured cell temperature has exceeded a predetermined threshold, high current charging is discontinued, and a maintenance charge between 50 and 100 mA is applied to the cell. The thermal cutoff may be used in combination with any of the internal pressure-responsive switches described above, such that either excessive internal cell pressure or excessive temperature will cause the charging current to be terminated.

Referring now again to FIGS. 31-32, charger 400 can include an air mover system 440 that circulates cool ambient air through battery compartment 416, and reduces the excessive temperatures that are typically associated with charging conventional cells. Air mover system 440 is particularly useful when charging cells at high currents as described herein. Airflow is provided via air intake vents 446 that are formed in a shelves 442 disposed between adjacent cradles 418, each shelf defining a substantially horizontal upper face 444. Each vent 446 includes a plurality of slots 448 that extend laterally through the upper face 444 of each shelf 442. At least a portion of slots 448 is disposed below at least a portion of the battery being charged.

Air mover system 440 further includes a second vent 450 defined by a plurality of slots 452 that extend laterally through the upper wall 408 of housing 402 proximal end wall 412. The interior of the charger 400 is sufficiently hollow so as to provide an internal conduit that enables airflow between vents 446 and 450.

A forced air source, for example fan 447, is disposed inside the charger 400 at any location suitable to force air disposed inside the housing 402 out of the housing via vent 450. In one embodiment, fan 447 is disposed inside housing 402 proximal vent 450. During operation, fan 447 causes expulsion of air from air outlet vent 450, which creates a suction within housing, and a corresponding negative pressure at vents 446, that draws in cool ambient air. Air thus flows along the direction of Arrow X from vents 446 and through housing 402, and exits the charger 400 at vent 450. Because each vent 446 is disposed adjacent battery 426 and recessed with respect to the battery, cooled ambient air flows around that portion of the outer circumference of the battery that is disposed above corresponding vent 446. The air moving system 440 thus cools the cells being charged via convection, and prevents hot air from accumulating around the individual cells, and thereby extending the charge capacity of the cell. While the interior of housing 402 is sufficiently hollow to place vents 446 and 450 in fluid communication, it should be appreciated that a conduit (not shown) may be constructed inside housing 402 that is connected to vents 446 and 450 as its outer ends. The forced air source could be disposed in the conduit to produce an air flow in the desired direction.

The air moving system and thermal cutoff system may be used either alone or in combination in a charger. Alternatively, charger 400 can operate without either the air moving system 440 or the thermal cutoff system. It should be further appreciated that the fan 447 can alternatively be disposed in the housing 402 at a location proximal vents 450, or alternatively may comprise any apparatus operable to cause air to flow between vents 446 and 450. It should furthermore be appreciated that the flow of air may be reversed, such that air is received into the housing 402 at vent 450 and exits the housing at vents 446. Furthermore, while ambient air flows past the cells in a direction generally transverse to the charger 400, the air could alternatively flow through the battery compartment 416 in a lateral direction, an axial direction, under the batteries 426, around the batteries, or alternatively vents 446 may be configured to form a swirl of air in the battery compartment 416. The configuration of vents 446 and 450 as illustrated is thus only one of several possible configurations understood by one having ordinary skill in the art that are intended to fall under the scope of the present invention.

Figure 37:
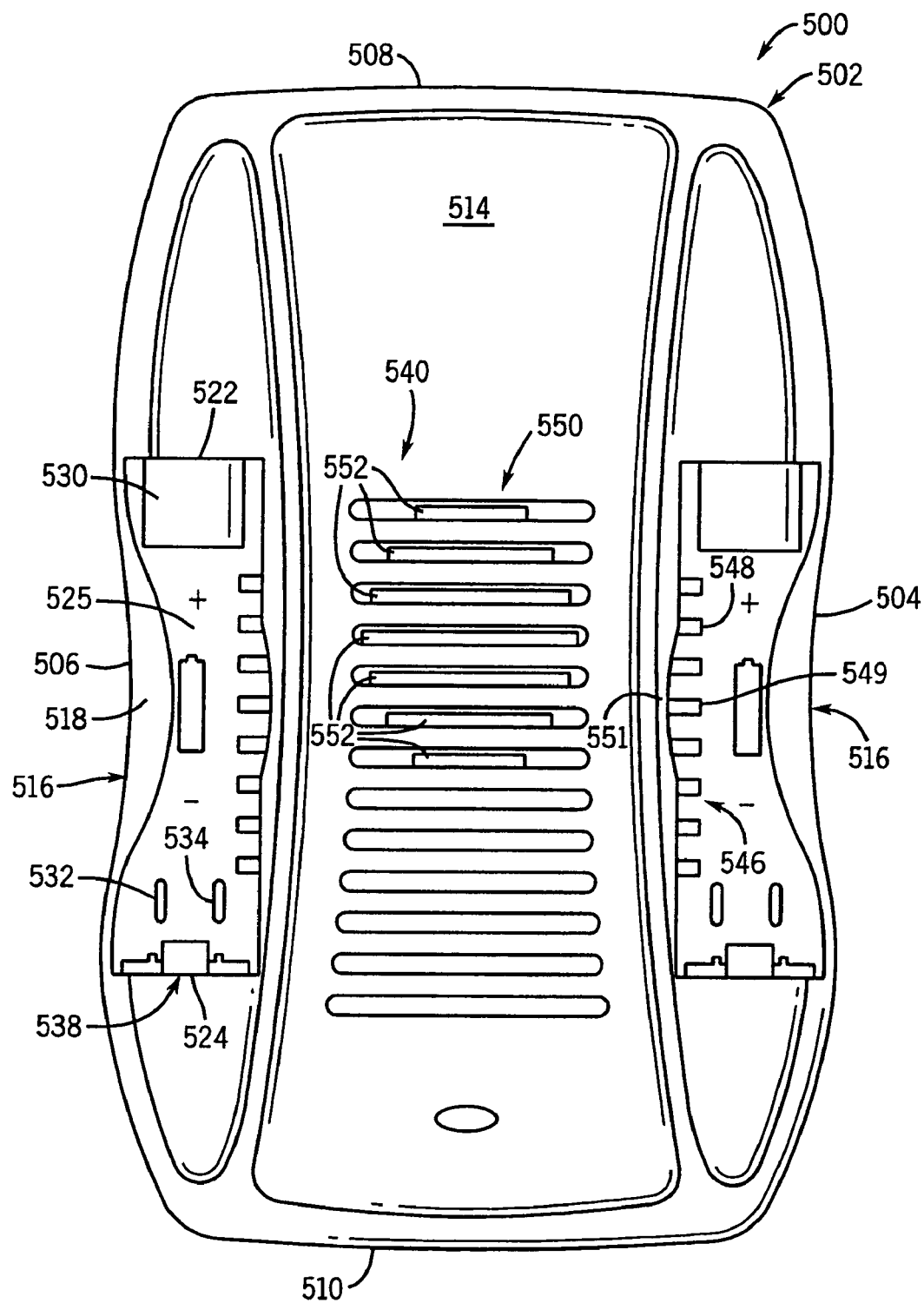
FIG. 37 is a top plan view of a charger having an air moving system and thermal cutoff system constructed in accordance with an alternative embodiment.

One such alternative configuration is illustrated in FIG. 37 having reference numerals corresponding to like elements of the previous embodiment incremented by 100, unless otherwise stated, for the purposes of clarity and convenience. In particular, a vertically extending charger 500 is illustrated having a housing 502 defined by vertically extending side walls 504 and 506, horizontally extending upper and lower end walls 508 and 510, respectively, vertically extending rear wall (not shown), and vertically extending front wall 514. A standard electrical plug (not shown) extends transversely outwardly from the housing 502 that is received by a conventional electrical receptacle. Charger 500 is thus configured to be wall-mounted such that the rear wall faces the mounting surface, and front wall 514 extends transversely outwardly from the wall during use.

A pair of vertically extending voids is formed in the front wall 514 at a location proximal side walls 504 and 506 that provides a corresponding pair of battery compartments 516. Each battery compartment 516 includes a vertically extending cradle 518 that is sized to receive a rechargeable battery. Each cradle 518 is defined by a first positive end wall 522 and a second negative end wall 524, and a curved base 525 that is shaped to conform to the cylindrical outer wall of the battery.

A plastic or other nonconductive plug 530 extends into each cradle 518 from positive end wall 522 as described above with reference to charger 400. A first and second contact 532 and 534, respectively, extend upwardly from the base 525 proximal the negative end wall 524 for sensing and measuring the resistance of a conductive band as described above. A plurality of contacts 538 extends into each cradle 518 from the negative end wall 524 in the manner described above for sensing the open circuit voltage and applying a charge current to the battery. The charger 500 further includes a thermal cutoff system including a thermistor that is positioned as described above.

In order to reduce the excessive temperatures that are typically associated with cells during charging, charger 500 includes an air moving system 540 that circulates cool ambient air through battery compartment 516. In particular, an air intake vent 546 is disposed in each compartment 516, and includes a plurality of horizontal slots 548 that extend through base 525. Slots 548 are vertically stacked, and extend substantially along the entire length of the cradle 518. A portion of each slot 548 is disposed beneath the battery, and a portion of each slot is disposed adjacent the battery. Slots 548 define a first curved end 549 and a second relatively straight end 551. An air outlet vent 550 includes a plurality of slots 552 that extend horizontally through the front wall 514 of the charger 500. The interior of charger 500 is sufficiently hollow so as to provide an internal conduit between vents 546 and 550.

A forced air source (not shown) is disposed inside the charger 500 at any location suitable to force air disposed inside the housing 402 out of the housing via vent 550. The expulsion of air from vent 550 causes a suction that forces cool ambient air into the housing 502 via vents 546. Vents 546 are positioned to force ambient air to flow around the circumference of each cell. Air thus flows from vents 546 and through housing 502, and exits the charger 500 at vent 550. Because vents 546 are disposed adjacent the batteries, the batteries are cooled via convection. The air moving system 540 thus prevents hot air from accumulating around the individual cells being charged, and thus extends the charge capacity of the cell.

Charger 500 may alternatively be constructed in accordance with all of the alternative embodiments discussed above with reference to charger 400, and their equivalents.

In view of the above, it will be seen that the several advantages of the invention are achieved and other advantageous results attained. As various changes could be made in the above processes and composites without departing from the scope of the invention, it is intended that all matter contained in the above description and shown in the accompanying drawings shall be interpreted as illustrative and not in a limiting sense.

We claim:

1. An electrochemical cell charger of the type that delivers a charge to an electrochemical cell, the charger comprising:
    at least one battery compartment adapted to receive an electrochemical cell, the battery compartment including:
        a positive charge contact having a ridged cell-engaging surface adapted to wipe a positive terminal of the electrochemical cell to remove oxidation from the positive terminal, the ridged cell engaging surface comprising at least two outwardly extending, spaced apart ridges, the at least two ridges having different lengths, each of the at least two ridges having longitudinal side edges and transverse ends, each of the transverse ends extending between and connecting the longitudinal side edges, the transverse ends and the longitudinal side edges defining a continuous loop;
        a negative charge contact adapted to wipe a negative terminal of the electrochemical cell to remove oxidation from the negative terminal; and
    wherein the charger is operable to provide the electrochemical cell an average charge current of at least 4 Amps.

2. The charger as recited in claim 1, further comprising an air moving system that causes ambient air to be delivered to the electrochemical cell.

3. The charger as recited in claim 2, wherein the ambient air has a temperature less than air surrounding the electrochemical cell during charging.

4. The charger as recited in claim 1, further comprising a controller coupled to the positive and negative charge contacts, wherein the controller determines the charge current to be provided to the electrochemical cell.

5. The charger as recited in claim 1, further comprising a thermistor disposed proximal one of the cell terminals, the thermistor in electrical communication with the controller to sense a cell temperature.

6. The charger as recited in claim 5, wherein a maintenance charge is applied to the cell at a level below about 100 mA if the sensed temperature is greater than a predetermined temperature.

7. The charger as recited in claim 6, wherein the maintenance charge is at least about 50 mA.

8. The charger as recited in claim 1, further comprising a sensing contact engaging the negative cell terminal, the sensing contact in electrical communication with the controller to sense an open circuit voltage of the cell during charging.

9. The charger as recited in claim 8, wherein the charge current is delivered if a suitable open circuit voltage is detected by the controller.

10. The charger as recited in claim 9, wherein the charge current is delivered at an applied voltage that is determined by the controller in response to the open circuit voltage detected.

11. The charger as recited in claim 1, further comprising a plurality of negative charge contacts engaging the negative cell terminal, each of the contacts delivering current to the cell.

12. The charger as recited in claim 11, further comprising three negative charge contacts engaging the negative cell terminal, each of the contacts delivering current to the cell.

13. The charger as recited in claim 1, wherein the ridges extend substantially horizontally along the cell-engaging surface.

14. The charger as recited in claim 1, wherein the ridges extend substantially vertically along the cell-engaging surface.

15. The charger as recited in claim 1, wherein the positive charge contact is biased against the positive cell terminal under a force greater than about three pounds.

16. The charger as recited in claim 15, wherein the positive charge contact is biased against the positive cell terminal under a force greater than about four pounds.

17. The charger as recited in claim 15, wherein the force is less than about 10 pounds.

18. The charger as recited in claim 17, wherein the force is less than about 7 pounds.

19. The charger as recited in claim 15, wherein the positive charge contact is carried by a plug and biased against the plug under a spring force.

20. The charger as recited in claim 1, wherein the charge current is greater than about 4 Amps.

21. The charger as recited in claim 1, wherein the charge current is greater than about 8 Amps.

22. The charger as recited in claim 1, wherein the charge current is greater than substantially 10 Amps.

23. The charger as recited in claim 1, wherein the charge current is less than about 20 Amps.

24. The charger as recited in claim 1, wherein the charge current is less than about 15 Amps.

25. The charger as recited in claim 1, wherein the charger provides a constant voltage charge greater than about 1.2 Volts across the terminal ends of the electrochemical cell.

26. The charger as recited in claim 25, wherein the constant voltage charge is greater than about 1.5 Volts across the terminal ends.

27. The charger as recited in claim 25, wherein the constant voltage charge is less than about 2 Volts across the terminal ends.

28. The charger as recited in claim 27, wherein the constant voltage charge is less than about 1.7 Volts across the terminal ends.

29. The charger as recited in claim 2, wherein the air moving system comprises a fan that causes ambient air to flow across the electrochemical cell.

30. The charger as recited in claim 29, wherein the air moving system further comprises a vent disposed proximal the electrochemical cell that receives the ambient air.

31. The charger as recited in claim 30, wherein the air mover creates a negative pressure at the vent to draw ambient air around the cell.

32. The charger as recited in claim 1, configured to receive and charge a cylindrical cell.

33. The charger as recited in claim 32, configured to receive and charge both size AA and AAA cells.

34. The charger as recited in claim 33, configured to receive electrochemical cells incorporating a switch that reversibly opens in response to an elevated cell pressure during charging to prevent the cell from receiving the charge current.

35. The charger as recited in claim 1, configured to receive electrochemical cells incorporating a switch that reversibly opens in response to an elevated cell pressure during charging to prevent the cell from receiving the charge current.

36. An electrochemical cell charger of the type that delivers a charge to an electrochemical cell, the charger comprising:
   at least one battery compartment adapted to receive an electrochemical cell, wherein the battery compartment includes a positive charge contact having a ridged outer surface adapted to wipe a positive terminal of the electrochemical cell to remove oxidation from the positive terminal, the ridged outer surface comprising at least two outwardly extending, spaced apart ridges having different lengths, each of the at least two ridges having longitudinal side edges and transverse ends, each of the transverse ends extending between and connecting the longitudinal side edges, the transverse ends and the longitudinal side edges defining a continuous loop; and a negative charge contact adapted to wipe a negative terminal of the electrochemical cell to remove oxidation from the negative terminal;
   an air moving system including a vent disposed proximal the battery compartment, and a forced air source that draws ambient air into the vent; and
   wherein the charger is configured to provide the received electrochemical cell an average charge current of at least 4 Amps.

37. The charger as recited in claim 36, further comprising a controller in electrical communication with positive and negative charge contacts of positive and negative terminal ends, respectively, of the cell, wherein the controller determines the charge current to the electrochemical cell.

38. The charger as recited in claim 37, further comprising a thermistor disposed proximal one of the terminal ends that provides a signal that reflects the measured cell temperature to the controller.

39. The charger as recited in claim 38, wherein the thermistor is connected to a sensing contact that measures an open circuit voltage of the cell and is connected to the controller.

40. The charger as recited in claim 36, further comprising at least one positive and one negative charge contact engaging a positive and a negative terminal end of the cell, respectively.

41. The charger as recited in claim 40, wherein the cell is engaged under a force of at least three pounds.

42. The charger as recited in claim 41, wherein the cell is engaged under a force of at least four pounds.

43. The charger as recited in claim 41, wherein the force is less than about 10 pounds.

44. The charger as recited in claim 41, wherein the force is less than about 7 pounds.

45. The charger as recited in claim 41, further comprising a plug that supports the positive charge contact, wherein the positive charge contact is biased against the plug under a spring force.

46. A method of charging a rechargeable electrochemical cell disposed in a charger, the method comprising:
   (A) inserting at least one of a size AA and size AAA rechargeable electrochemical cell into a cell charging cradle and engaging and wiping positive and negative cell terminals against a plurality of outwardly extending ridges carried by positive and negative charge contacts, respectively, to remove impediments from the respective positive and negative cell terminals, wherein at least two of the plurality of outwardly extending ridges carried by the positive charge contact have different lengths each of the at least two ridges having longitudinal side edges and transverse ends, each of the transverse ends extending between and connecting the longitudinal side edges, the transverse ends and the longitudinal side edges defining a continuous loop; and
   (B) providing the at least one of a size AA and size AAA rechargeable electrochemical cell an average charge current of at least 4 Amps.

47. The method as recited in claim 46, wherein step (B) further comprises providing a steady charge current.

48. The method as recited in claim 47, wherein step (B) further comprises receiving alternating current from an electrical receptacle, rectifying the received current, and providing the rectified current.

49. The method as recited in claim 47, wherein step (B) further comprises receiving current from an electrical receptacle, and providing the received current without further pulsating the received current.

50. The method as recited in claim 46, wherein step (B) further comprising receiving current from an electrical receptacle, pulsating the received current, and providing the pulsated current.

51. The method as recited in claim 46, further comprising the step of:
   (C) moving air across at least a portion of the electrochemical cell with an air mover attached to at least a portion of the charger.

52. The method as recited in claim 51, further comprising drawing air across the cell with a fan.

53. The method as recited in claim 52, further comprising drawing air into the charger through a vent disposed proximal the cell.

54. The method as recited in claim 46, wherein step (A) further comprises biasing at least one of the charge contacts against the cell under a force of at least three pounds.

55. The method as recited in claim 46, wherein step (A) further comprises biasing at least one of the charge contacts against the cell under a force of at least four pounds.

56. The method as recited in claim 46, wherein step (A) further comprises biasing at least one of the charge contacts against the cell under a force of less than about 10 pounds.

57. The method as recited in claim 46, wherein step (A) further comprises biasing at least one of the charge contacts against the cell under a force of less than about 7 pounds.

58. The method as recited in claim 46, wherein step (A) further comprises removing oxidation from the positive cell terminal.

59. The method as recited in claim 46, wherein step (A) further comprises removing oxidation from the negative cell terminal.

60. The method as recited in claim 51, further comprising sensing a cell temperature during charging.

61. The method as recited in claim 6, further comprising applying a maintenance charge less than about 100 mA when the sensed temperature is greater than a predetermined threshold.

62. The method as recited in claim 61, wherein the maintenance charge is greater than about 50 mA.

63. The method as recited in claim 46, further comprising the step of providing a constant voltage charge greater than about 1.2 Volts across the terminal ends of the electrochemical cell.

64. The method as recited in claim 63, wherein the constant voltage charge is less than about 2 Volts across the terminal ends of the electrochemical cell.

65. The method as recited in claim 63, further comprising the step of receiving an electrochemical cell incorporating a reversible switch that opens in response to an elevated internal cell pressure to prevent the cell from receiving the charge current.

66. A method of applying a charge across a positive terminal and a negative terminal of a rechargeable electrochemical cell in a charger, the charger including a positive contact and a negative contact disposed in a charging cavity, each of the positive and negative contacts having a ridged contact surface with a plurality of outwardly extending ridges thereon, at least two of the plurality of outwardly extending ridges of the positive contact have different lengths, each of the at least two ridges having longitudinal side edges and transverse ends, each of the transverse ends extending between and connecting the longitudinal side edges, the transverse ends and the longitudinal side edges defining a continuous loop; the method comprising:
(A) inserting an electrochemical cell into the charging cavity at an angle;
(B) wiping the cell terminals against the ridges of the ridged contact surface of the corresponding charge contacts to remove oxidation from the cell terminals; and
(C) applying a force of at least 3 pounds from one of the charge contacts against the corresponding cell terminal.

67. The method as recited in claim 66, wherein the applied force is at least 4 pounds.

68. The method as recited in claim 66, wherein the applied force is less than about 10 pounds.

69. The method as recited in claim 66, wherein the applied force is less than about 7 pounds.

70. The method as recited in claim 66, wherein one of the contacts comprises a protrusion extending towards the cavity, wherein step (B) further comprises bringing at least one of the terminals against a protrusion.

71. The method as recited in claim 66, further comprising carrying at least one of the charge contacts with a nonconductive plug.

72. The method as recited in claim 71, further comprising biasing the at least one charge contact against a cavity-facing wall of the nonconductive plug.

73. The method as recited in claim 66, further comprising:
(D) providing an average charge current to the electrochemical cell at a level of at least about 4 Amps that is received by the cell.

74. The method as recited in claim 73, wherein the charge current is at least about 8 Amps.

75. The method as recited in claim 73, wherein the charge current is at least 10 Amps.

76. The method as recited in claim 73, wherein the charge current is less than 20 Amps.

77. The method as recited in claim 73, wherein the charge current is less than about 15 Amps.

78. An electrochemical cell charger of the type that delivers a charge to an electrochemical cell, the charger comprising:
a positive contact, the positive contact having a ridged contact surface adapted to engage and wipe a positive terminal of the cell to remove oxidation from the positive terminal, the ridged contact surface comprising at least two outwardly extending, spaced apart ridges having different lengths each of the at least two ridges having longitudinal side edges and transverse ends, each of the transverse ends extending between and connecting the longitudinal side edges, the transverse ends and the longitudinal side edges defining a continuous loop; and
a negative contact, the negative contact having a ridged contact surface adapted to engage and wipe a negative terminal of the cell to remove oxidation from the negative terminal,
wherein the charger is operable to provide an engaged cell an average charge current of at least 4 Amps for at least 5 minutes.

79. The electrochemical cell charger as recited in claim 78, wherein the average charge current is less than about 10 Amps.

80. The electrochemical cell charger as recited in claim 79, wherein the average charge current is applied for at least 10 minutes.

81. The electrochemical cell charger as recited in claim 80, wherein the average charge current is applied for at least 15 minutes.

82. The electrochemical cell charger as recited in claim 78, wherein the positive and negative contacts engage the positive and negative terminals, respectively, under at least 3 pounds of pressure.

83. The electrochemical cell charger as recited in claim 78, further comprising an air mover operable to deliver ambient air over the electrochemical cell.

84. The electrochemical cell charger as recited in claim 83, further comprising a vent disposed proximal the electrochemical cell, the vent receiving the ambient air under pressure supplied by the air mover.

85. The electrochemical cell charger as recited in claim 78, further comprising a thermistor coupled to one of the positive and negative contacts for sensing a cell temperature.

86. The electrochemical cell charger as recited in claim 78, configured to receive and deliver the charge to both size AA and AAA electrochemical cells.

87. The electrochemical cell charger as recited in claim 86, configured to receive electrochemical cells incorporating a switch that reversibly opens in response to an elevated cell pressure during charging to prevent the cell from receiving the charge current.

88. The electrochemical cell charger as recited in claim 78, configured to receive electrochemical cells incorporating a switch that reversibly opens in response to an elevated cell pressure during charging to prevent the cell from receiving the charge current.

89. An electrochemical cell charger of the type that delivers a charge to an electrochemical cell, the charger comprising:
- a positive contact, the positive contact having a ridged contact surface adapted to engage and wipe a positive terminal of the cell, the ridged cell-engaging surface comprising at least two outwardly extending, spaced apart ridges having different lengths each of the at least two ridges having longitudinal side edges and transverse ends, each of the transverse ends extending between and connecting the longitudinal side edges, the transverse ends and the longitudinal side edges defining a continuous loop; and
- a negative contact, the negative contact having a ridged contact surface adapted to engage and wipe a negative terminal of the cell,
- wherein the positive and negative contacts are arranged to receive the cell at an angle, and at least one of the contacts is configured to provide a force of at least 3 pounds to the cell terminals.

90. The charger as recited in claim 89, wherein the applied force is at least 4 pounds.

91. The charger as recited in claim 89, wherein the applied force is less than about 10 pounds.

92. The charger as recited in claim 89, wherein the applied force is less than about 7 pounds.

93. The charger as recited in claim 89, wherein at least one of the charge contacts is carried by a nonconductive plug.

94. The charger as recited in claim 93, wherein the at least one charge contact is biased against a cavity-facing wall of the nonconductive plug.

95. The charger as recited in claim 89, wherein an average charge current applied to the electrochemical cell is at a level of at least about 4 Amps.

96. The charger as recited in claim 95, wherein the average charge current is at least about 8 Amps.

97. The charger as recited in claim 95, wherein the average charge current is at least 10 Amps.

98. The charger as recited in claim 95, wherein the average charge current is less than 20 Amps.

99. The charger as recited in claim 95, wherein the average charge current is less than about 15 Amps.

100. An electrochemical cell charger of the type that delivers a charge to an electrochemical cell, the charger comprising:
- a positive contact, the positive contact being adapted to engage and wipe a positive terminal of the cell, and a negative contact, the negative contact being adapted to engage and wipe a negative terminal of the cell, at least the positive contact having a ridged contact surface comprising at least two outwardly extending, spaced apart ridges having different lengths each of the at least two ridges having longitudinal side edges and transverse ends, each of the transverse ends extending between and connecting the longitudinal side edges, the transverse ends and the longitudinal side edges defining a continuous loop; wherein the positive and negative contacts are arranged to receive the cell at an angle, and at least one of the contacts is configured to provide a force of at least 3 pounds to the cell terminals;
- an air moving system including a vent disposed proximal the battery compartment, and a forced air source that draws ambient air into the vent; and
- a thermistor disposed proximal one of the cell terminals operable to measure a cell temperature, wherein the charger is operable to provide an engaged cell an average charge current of at least 4 Amps for at least 5 minutes.

\* \* \* \* \*